(12) United States Patent
Lewis

(10) Patent No.: US 11,428,249 B2
(45) Date of Patent: *Aug. 30, 2022

(54) SYSTEM OF S-SHAPED CONDUIT MOUNTING ASSEMBLY HOOKS

(71) Applicant: Wencon Development, Inc., Walnut Creek, CA (US)

(72) Inventor: Christopher Lewis, Los Gatos, CA (US)

(73) Assignee: Wencon Development, Inc., Walnut Creek, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/088,859

(22) Filed: Nov. 4, 2020

(65) Prior Publication Data

US 2021/0048049 A1    Feb. 18, 2021

Related U.S. Application Data

(60) Continuation of application No. 16/143,259, filed on Sep. 26, 2018, now Pat. No. 10,837,476, which is a division of application No. 15/611,735, filed on Jun. 1, 2017, now Pat. No. 10,202,991.

(51) Int. Cl.
| | |
|---|---|
| *F16B 2/06* | (2006.01) |
| *F16L 3/12* | (2006.01) |
| *F16L 3/137* | (2006.01) |
| *F16L 3/123* | (2006.01) |
| *H02S 20/23* | (2014.01) |
| *H02S 30/20* | (2014.01) |
| *F16L 3/10* | (2006.01) |
| *F16L 3/237* | (2006.01) |

(Continued)

(52) U.S. Cl.
CPC ............ *F16B 2/065* (2013.01); *F16L 3/1215* (2013.01); *F16L 3/1233* (2013.01); *F16L 3/137* (2013.01); *H02S 20/23* (2014.12); *H02S 30/20* (2014.12); *F16B 5/0685* (2013.01); *F16L 3/10* (2013.01); *F16L 3/2235* (2013.01); *F16L 3/237* (2013.01)

(58) Field of Classification Search
None
See application file for complete search history.

(56) References Cited

U.S. PATENT DOCUMENTS

| | | | |
|---|---|---|---|
| 5,398,476 A * | 3/1995 | Knight | F24S 25/613 52/698 |
| 6,168,125 B1 * | 1/2001 | Winger | A47G 7/044 248/228.3 |

(Continued)

*Primary Examiner* — Joshua K Ihezie
(74) *Attorney, Agent, or Firm* — Temmerman Law; Mathew J. Temmerman

(57) ABSTRACT

A method and assembly for mounting a conduit on a mounting surface utilizing a conduit mounting assembly. The conduit mounting assembly includes a first clamp portion, a second clamp portion, a connecting screw and a conduit securement screw. The method includes providing the conduit mounting assembly, mounting the first clamp portion on a tile, mounting the second clamp portion opposite to the first clamp portion on the tile, connecting the first clamp portion with the second clamp portion utilizing the connecting screw and mounting the conduit on the second clamp portion utilizing the conduit securement screw and a conduit fastening member.

22 Claims, 89 Drawing Sheets

(51) Int. Cl.
*F16L 3/223* (2006.01)
*F16B 5/06* (2006.01)

(56) References Cited

U.S. PATENT DOCUMENTS

| | | | | |
|---|---|---|---|---|
| 6,398,174 | B1* | 6/2002 | Emalfarb | A47G 7/044 |
| | | | | 248/214 |
| 7,434,329 | B2* | 10/2008 | Walda | E04F 21/1855 |
| | | | | 33/649 |
| 8,713,889 | B2* | 5/2014 | Buttner | E04H 4/10 |
| | | | | 52/698 |
| 9,010,038 | B1* | 4/2015 | Stearns | H02S 20/23 |
| | | | | 52/173.1 |
| 9,334,652 | B2* | 5/2016 | Plath | E04D 1/2942 |
| 9,455,487 | B2* | 9/2016 | Bolze | F24S 25/613 |
| 10,202,991 | B2* | 2/2019 | Lewis | F16L 3/1215 |
| 10,837,476 | B2* | 11/2020 | Lewis | F16B 2/065 |
| 2009/0044854 | A1* | 2/2009 | Placer | F24S 20/67 |
| | | | | 136/251 |
| 2014/0339387 | A1* | 11/2014 | Bolze | H01Q 1/1221 |
| | | | | 248/237 |

* cited by examiner

SYSTEM OF S-SHAPED CONDUIT MOUNTING ASSEMBLY HOOKS

RELATED APPLICATIONS

This application is a continuation of U.S. nonprovisional patent application Ser. No. 16/143,259 filed Sep. 26, 2018 and now granted as U.S. Pat. No. 10,837,476, and which was a continuation of U.S. nonprovisional patent application Ser. No. 15/611,735 filed on Jun. 1, 2017 and now granted as U.S. Pat. No. 10,202,991.

BACKGROUND OF THE DISCLOSURE

Technical Field of the Disclosure

The present disclosure relates generally to conduit mounting assemblies, and more particularly to a method and assembly for mounting a conduit on a tile.

Description of the Related Art

A wide variety of conduit mounting assemblies are available in the art. Such conduit mounting assemblies are used to mount different types of conduits such as metallic, non-metallic, electrical, and other conduits on tiles, rooftops, along walls, inside walls, underground and through and on other media and surfaces. These mounting assemblies often include threads, clamps, interconnecting elements and the like for connecting a conduit to a surface or one conduit with another. Rooftop conduit mounting assemblies are conventionally used to mount such conduits to a roof or in an elevated position off the roof.

Some conventional methods and systems include wall-mounted type and trapeze type support strut assemblies which attach pipes, conduit, and tubes to vertical and horizontal surfaces. These may utilize multiple fastening members for mounting the assembly on vertical and horizontal surfaces, but may cause damage to the mounting surface. When the mounting surface is a roof component, such as a tile, damage can lead to problems in waterproofing. Other additional conventional systems do not securely hold the conduit is such a way as to prevent conduit movement, which can result in vibrational or other movement that can deliver repeated and/or impact loads on the tile causing breakage, damage and/or the disengagement of the conduit and/or mount.

There is thus a need for a conduit mounting assembly that is secure, simple and cost effective. Such a needed assembly would require fewer fastening members to mount a conduit thereby reducing or preventing possible damage to the mounting surface, which may be particularly important when the mounting surface is a tile. Further, such a needed mounting assembly would provide a secure connection to the tile that prevents conduit movement and impact loads on the tile. The needed assembly would also prevent and avoid enabling any water intrusion through the tile level roofing This needed assembly would provide a surface area to mount the conduit in an elevated position off the roof to prevent or reduce damage to the conduit and roof. Such a needed assembly would easily and quickly allow a user to install a conduit on a mounting surface and would be adaptable to mount on flat and curved tiles. These and other objectives are accomplished by the present invention.

SUMMARY OF THE INVENTION

To minimize the limitations found in the prior art, and to minimize other limitations that will be apparent upon the reading of the specification, the preferred embodiment of the present invention provides a method and conduit mounting assembly for mounting a conduit on a tile. The conduit mounting assembly includes a first clamp portion, a second clamp portion, a connecting screw and a conduit securement screw. The first clamp portion is designed to attach generally around a front portion of the tile, the second clamp portion is attached to the tile opposite from the first clamp. The first clamp portion includes a first top hook, a first bottom hook and a first elongated member. The first top hook includes a first top hooked portion and a first top base portion having a first side hole. The first bottom hook includes a first bottom hooked portion and a first bottom base portion having a second side hole. The second clamp portion includes a second top hook, a second bottom hook and a second elongated member. The second top hook includes a second top base portion and a second top hooked portion. The second top base portion includes a third side hole and the second top hooked portion includes a first top hole. The second bottom hook includes a second bottom base portion and a second bottom hooked portion. The connecting screw includes a first screw thread and the conduit securement screw includes a second screw thread for firmly fastening the first clamp portion and the second clamp portion with the tile. The first clamp portion and the second clamp portion are designed to easily mount the conduit on the tile or any other surface having two ends.

When the first clamp portion is mounted around the front portion of the tile, the first top base portion of the first clamp portion is attached to a top edge of the tile, the first top hooked portion is attached around a rear portion of the tile and the first elongated member is attached to the front portion of the tile. When the second clamp portion is mounted opposite to the first clamp portion and around the front portion on the tile, the second bottom base portion is attached to a bottom edge of the tile, the second bottom hooked portion is attached around the rear portion of the tile and the second elongated member is attached on the front portion of the tile. The first clamp portion is connected to the second clamp portion by a connecting screw inserted through the third side hole of the second clamp portion and a second side hole of the first clamp portion. The connecting screw is firmly tightened utilizing the first screw thread and a tightening means. When the first clamp portion and the second clamp portion are firmly connected with each other, the first elongated member base portion forms a 90-degree inclination with the first bottom base portion of the first bottom hook. The 90-degree inclination indicates that the first clamp portion is firmly connected to the second clamp portion utilizing the connecting screw to apply sufficient clamping load on the roofing tile to adequately hold the conduit in place on the roof. In one configuration, a near 90-degree inclination is acceptable. In another configuration, the 90-degree inclination is constant and not effected by tightening the connecting screw.

The preferred embodiment provides a method for mounting the conduit on the second clamp portion connected to the conduit fastening member. The method commences by providing the conduit mounting assembly. Next, the first clamp portion is mounted around the front portion of the tile. Thereafter, the second clamp portion is mounted opposite to the first clamp portion on the tile. Upon mounting the second clamp portion, the first clamp portion is connected to the second clamp portion by inserting and aligning the connecting screw through the third side hole of the second clamp portion and the second side hole of the first clamp portion. Next, the connecting screw is tightened via the tightening means, thereby firmly engaging the first clamp portion to the second clamp portion. The conduit is inserted through the conduit opening of the conduit fastening member. Thereafter, the conduit securement screw is inserted and aligned through the fastening hole at the conduit fastening member and the first top hole at the second clamp portion. Finally, the conduit is firmly mounted with the second clamp portion connected to the conduit fastening member by tightening the conduit securement screw utilizing the tightening means.

A first objective of the present invention is to provide a simplified method and assembly for mounting a conduit that requires fewer number of fastening members to mount the conduit on a tile thereby reducing possible damage to the mounting surface and which eliminates the need to mount to the decking below the tile or to penetrate the tile.

A second objective of the present invention is to provide a method and assembly for mounting a conduit that provides a mounting surface and maintains the waterproofing integrity of the roofing system.

A second objective of the present invention is to provide a method and assembly for mounting a conduit that provides a secure surface area and protects the conduit from water penetration by keeping it above the roof and thus out of the path of water running down the roof.

A third objective of the present invention is to provide a method and assembly for mounting a conduit that mounts the conduit in an elevated position off the roof.

A further objective of the present invention is to provide a method and assembly for mounting a conduit that allows for the easy and quick installation of a conduit on a mounting surface.

A still further objective of the present invention is to provide a method and assembly for mounting a conduit that is adaptable to mount on flat and curved tiles of varying contours and shapes.

A still further objective of the present invention is to provide a method and mounting system that securely fixes the conduit to the roof and resists uplift downloads and lateral loads that might otherwise cause damage to the tile and roofing system.

These and other advantages and features of the present invention are described with specificity so as to make the present invention understandable to one of ordinary skill in the art.

BRIEF DESCRIPTION OF THE DRAWINGS

In order to enhance their clarity and improve the understanding of the various elements and embodiments, elements in the figures have not necessarily been drawn to scale. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

Figure 1:
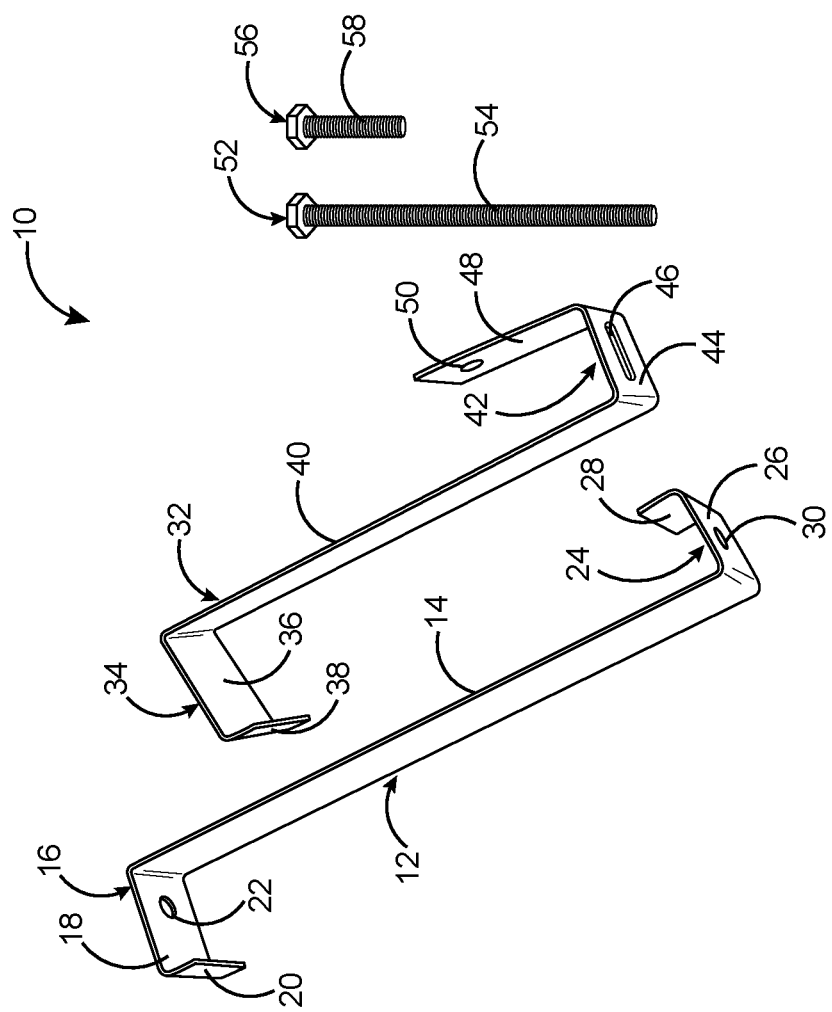
FIG. 1 is a perspective view of a conduit mounting assembly of the present invention, illustrating a first clamp portion, a second clamp portion, a connecting screw and a conduit securement screw of the conduit mounting assembly in accordance with the preferred embodiment of the present invention.

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term 'about" means +/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; said again may refer to language indicating "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Referring to FIGS. 1-10, a method and assembly for mounting a conduit 72 (see FIG. 7) on a tile 60 (see FIG. 2) utilizing a conduit mounting assembly 10 is illustrated. The conduit mounting assembly 10 includes a first clamp portion 12, a second clamp portion 32, a connecting screw 52 and a conduit securement screw 56. The first clamp portion 12 is designed to attach generally around a front portion 82 (see FIG. 2) of the tile 60. The first clamp portion 12 includes a first top hook 16, a first bottom hook 24 and a first elongated member 14. The first top hook 16 includes a first top hooked portion 20 and a first top base portion 18 having a first side hole 22. The first bottom hook 24 includes a first bottom hooked portion 28 and a first bottom base portion 26 having a second side hole 30. The second clamp portion 32 (see FIG. 4) includes a second top hook 42, a second bottom hook 34 and a second elongated member 40. The second top hook 42 includes a second top base portion 44 and a second top hooked portion 48. The second top base portion 44 includes a third side hole 46 and the second top hooked portion 48 includes a first top hole 50. The second bottom hook 34 includes a second bottom base portion 36 and a second bottom hooked portion 38. The connecting screw 52 (see FIG. 5) includes a first screw thread 54 and the conduit securement screw 56 includes a second screw thread 58 for firmly fastening the first clamp portion 12 and the second clamp portion 32 with the tile 60. In a preferred embodiment at least one of the holes in the assembly is threaded to match its counterpart screw. In additional embodiments a plurality of holes are threaded and in one embodiment all holes in the assembly are threaded and as such the entire assembly in this alternative embodiment may comprise no nuts. The first clamp portion 12 and the second clamp portion 32 are designed to easily mount the conduit 72 (see FIG. 7) on the tile 60 or any other surface having two ends. In the preferred embodiment, the first clamp portion 12 is longer than the second clamp portion 32, although in other embodiments the relative lengths may be switched or equal to one another.

Figure 3:
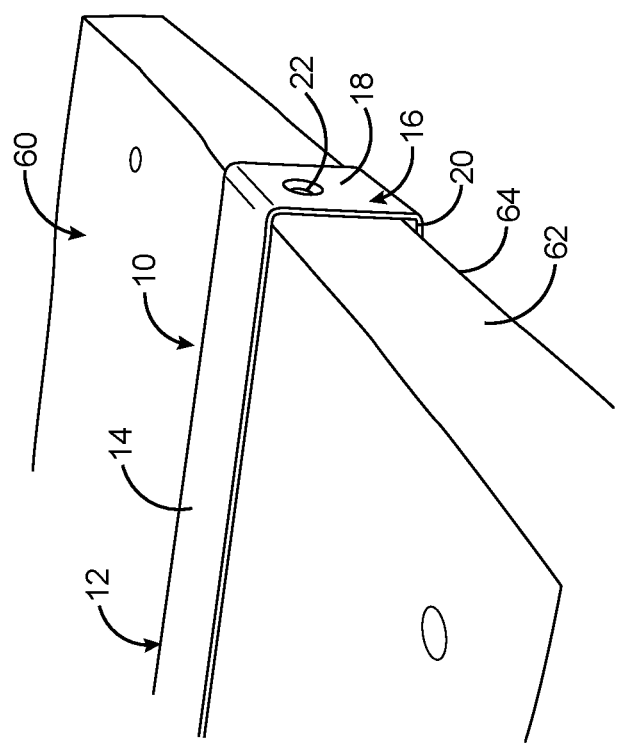
FIG. 3 is a perspective view of a first top base portion attached to a top edge of the tile in accordance with the preferred embodiment of the present invention.
Figure 2:
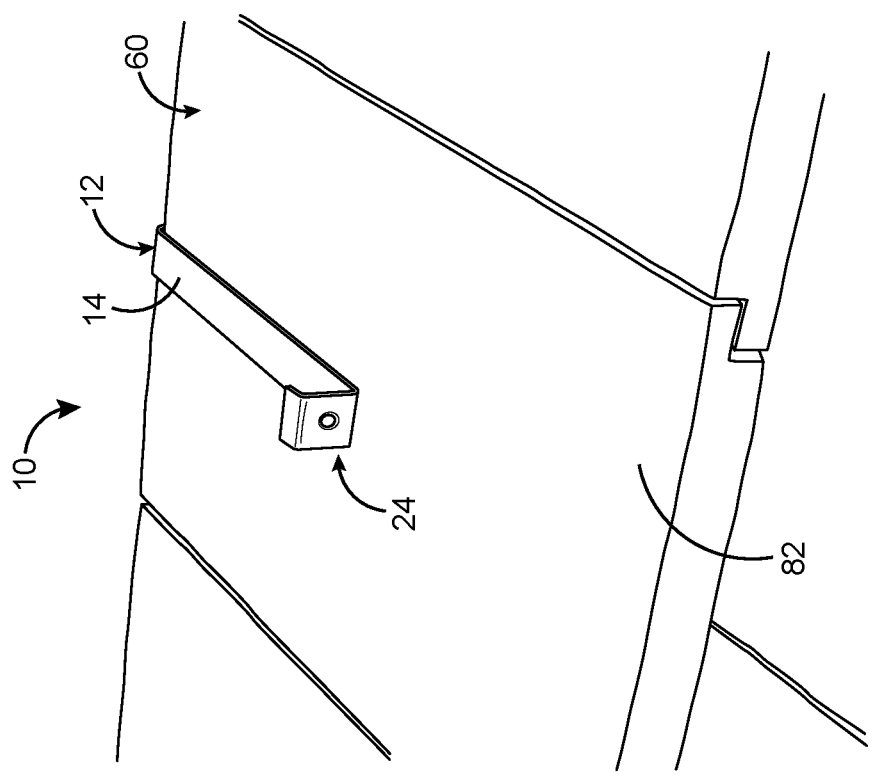
FIG. 2 is a perspective view of the first clamp portion mounted on a tile in accordance with the preferred embodiment of the present invention.
Figure 4:
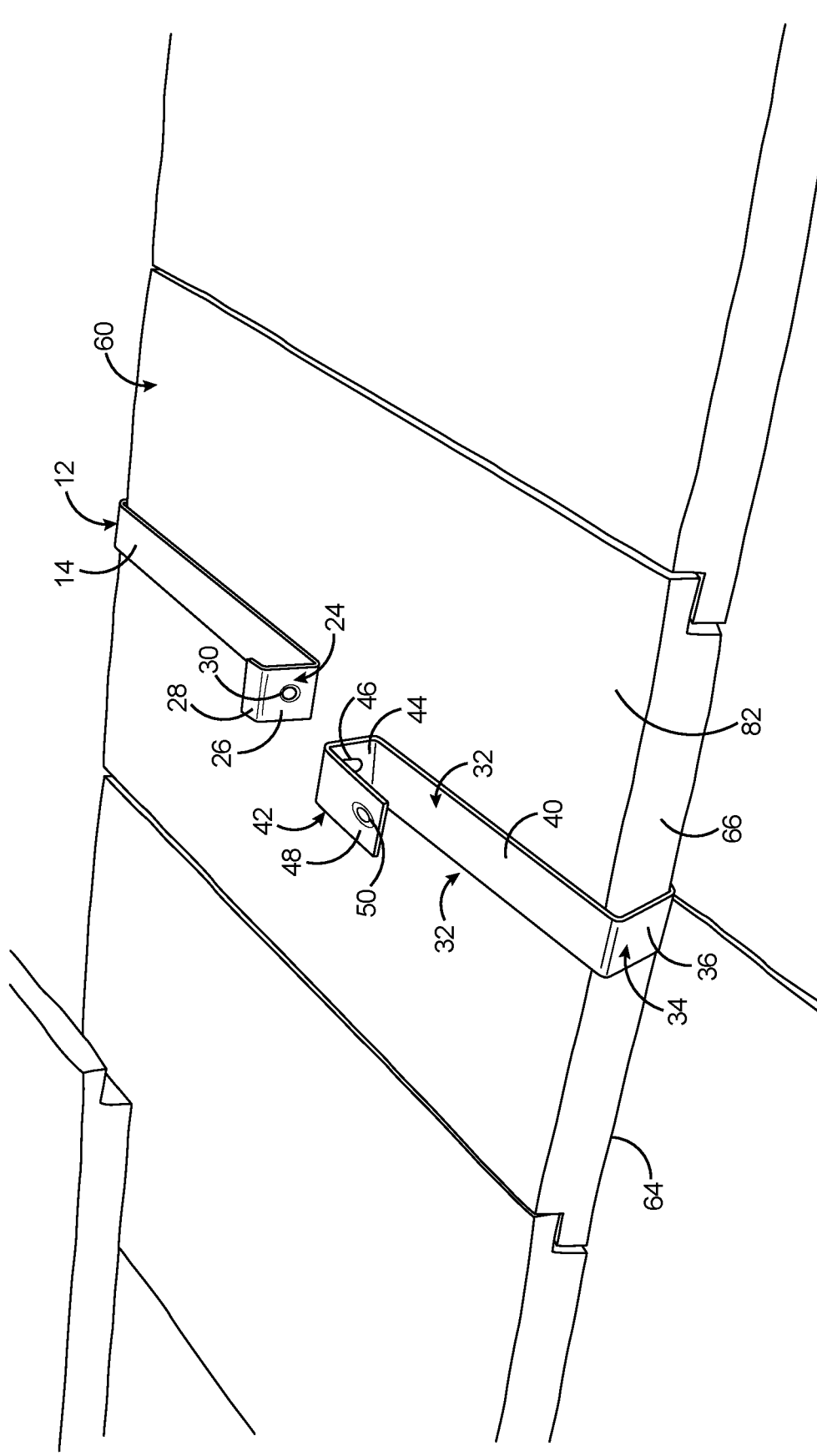
FIG. 4 is a perspective view of the second clamp portion and the first clamp portion in accordance with the preferred embodiment of the present invention.
Figure 5:
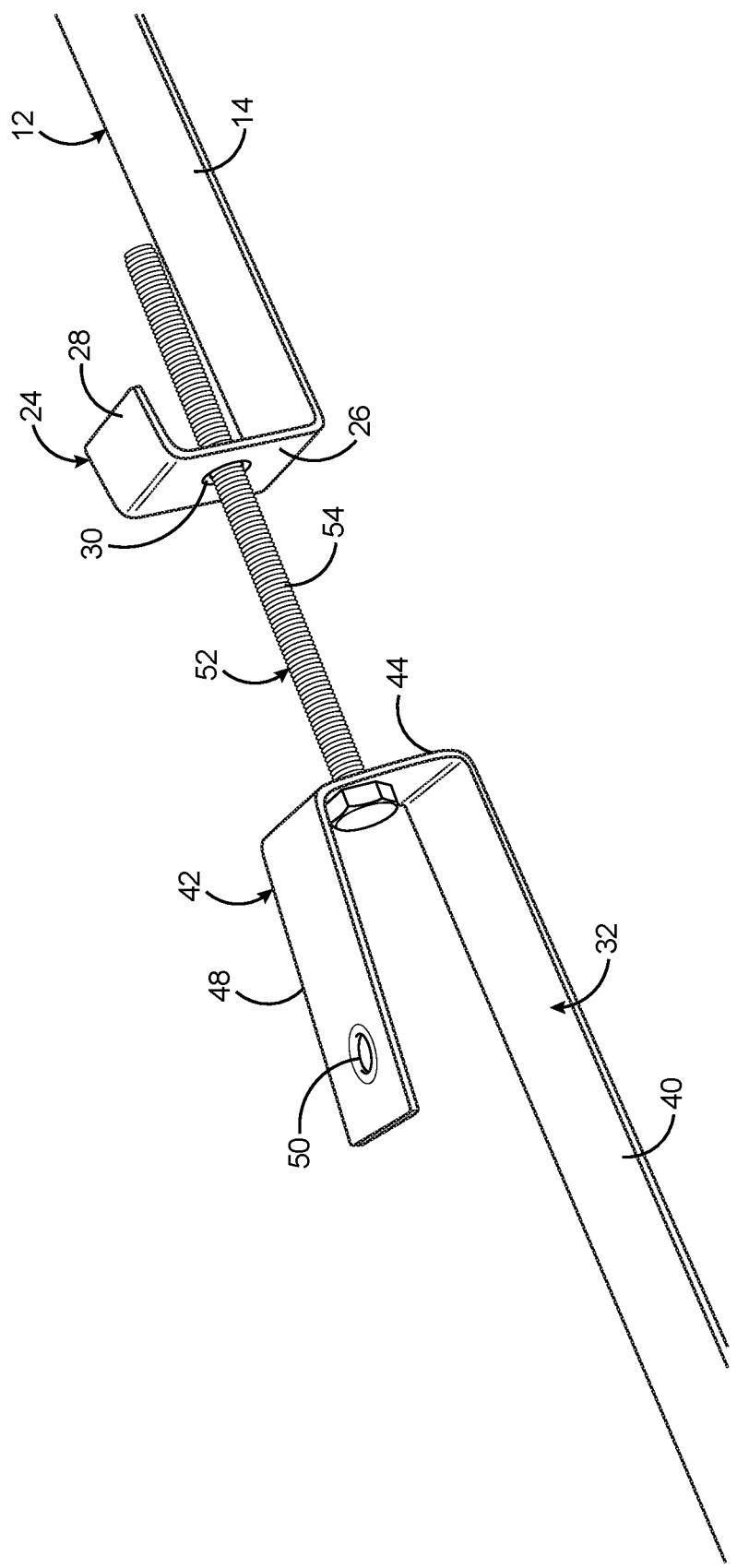
FIG. 5 is a perspective view of the second clamp portion connected to the first clamp portion utilizing the connecting screw in accordance with the preferred embodiment of the present invention.

As shown in FIGS. 2 and 3, when the first clamp portion 12 is in contact with the front portion 82 of the tile 60, the first top base portion 18 of the first clamp portion 12 meets a top edge 62 of the tile 60, the first top hooked portion 20 is attached around a rear portion 64 of the tile 60 and the first elongated member 14 is attached on the front portion 82 of the tile 60. As shown in FIG. 4, the second clamp portion 32 is attached opposite to the first clamp portion 12 on the tile 60. When the second clamp portion 32 is mounted opposite to the first clamp portion 12 and around the front portion 82 on the tile 60, the second bottom base portion 36 is attached to a bottom edge 66 of the tile 60, the second bottom hooked portion 38 (FIG. 1) is attached around the rear portion 64 of the tile 60 and the second elongated member 40 is attached on the front portion 82 of the tile 60. In the preferred method, no sharp fastening members are utilized by the conduit mounting assembly 10 for mounting the first clamp portion 12 and the second clamp portion 32 on the tile 60 thereby protecting the tile 60 from possible damage. As shown in FIG. 5, the first clamp portion 12 is connected to the second clamp portion 32 by inserting the connecting screw 52 through the third side hole 46 (FIG. 1) of the second clamp portion 32 and a second side hole 30 of the first clamp portion 12. The connecting screw 52 is firmly bolted utilizing a tightening means. The first screw thread 54 is designed to tightly fasten the connecting screw 52. When the first clamp portion 12 and the second clamp portion 32 are firmly connected with each other, the first elongated member base portion 26 forms a 90-degree inclination with the first bottom base portion 26 of the first bottom hook 24. The 90-degree inclination indicates that the first clamp portion 12 is firmly connected to the second clamp portion 32 utilizing the connecting screw 52 to apply sufficient clamping load on the roofing tile to adequately hold the conduit 72 in place on the roof. In one configuration, a near 90-degree inclination is acceptable. In another configuration, the 90-degree inclination is constant and not effected by tightening the connecting screw 52.

As may be apparent from a viewing of the components in FIG. 1, they are reversible. Said again with an exemplary case being first clamp portion 12, first bottom base portion 26 and first top base portion 18 are reversible. Whereas in this exemplary case, the first bottom base portion 26 may support the hooking of tiles of 1 inch or less thickness, for thicker tiles, the wider first top base portion 18 may be attached around the rear portion 64 of the tile 60. As may be expected, hole 22 and hole 30 are preferably interchangeable.

Figure 6:
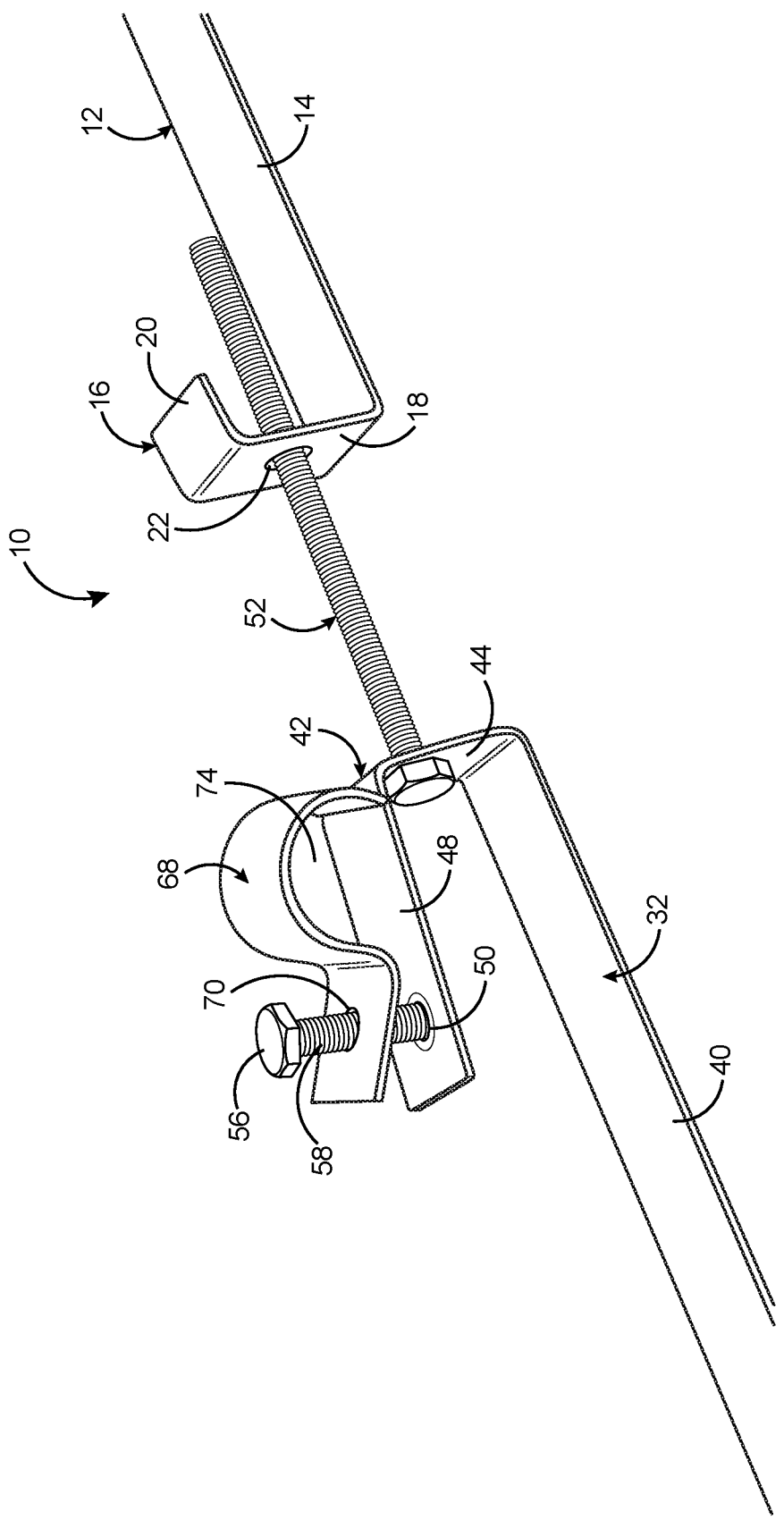
FIG. 6 is a perspective view of a conduit fastening member positioned over the first clamp portion in accordance with the preferred embodiment of the present invention.
Figure 7:
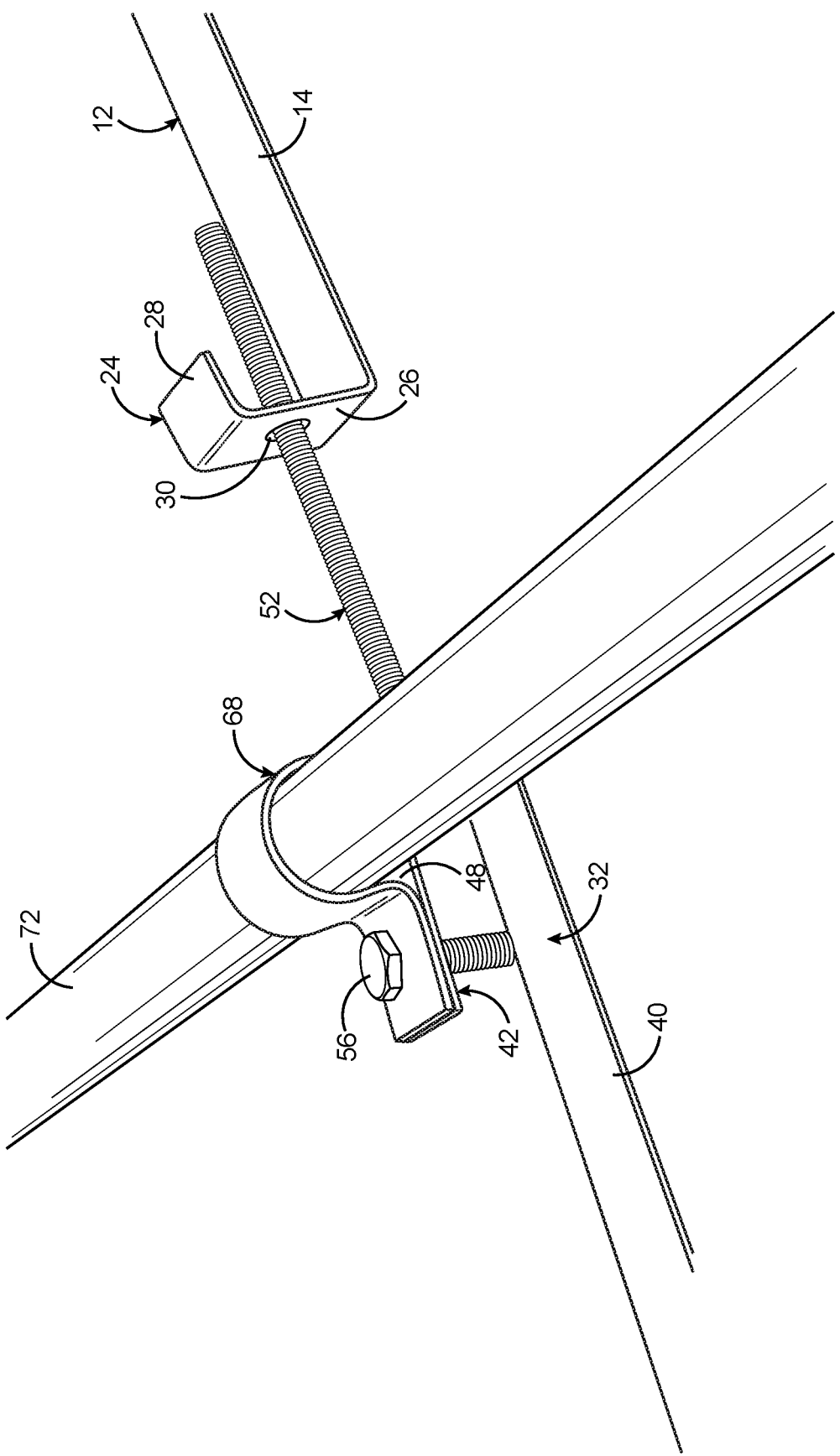
FIG. 7 is a perspective view of the conduit mounted on the second clamp portion connected to the conduit fastening member in accordance with the preferred embodiment of the present invention.

As shown in FIGS. 6 and 7, the conduit 72 is firmly mounted on the second clamp portion 32 by inserting the conduit 72 through a conduit opening 74 of a conduit fastening member 68. The conduit securement screw 56 is inserted through a fastening hole 70 at the conduit fastening member 68 and the first top hole 50 at the second top hooked portion 48. Although in a preferred embodiment there is just one first top hole 50 at the second top hooked portion 48, in alternative embodiments there may be a set of first top holes, the set including two or more. The conduit securement screw 56 is then bolted utilizing the tightening means. In this way, the conduit 72 is firmly mounted on the second clamp portion 32 connected to the conduit fastening member 68. In the preferred embodiment, the second top hooked portion 48 of the second clamp portion 32 is longer than the second bottom hooked portion 38 for firmly mounting the conduit 72 thereon. It is noted that in FIG. 6 the reversibility of first clamp portion 12 is shown. Furthermore, it can be seen that conduit securement screw 56 is approaching the second clamp portion 32 such that if downward pressure is placed on the conduit fastening member 68, conduit securement screw 56 would be urged downwards and would actually touch second clamp portion 32, thereby taking further pressure off other components in the system. This effect can be particularly useful when weight is added to the system, either through accumulating snow or in the case where an installer, user or homeowner were to step on the components involved.

Figure 8:
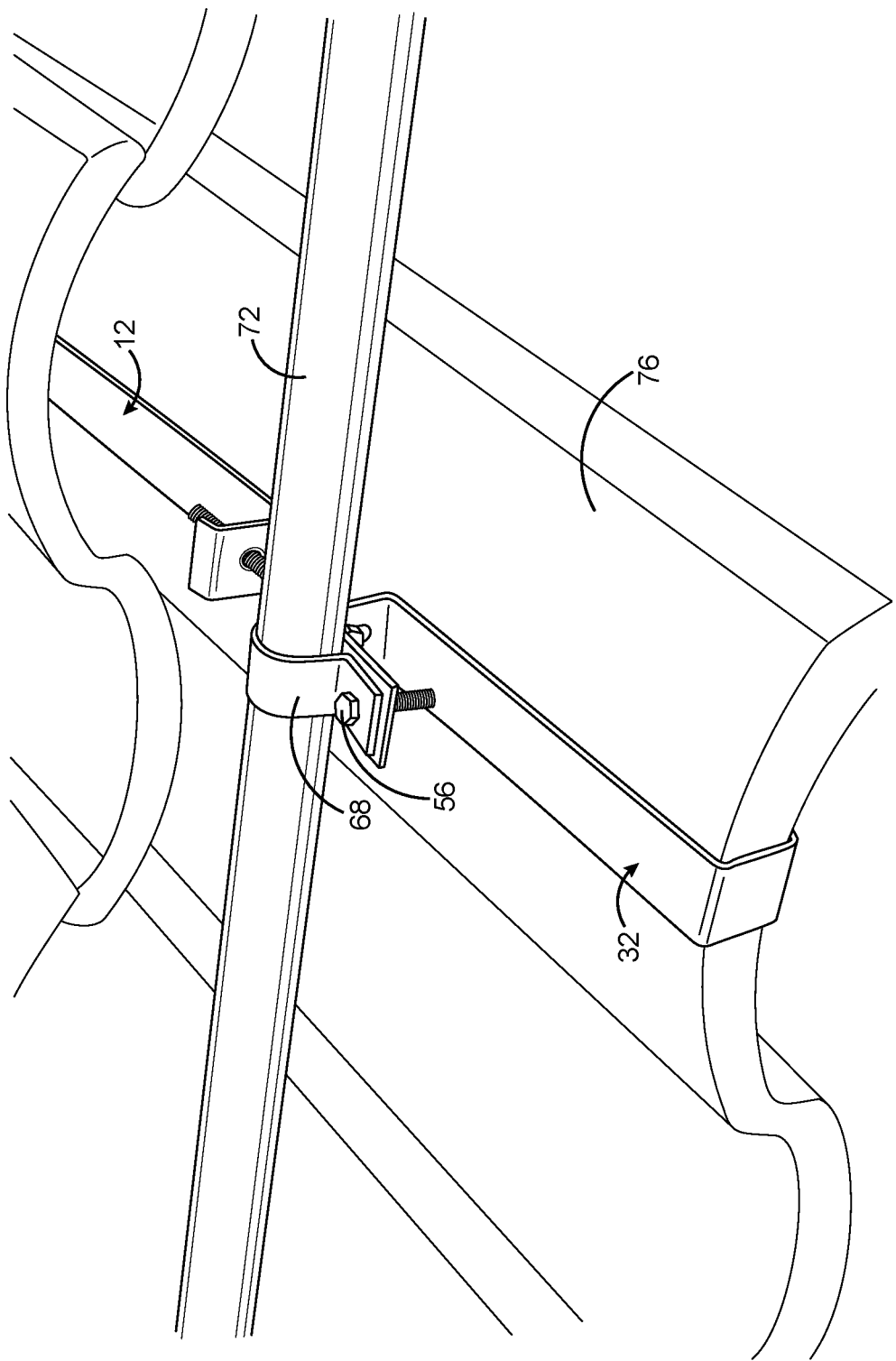
FIG. 8 is a perspective view of the conduit mounted on a curved tile in accordance with the preferred embodiment of the present invention.

The above-mentioned method is utilized to install the first and the second clamp portions 12, 32 on flat tiles or tiles of other shapes; however, any surface having two ends around which each of the top or bottom hook can be secured around is an acceptable surface for use with the conduit mounting assembly 10 and method. FIG. 8 illustrates the conduit mounting assembly 10 mounted on a curved tile 76. The mounting assembly 10 is rigid such that it will be firmly attached to the curved tile 76 without swaying.

Figure 9:
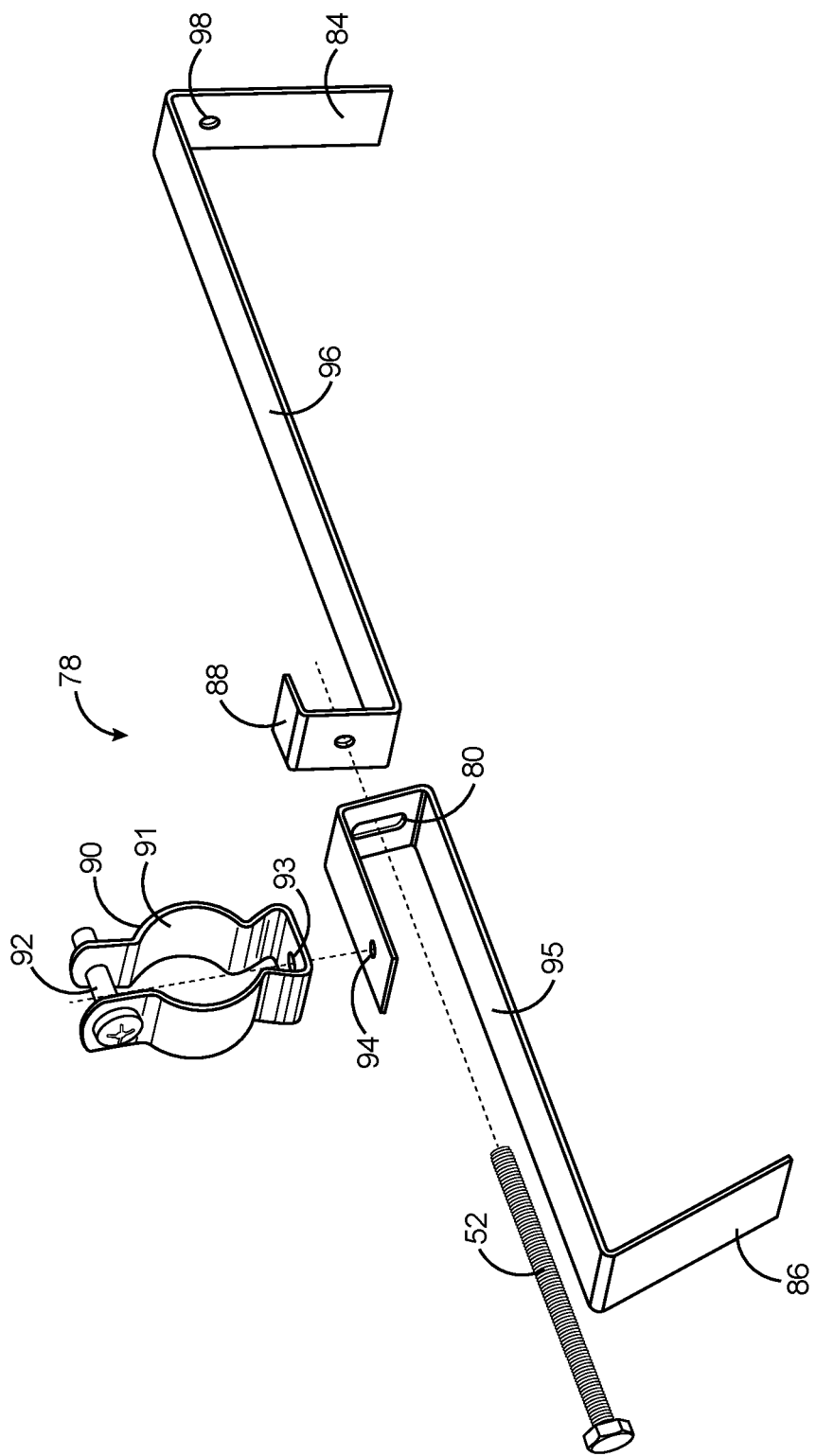
FIG. 9 is an exploded view of another embodiment of the conduit mounting assembly in accordance with the preferred embodiment of the present invention.

In yet another alternative configuration shown in FIG. 9, the conduit mounting assembly 78 is utilized to install the first clamp portion 12 and the second clamp portion 95 on a surface that does not allow each of the respective hooks 84, 86 to wrap around, such as a surface having a thickness too large for the respective hooks 84, 86 to wrap around. The conduit opening 91 of the conduit fastening member 90 is designed to receive the conduit 72. The conduit fastening member 90 is firmly mounted on the second clamp portion 95 utilizing the conduit securement screw 56 (FIG. 8) and a top fastening screw 92. The conduit securement screw 56 is inserted through a base hole 93 of the conduit fastening member 90 and the first top hole 94. The conduit securement screw 56 is tightened to firmly mount the conduit 72 received by the conduit opening 91 on the second clamp portion 95 connected to the conduit fastening member 90. In this case, the hooks 84, 86 those would otherwise wrap around the surface instead just lay flat against the side of the surface as shown in FIG. 9. The top fastening screw 92 provides additional support to the conduit 72 mounted on the second clamp portion 95. The conduit mounting assembly 78 accepts a wide variety of pipe clamps and is designed to hold/support a variety of objects on a tile roof. As shown in FIG. 9, the first top hook 84 and the second bottom hook 86 are designed to attach to tiles having greater than one inch thickness, and theoretically, of any thickness. Further, the first bottom hook 88 is designed to attach to tiles having less than one inch thickness. In this alternate embodiment, the first top hook 84 and the first bottom hook 88 can be reversibly attached to the top edge 62 of the tile 60.

Figure 10:
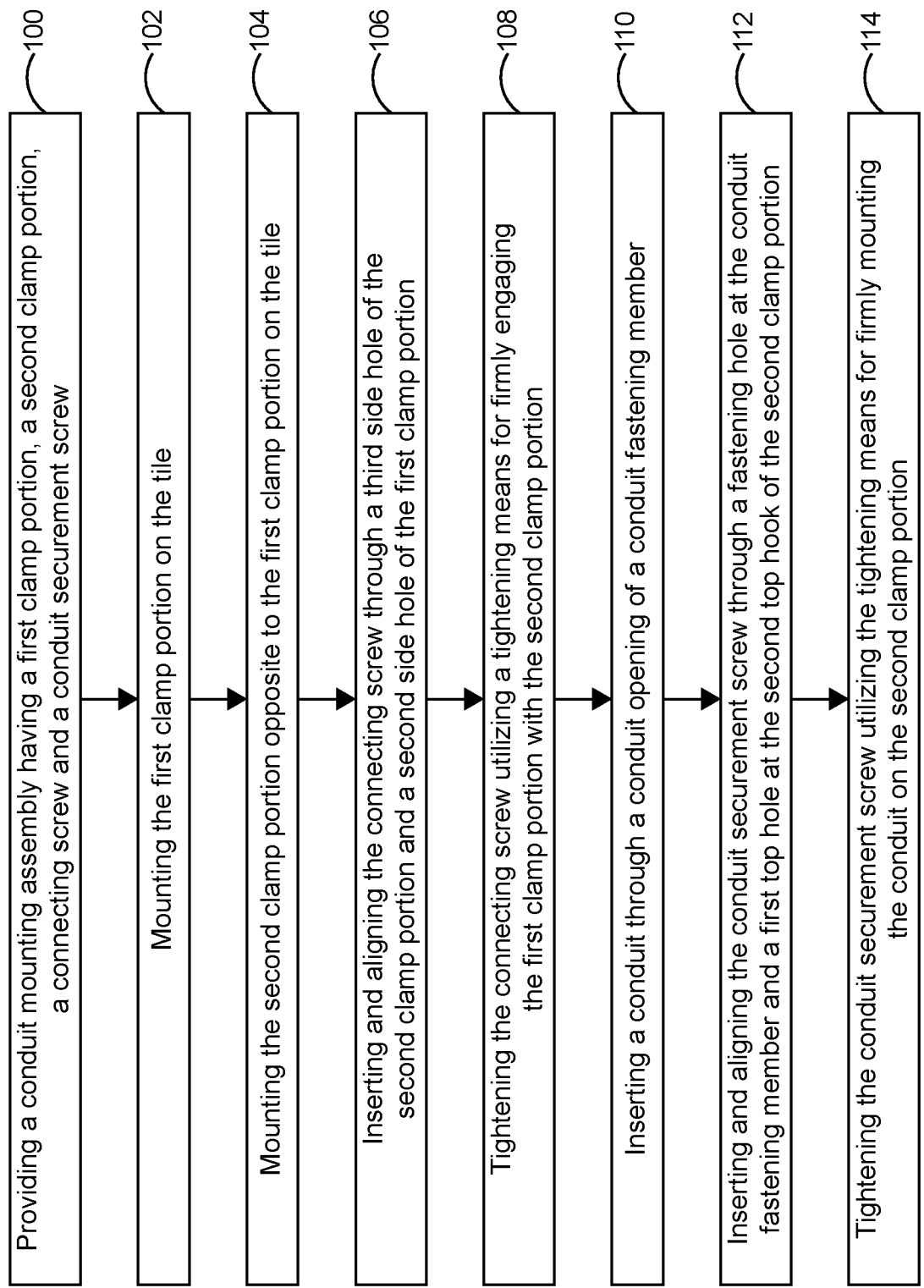
FIG. 10 is a flowchart of a method for mounting the conduit utilizing the conduit mounting assembly in accordance with the preferred embodiment of the present invention.

FIG. 10 illustrates a flowchart of the method for mounting the conduit 72 on the tile 60. The method commences by providing the conduit mounting assembly as shown in block 100. Next, the first clamp portion is in contact with the front portion of the tile as shown in block 102. Thereafter, the second clamp portion is mounted opposite to the first clamp portion on the tile as shown in block 104. Upon mounting the second clamp portion, the first clamp portion is connected to the second clamp portion by inserting and aligning the connecting screw through the third side hole of the second clamp portion and the second side hole of the first clamp portion as indicated at block 106. Next, the connecting screw is tightened to the tightening means for firmly engaging the first clamp portion with the second clamp portion as shown in block 108. The conduit is inserted through the conduit opening of the conduit fastening member as indicated at block 110. Thereafter, the conduit securement screw is inserted and aligned through the fastening hole at the conduit fastening member and the first top hole at the second clamp portion as shown in block 112. Finally, the conduit is firmly mounted to the second clamp portion connected to the conduit fastening member by tightening the conduit securement screw utilizing the tightening means as indicated at block 114.

Figure 11:
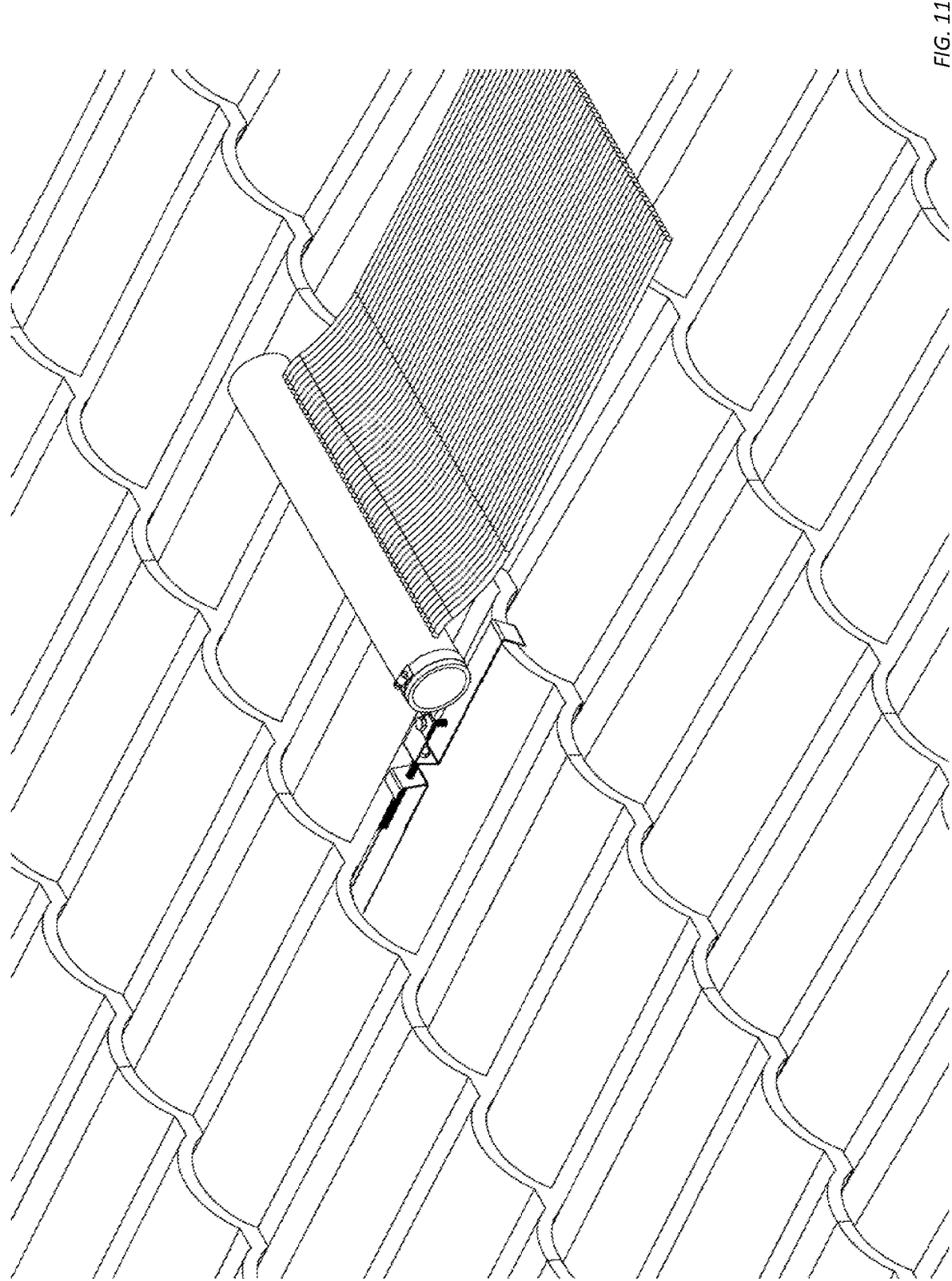
FIGS. 11-90 are various views of alternative embodiments of the invention.
Figure 12:
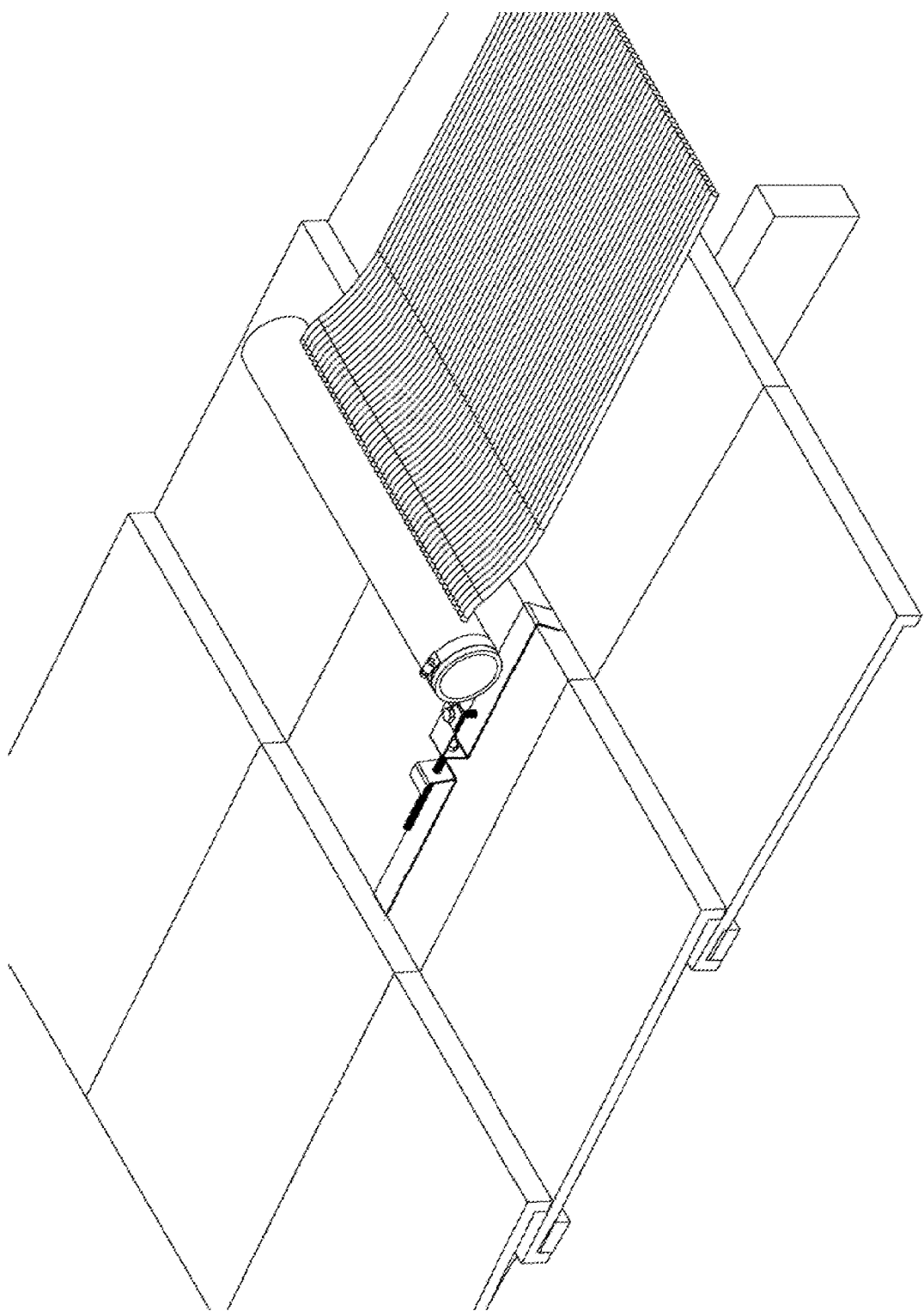
Figure 13:
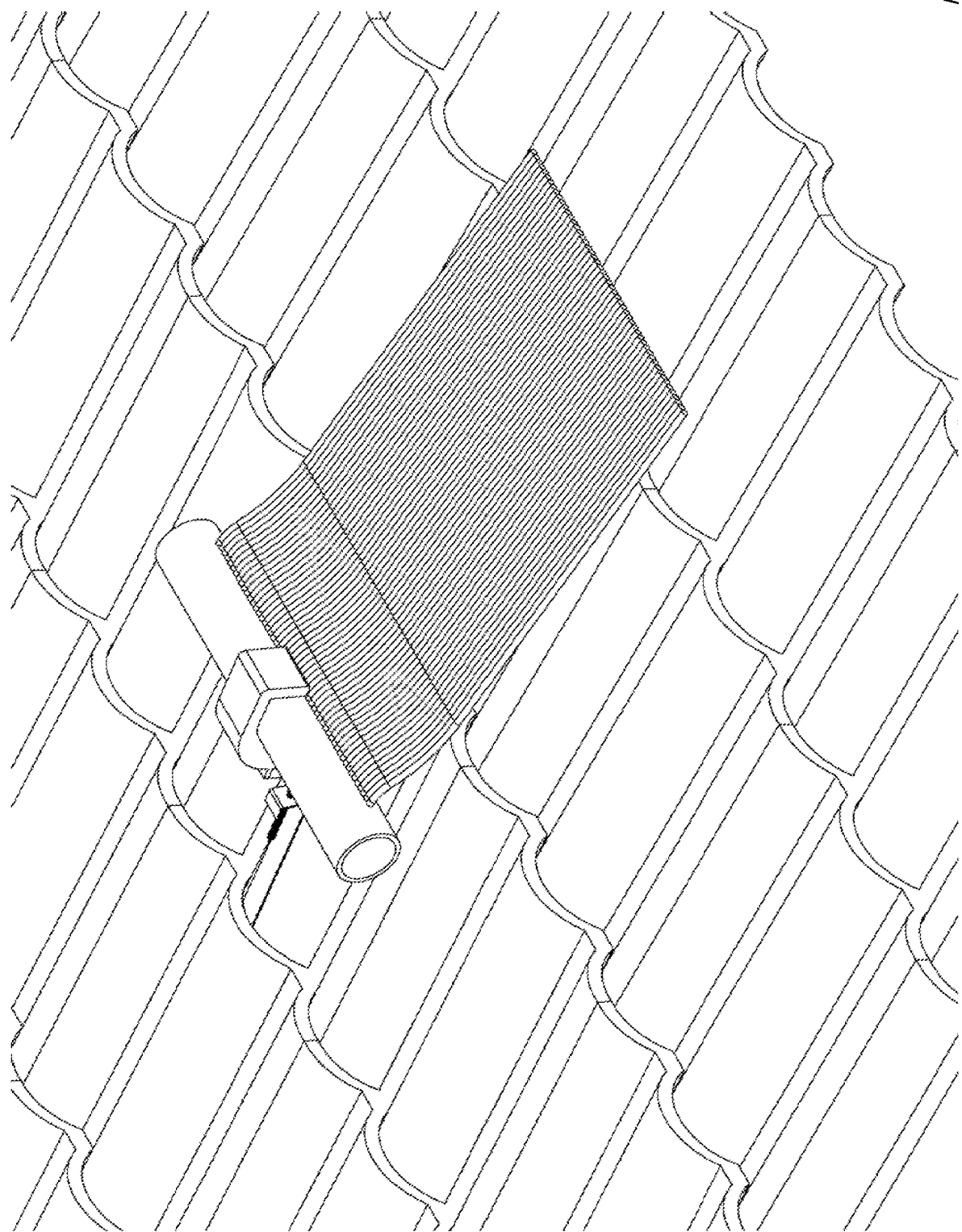
Figure 14:
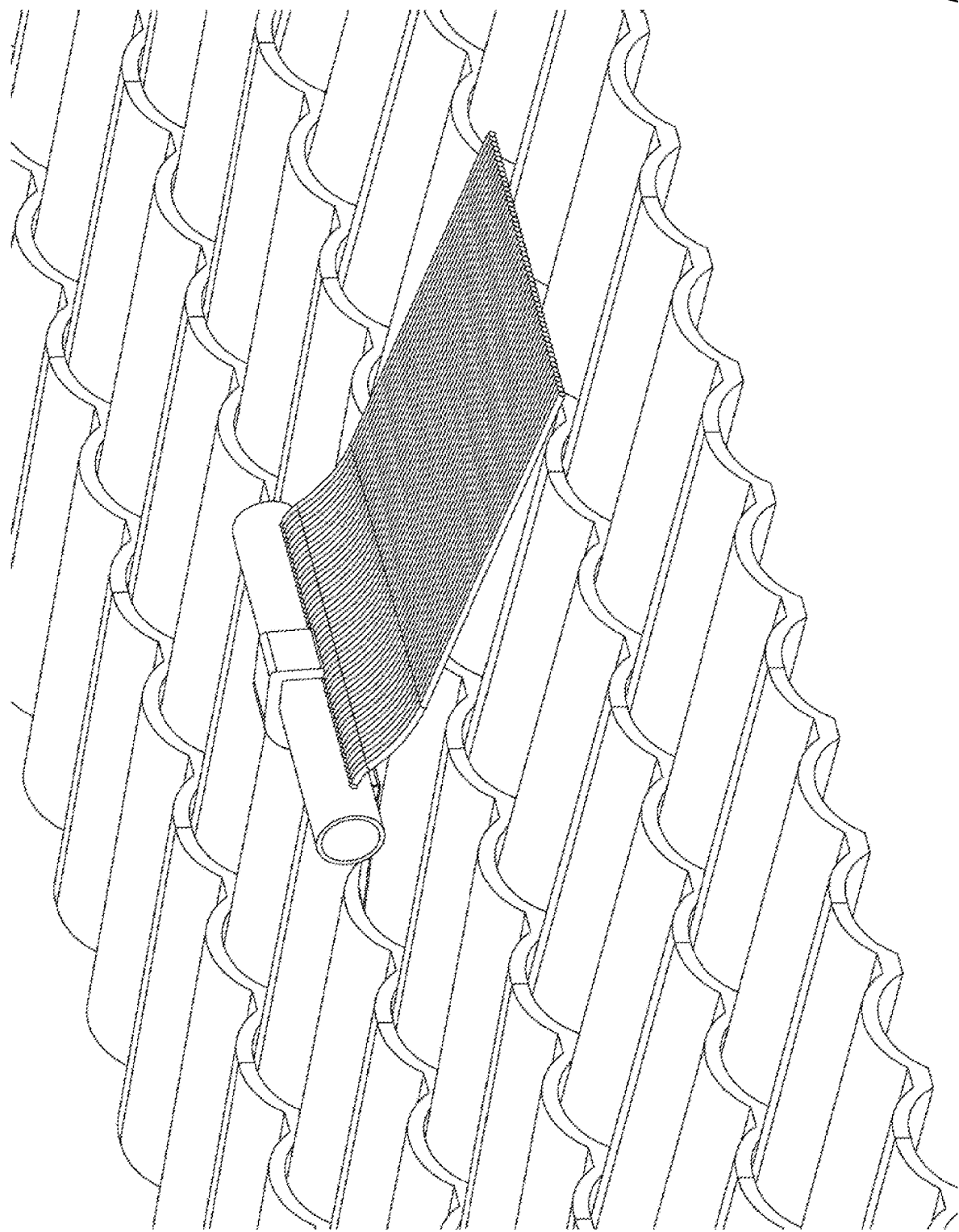
Figure 15:
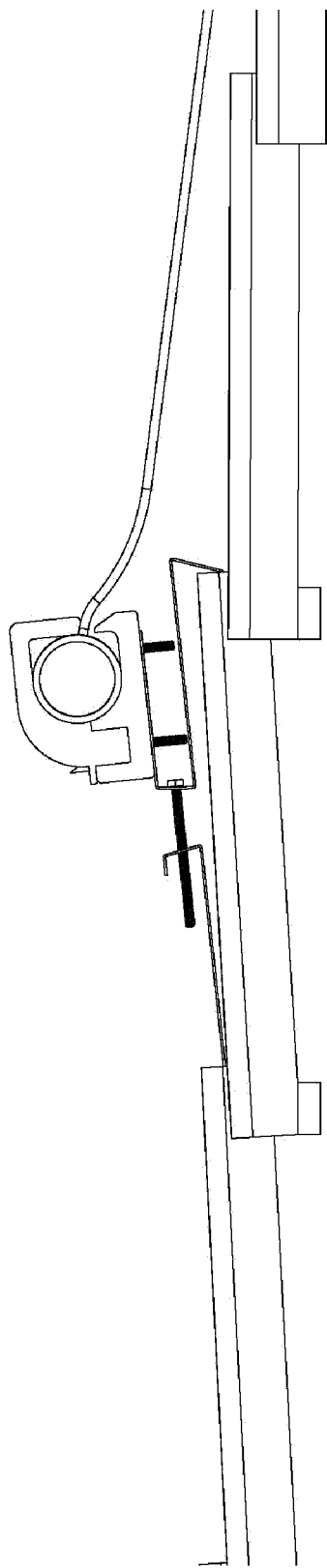
Figure 16:
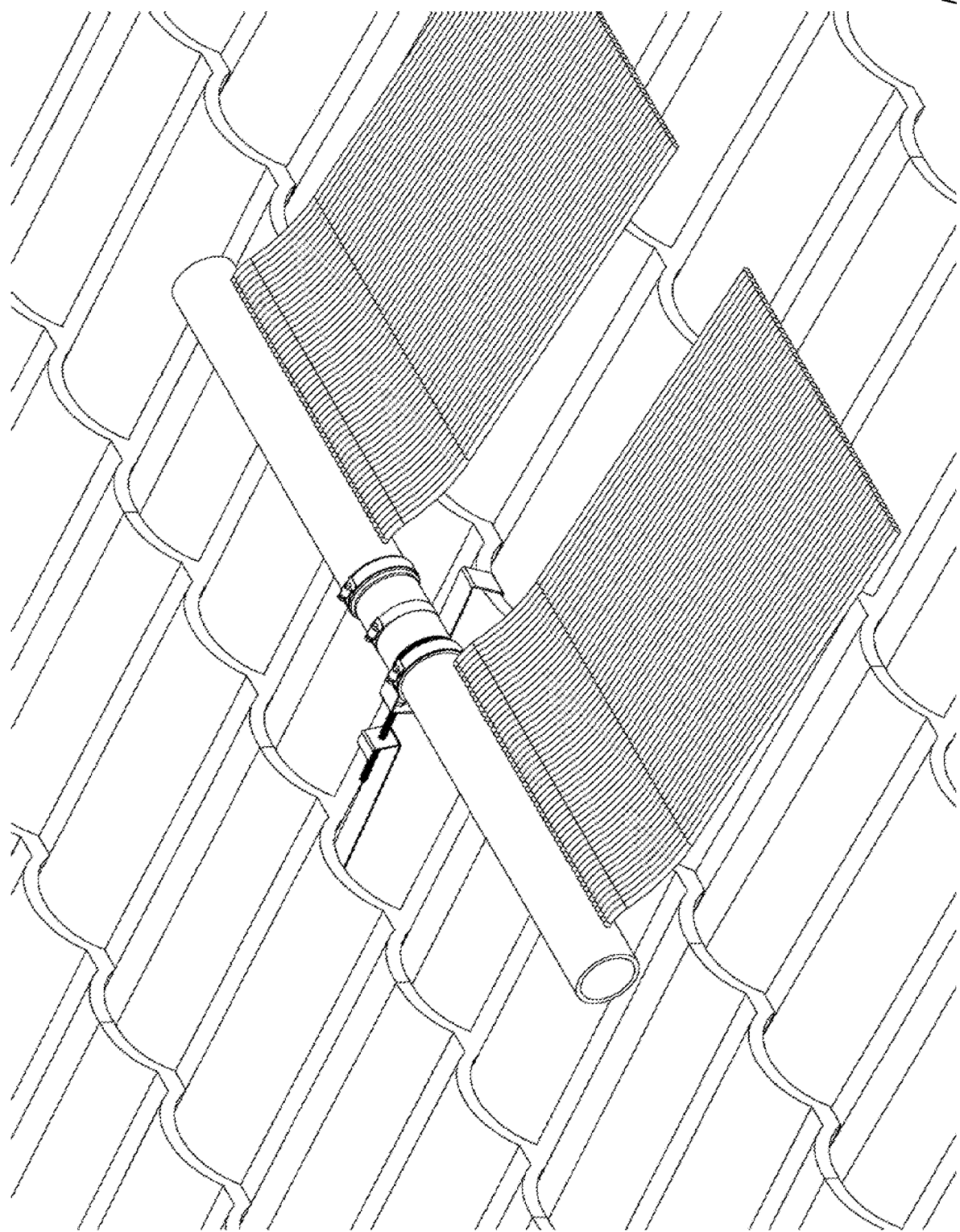
Figure 17:
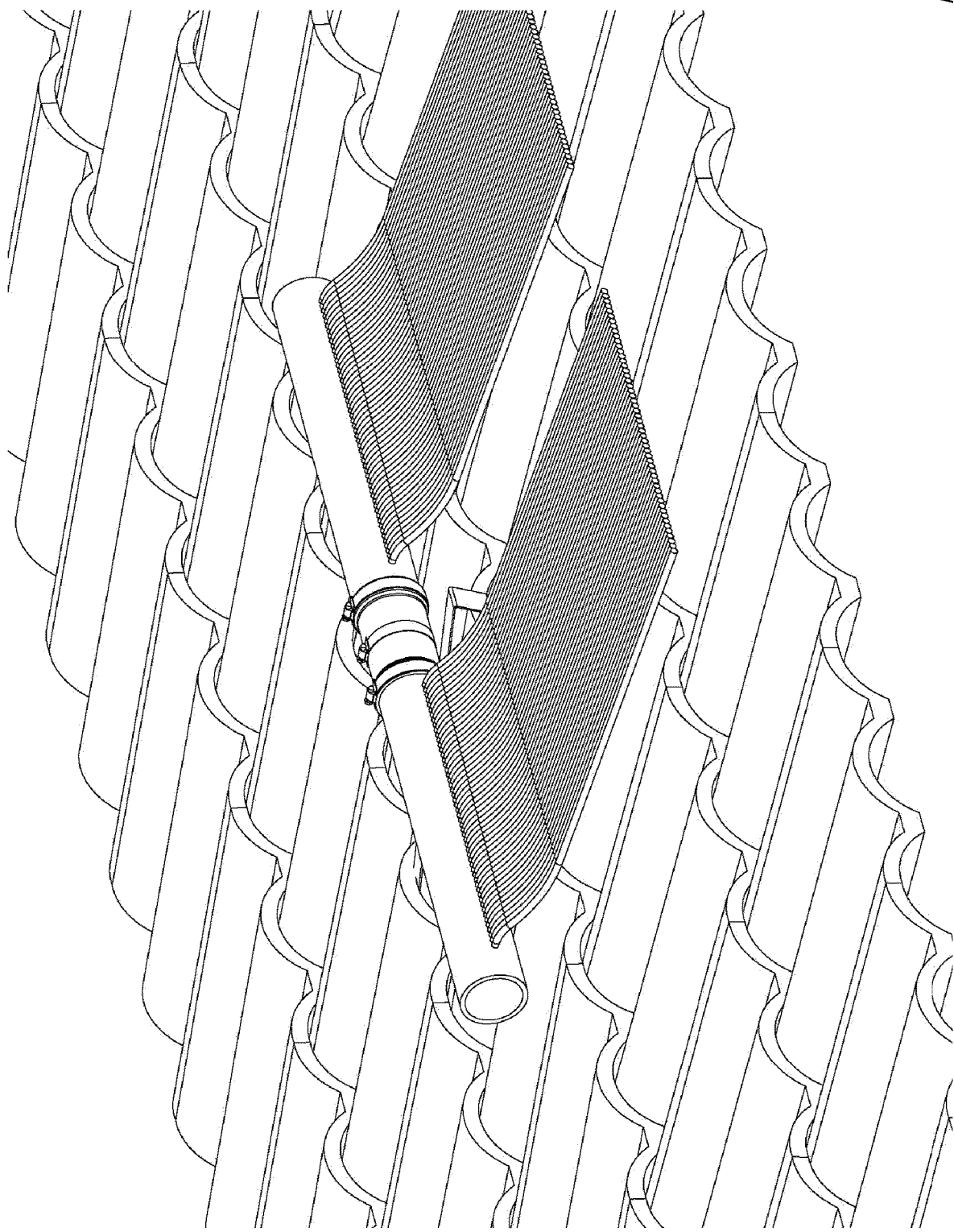
Figure 18:
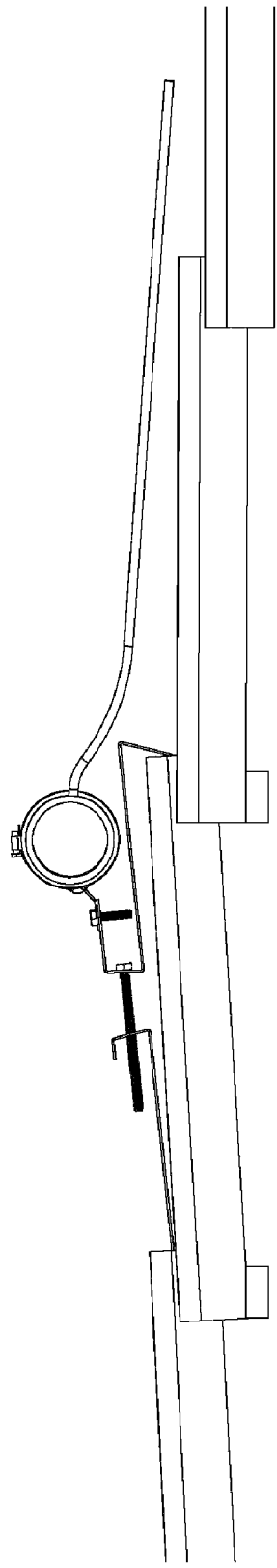
Figure 19:
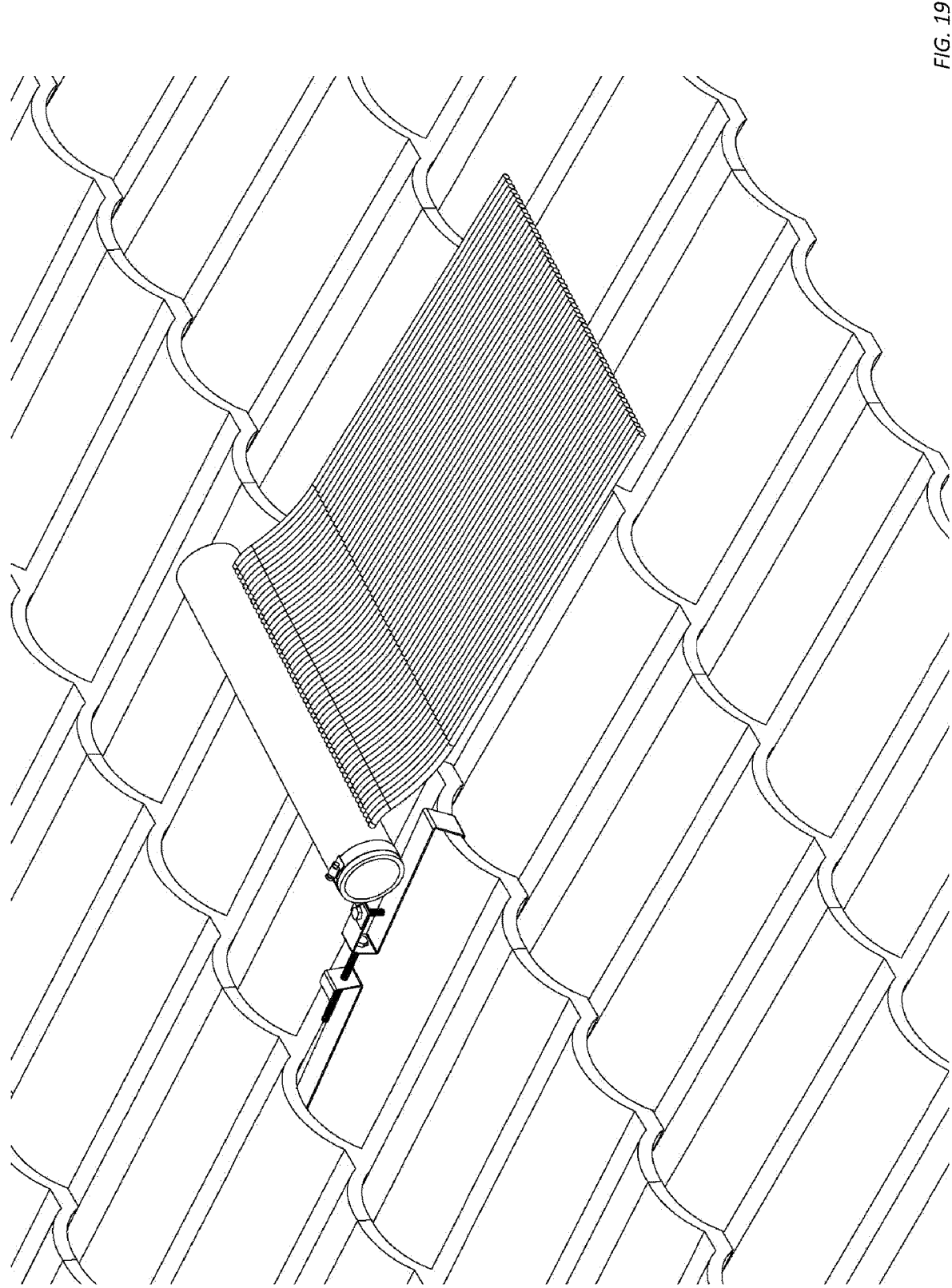
Figure 20:
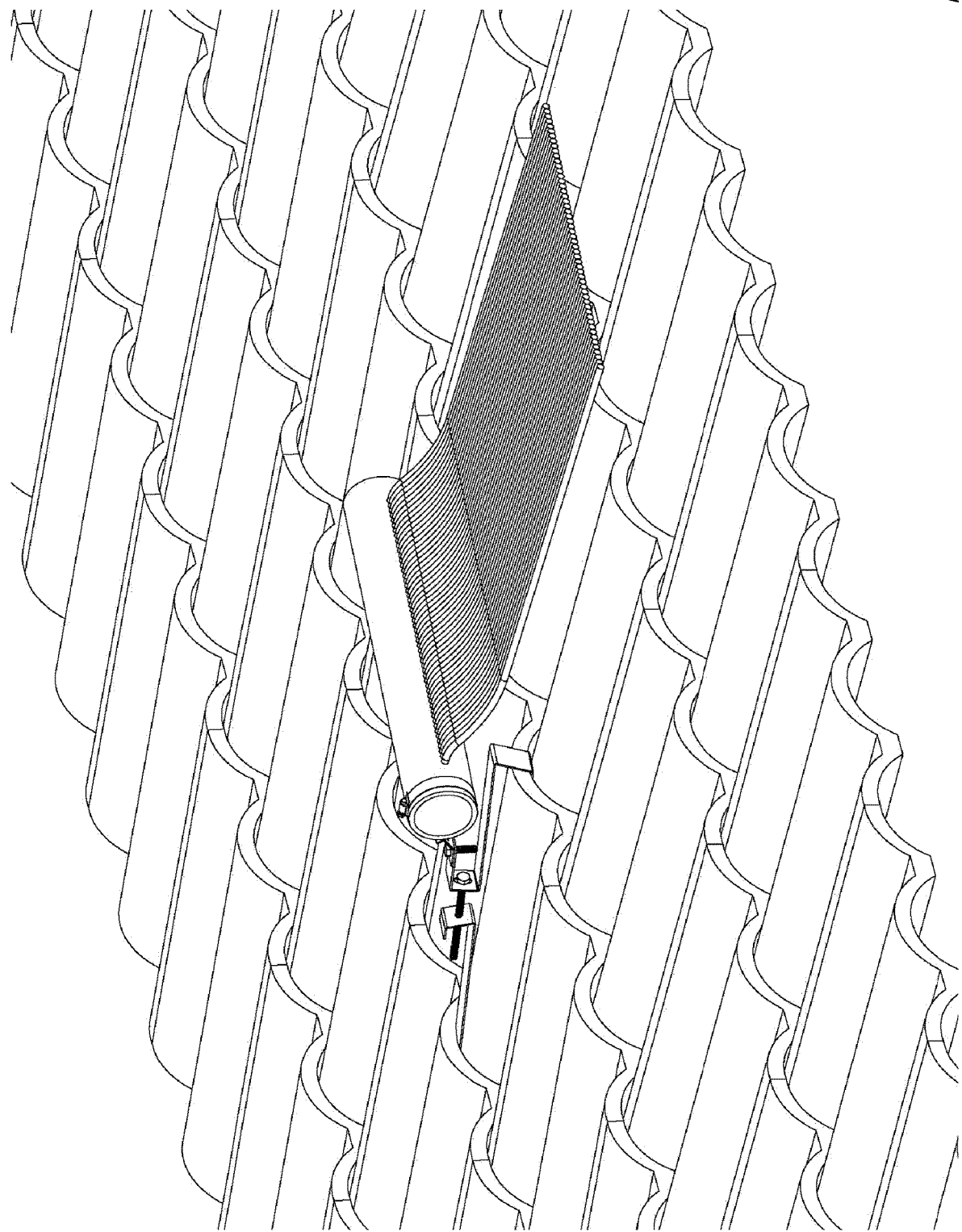
Figure 21:
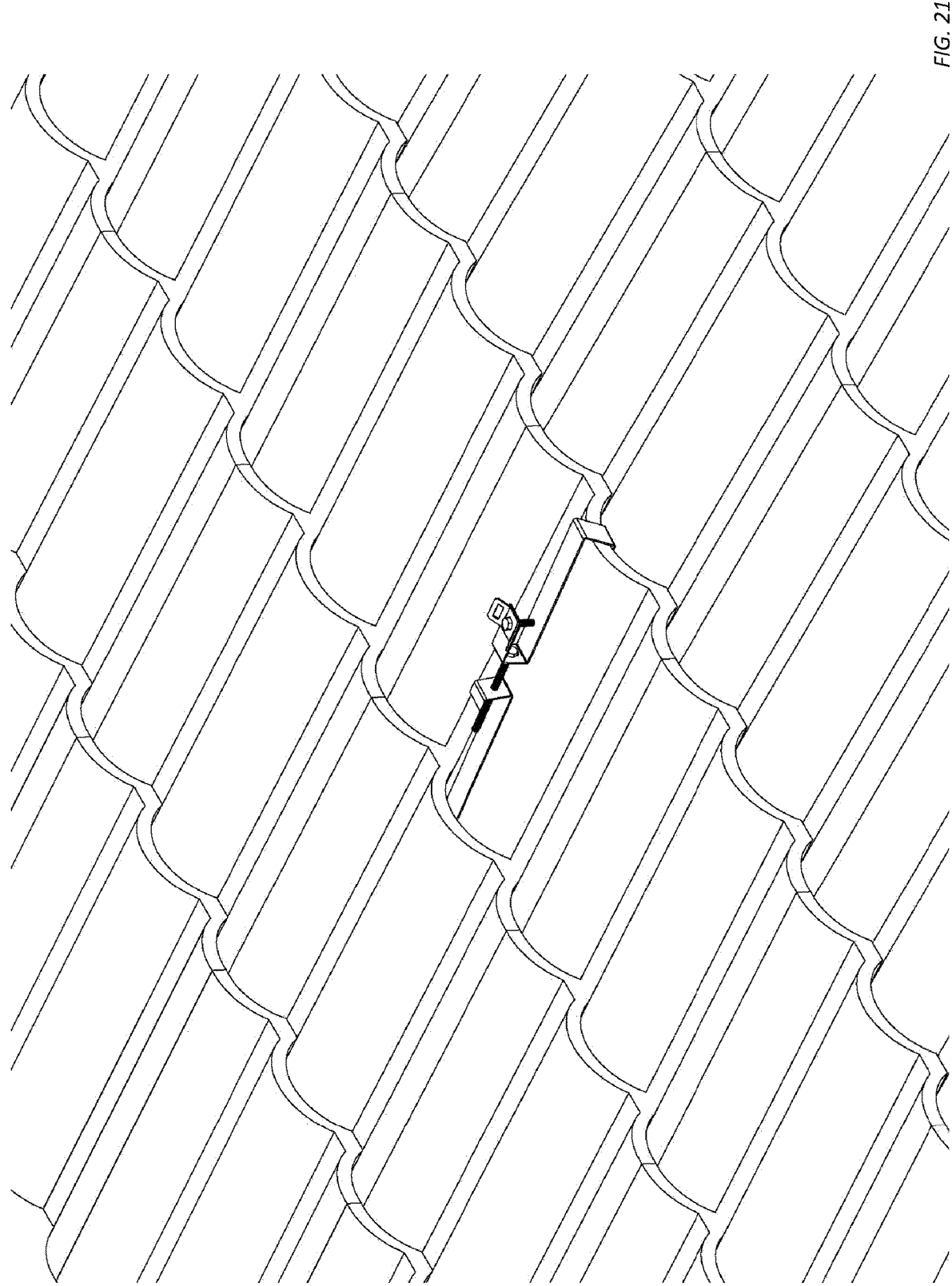
Figure 22:
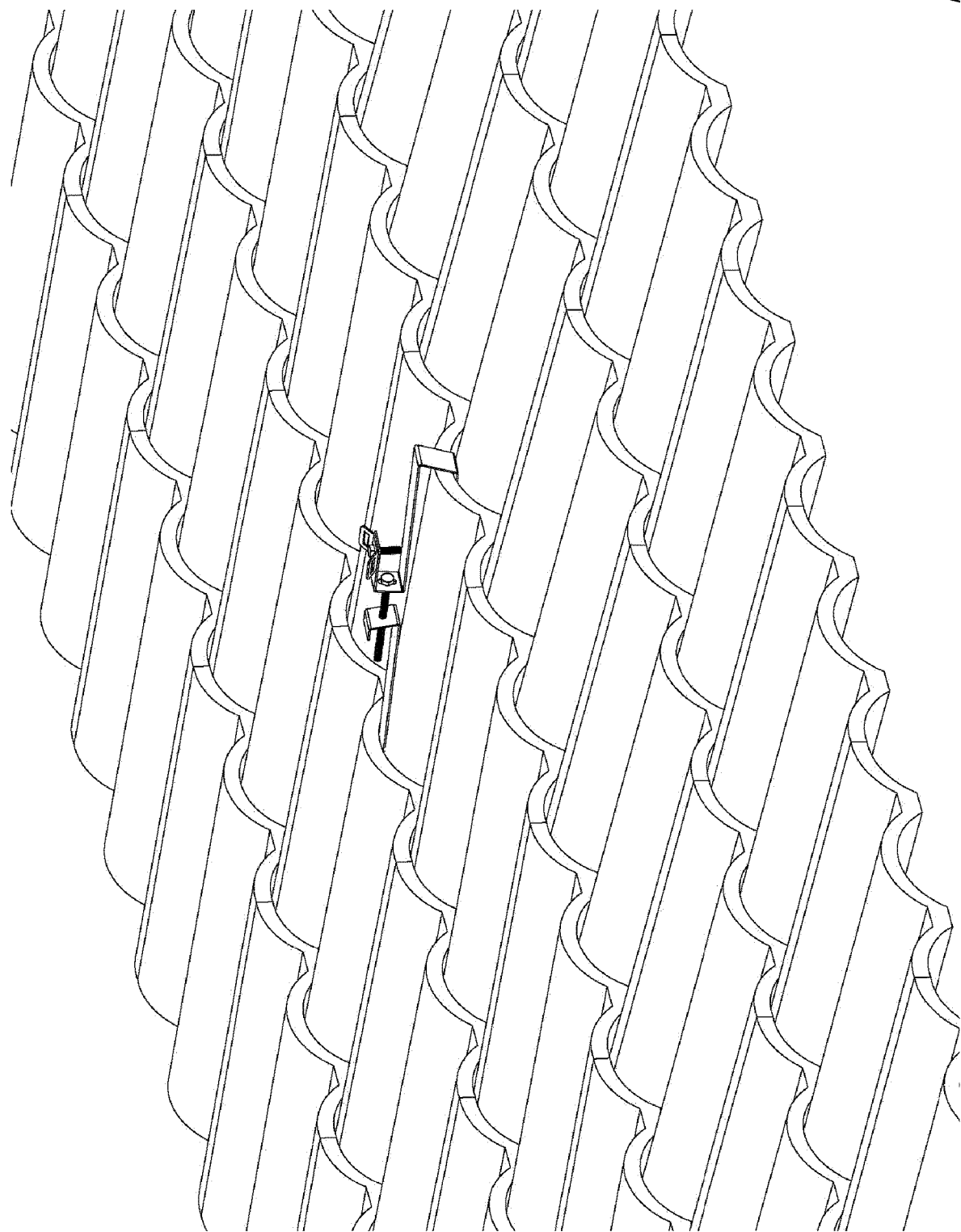
Figure 23:
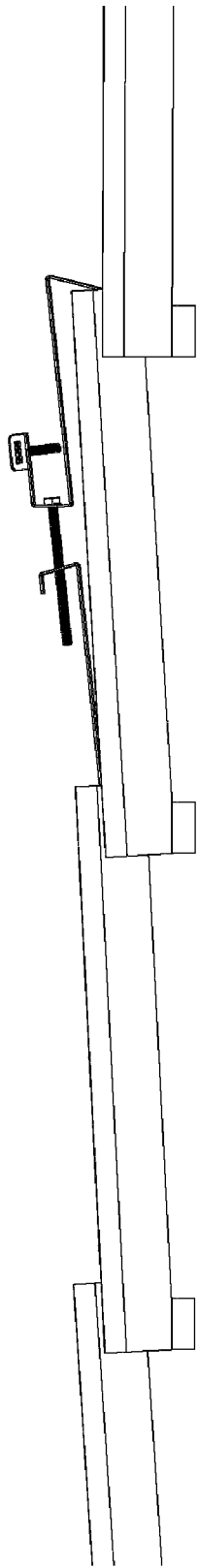
Figure 24:
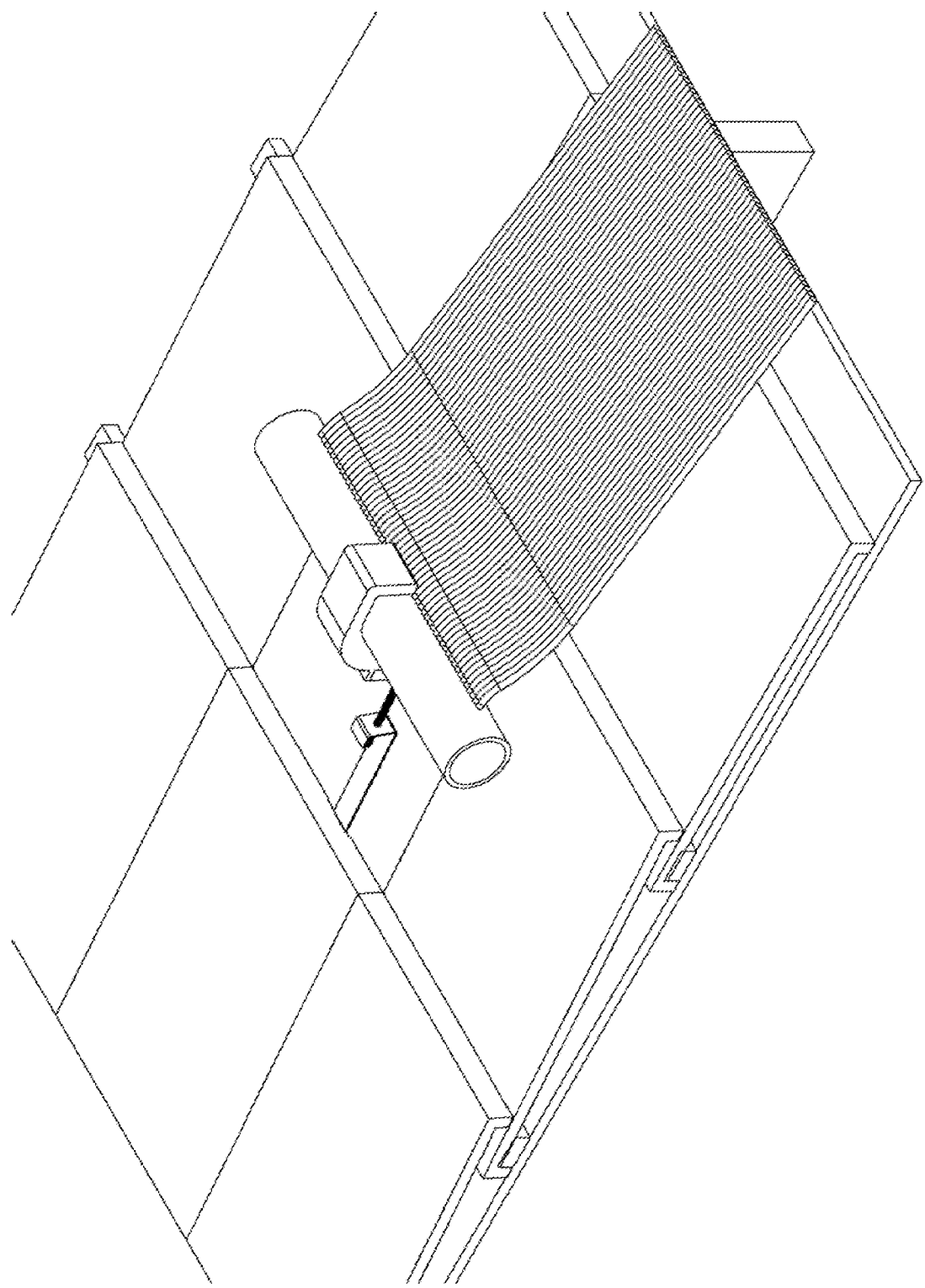
Figure 25:
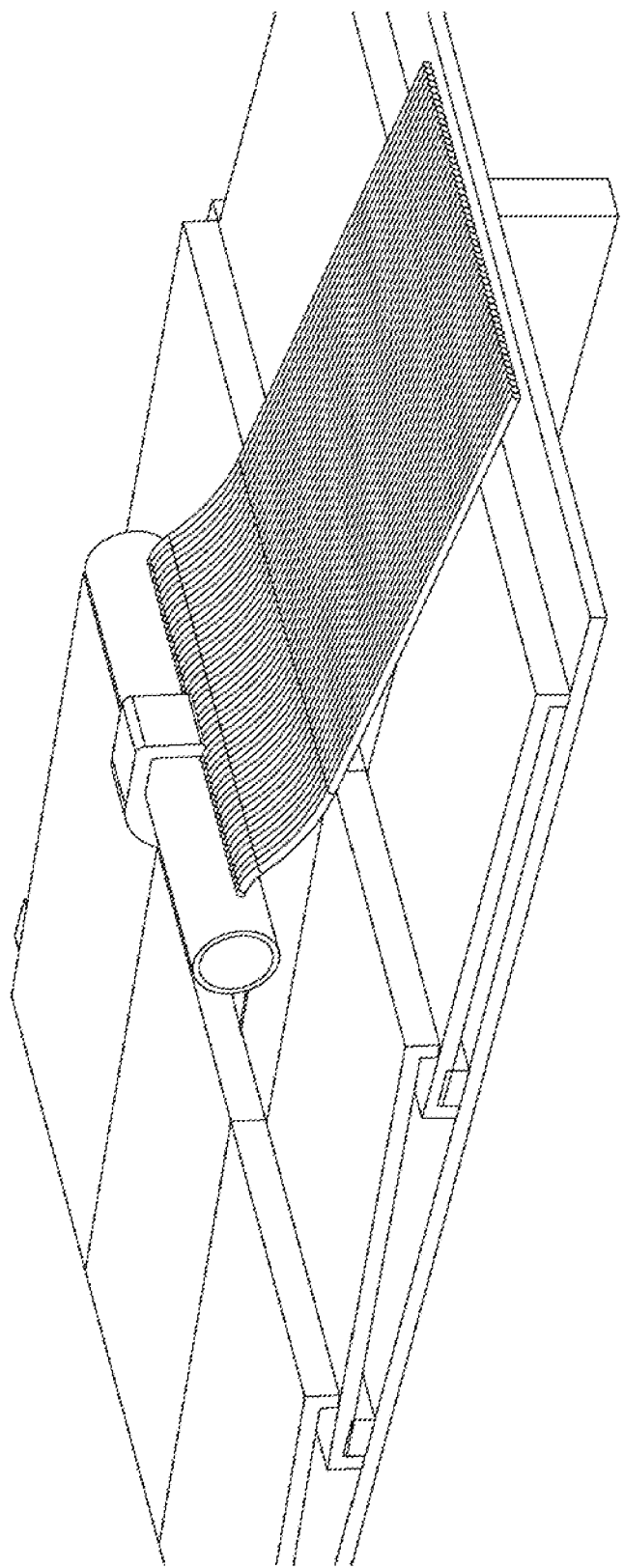
Figure 26:
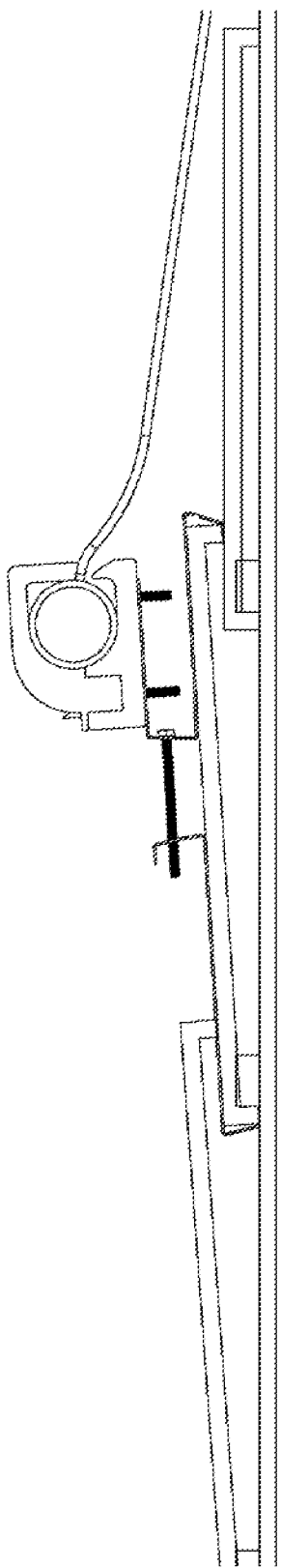
Figure 27:
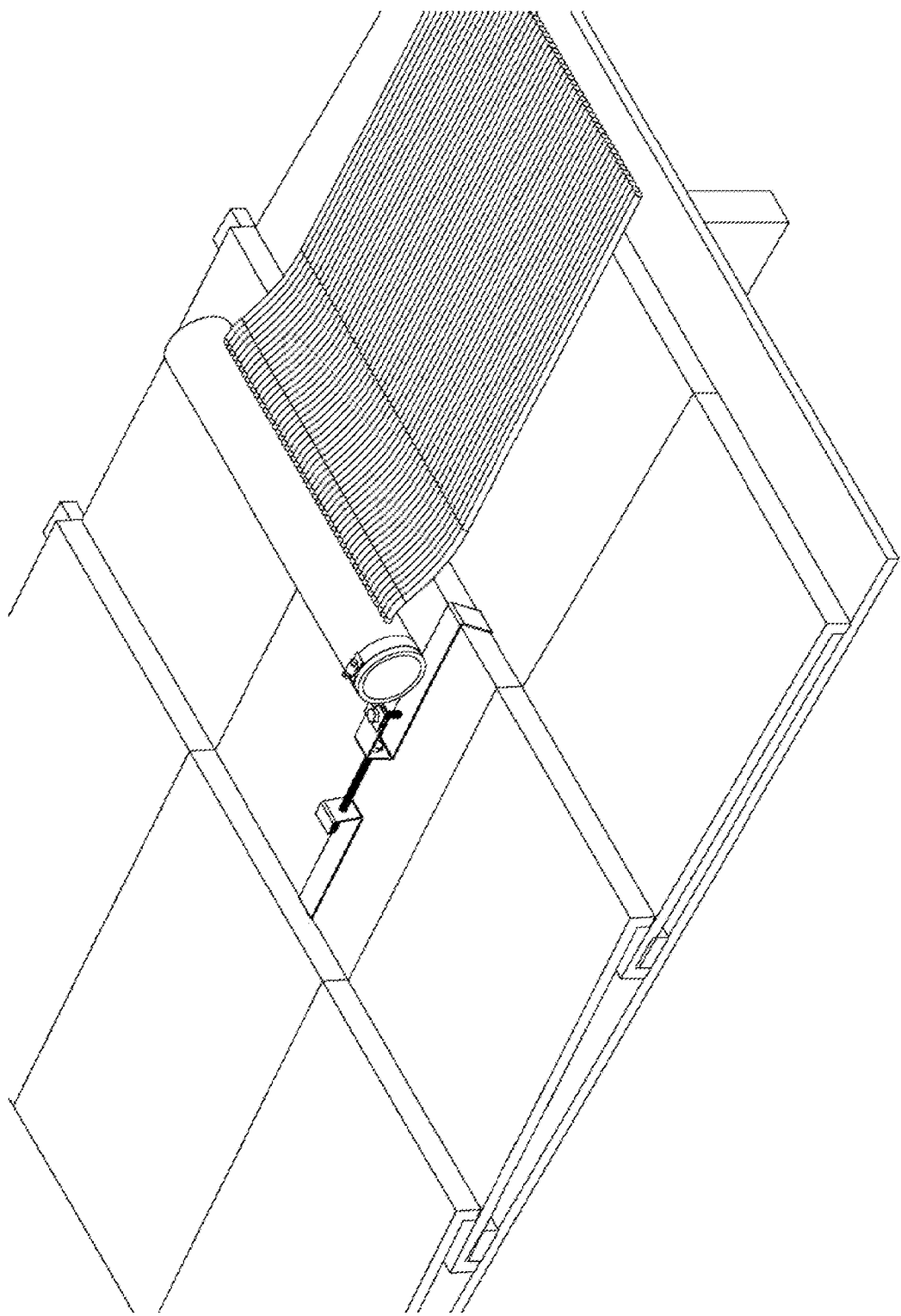
Figure 28:
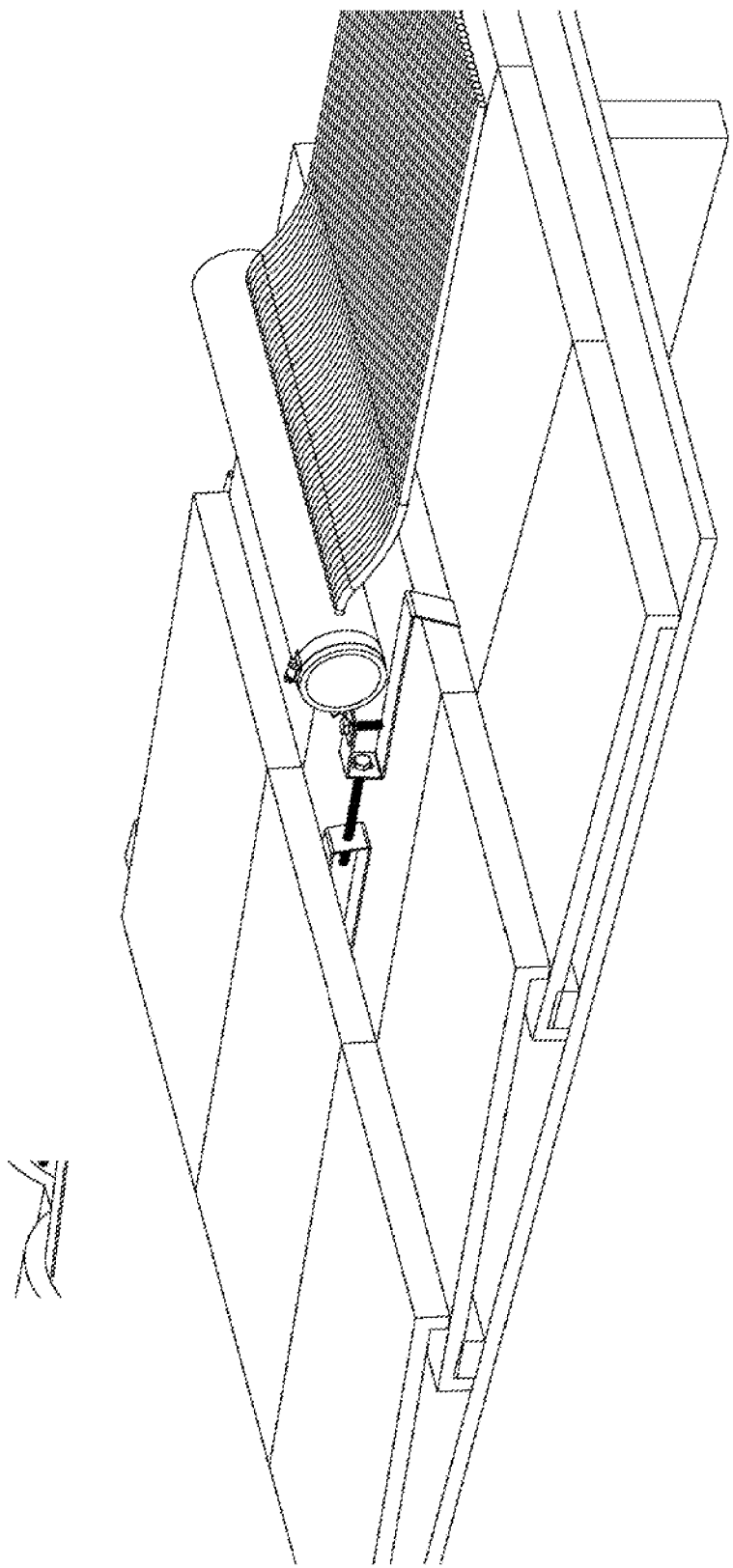
Figure 29:
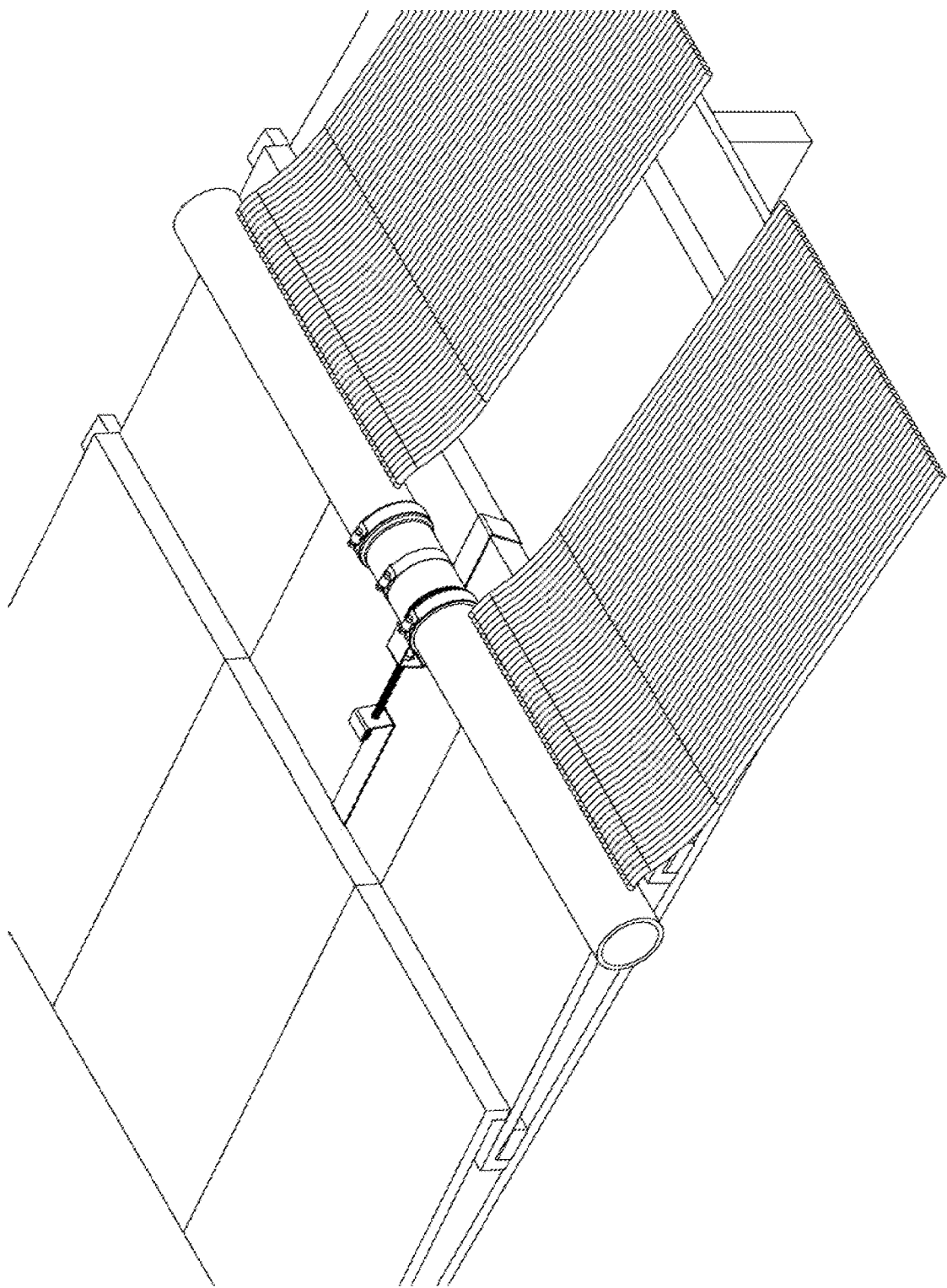
Figure 30:
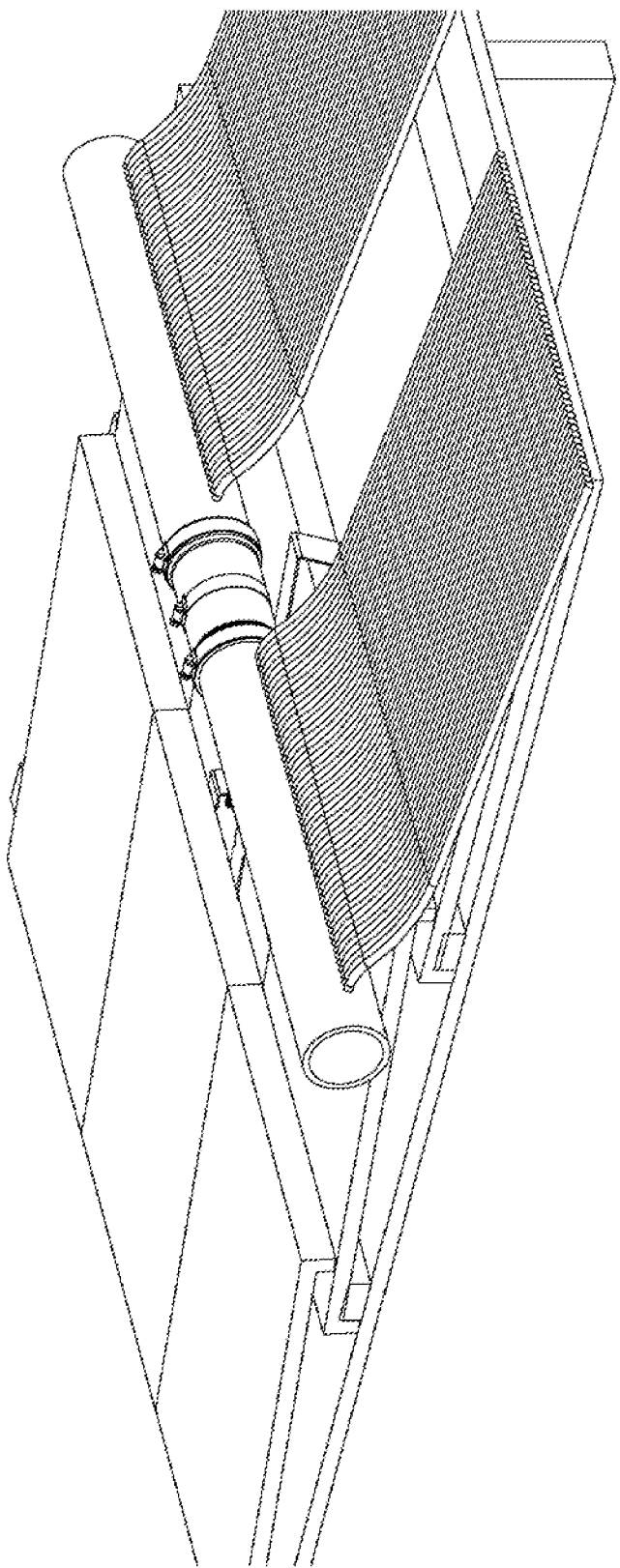
Figure 31:
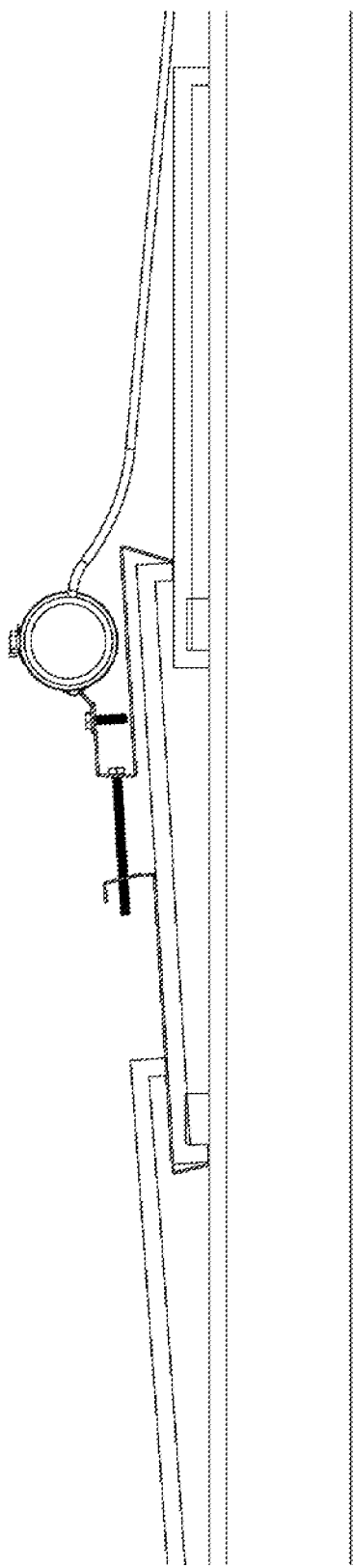
Figure 32:
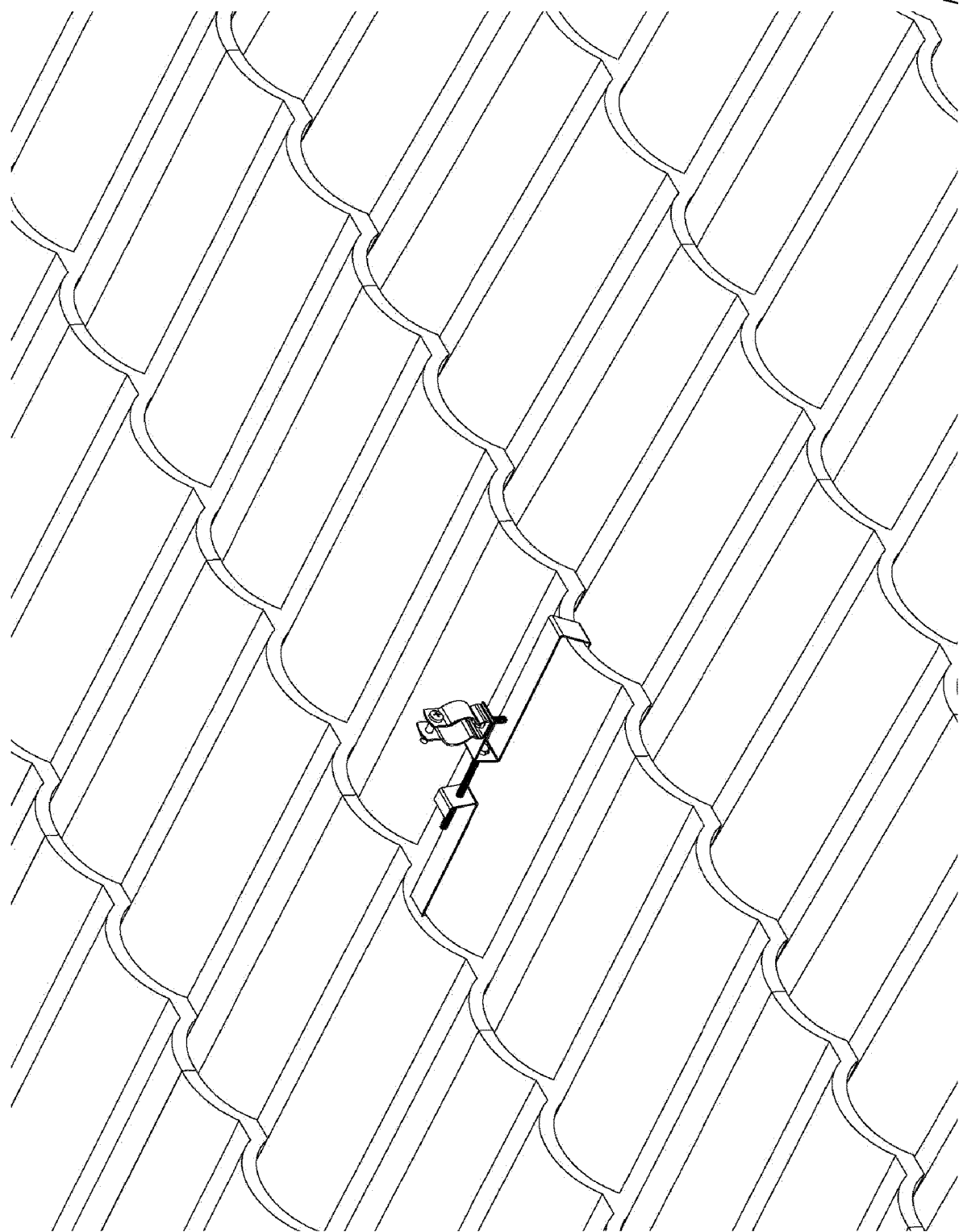
Figure 33:
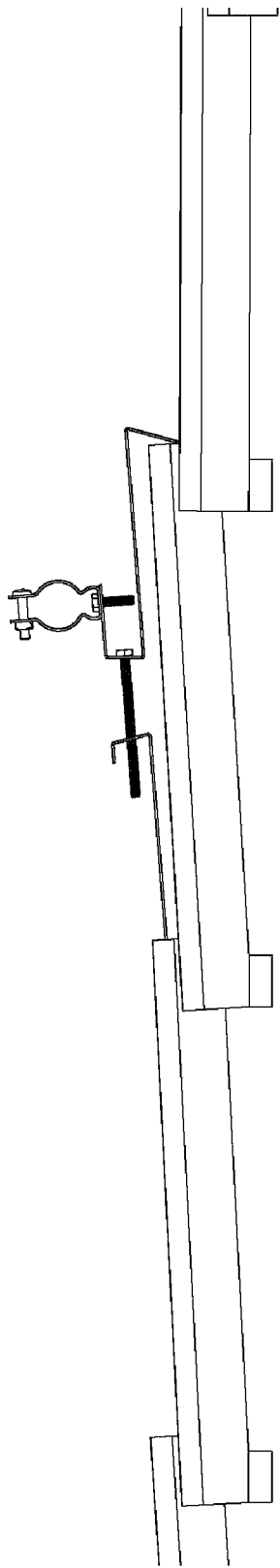
Figure 34:
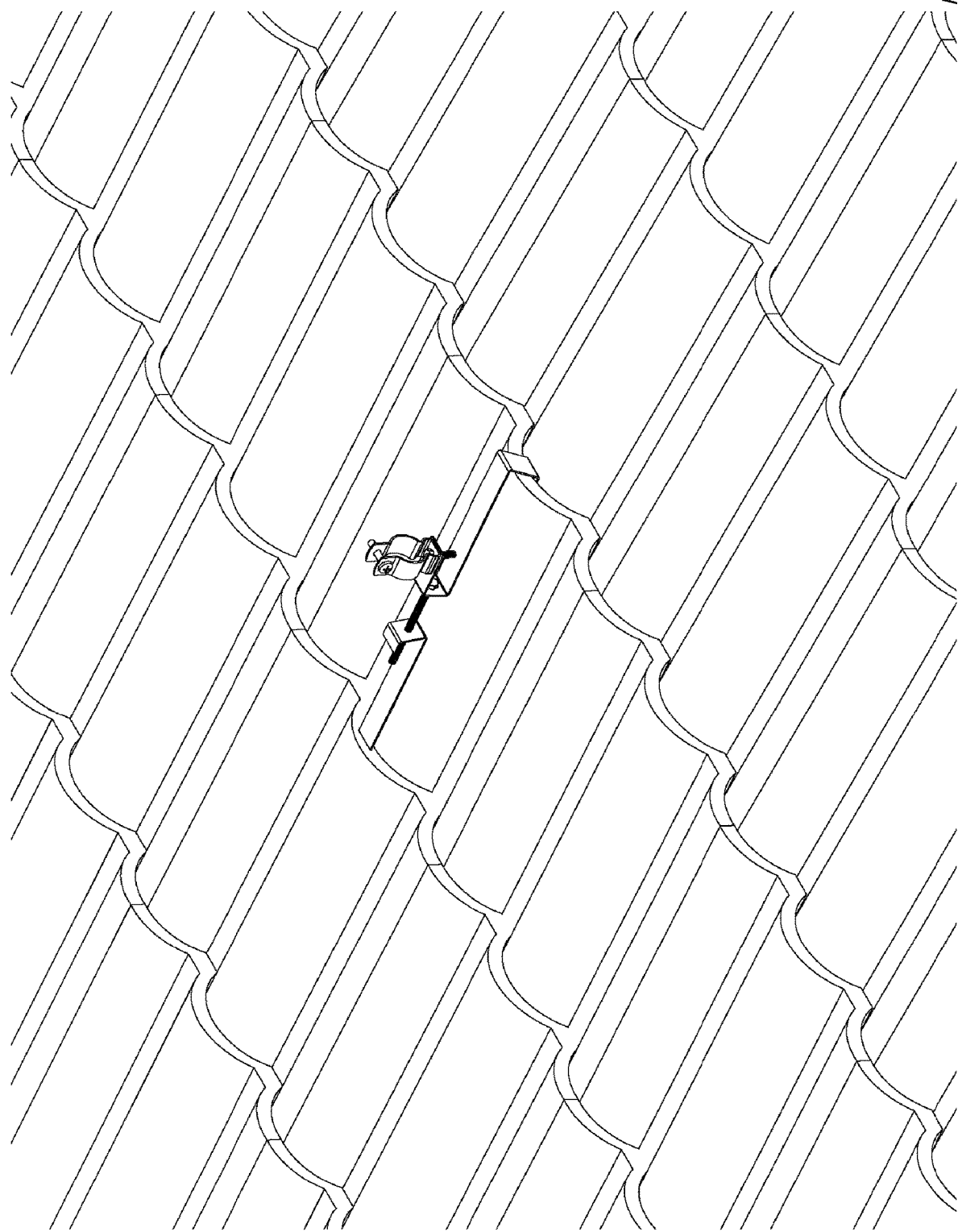
Figure 35:
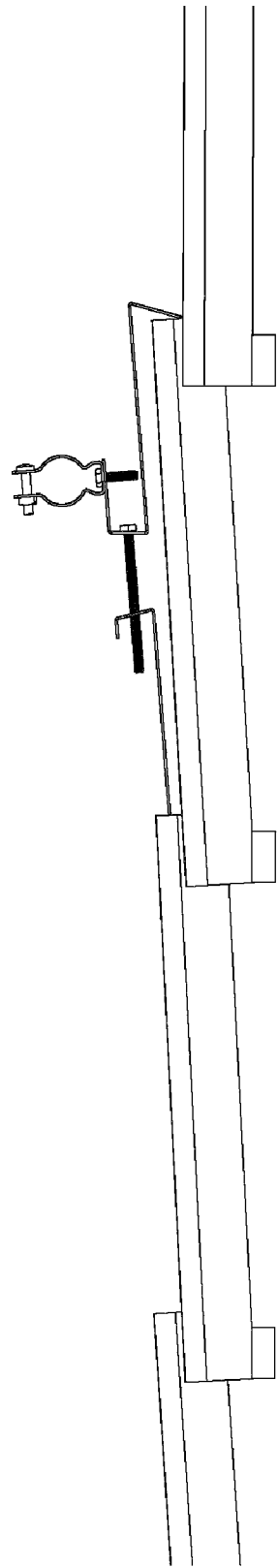
Figure 36:
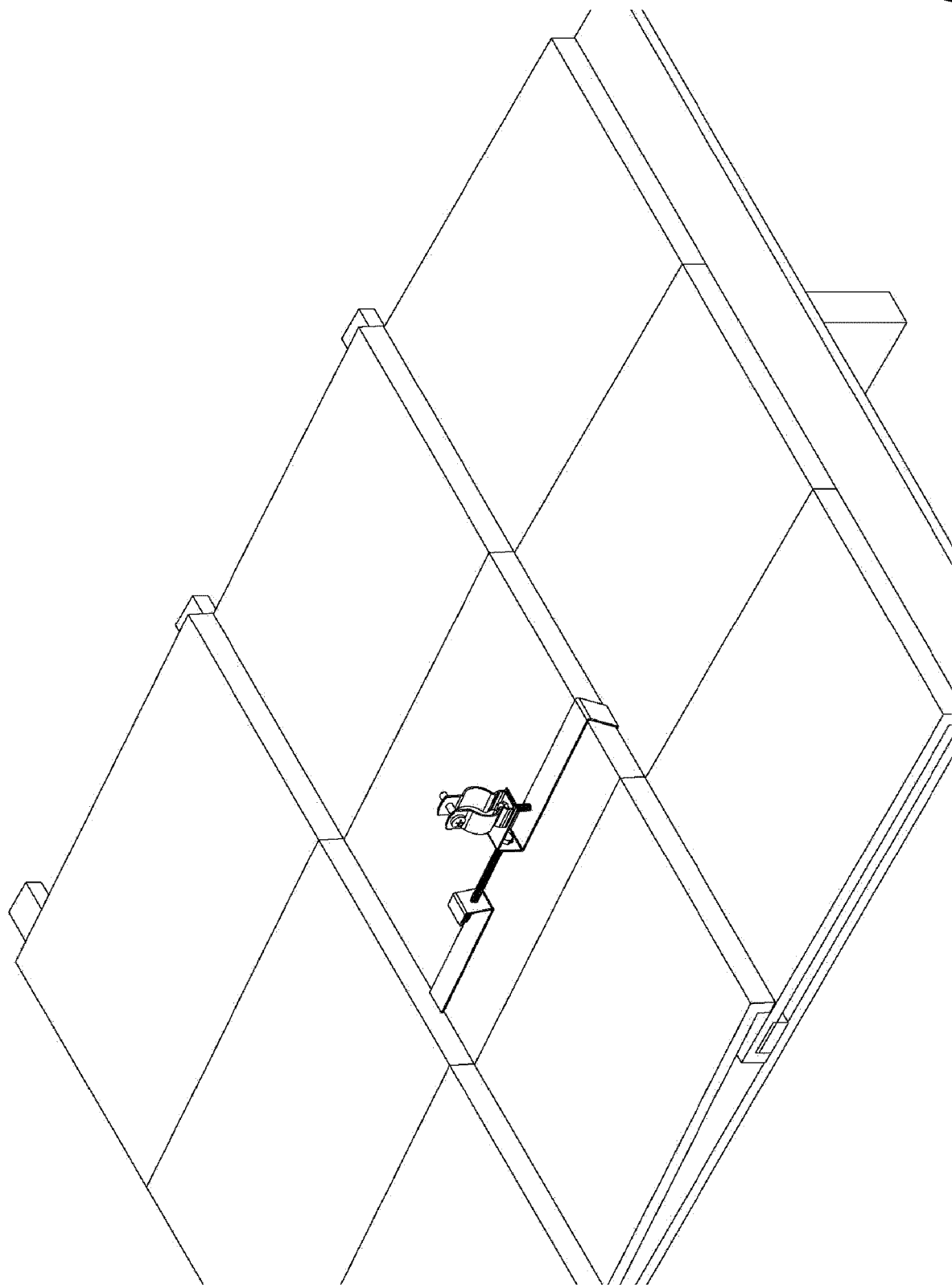
Figure 37:
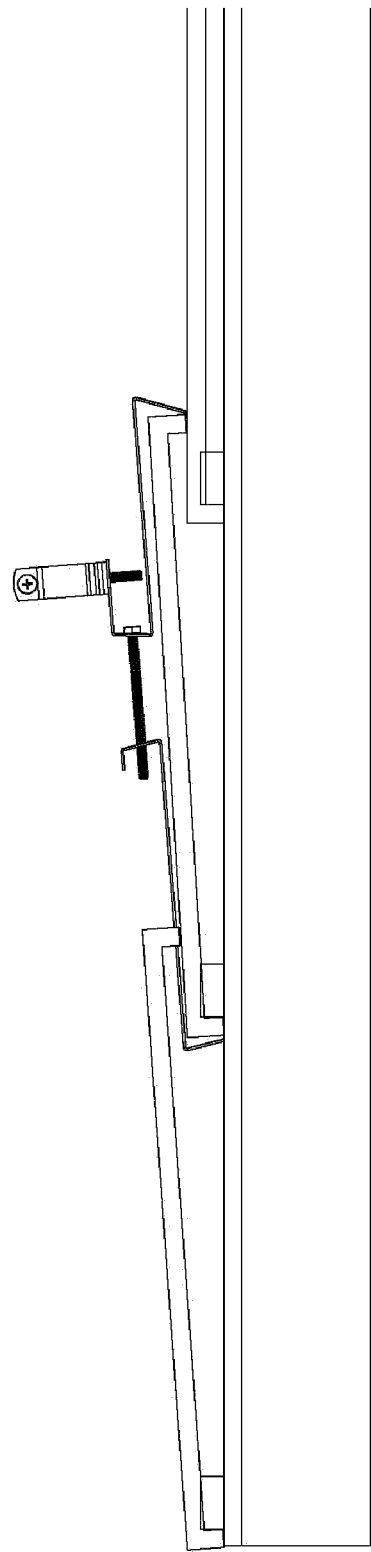
Figure 38:
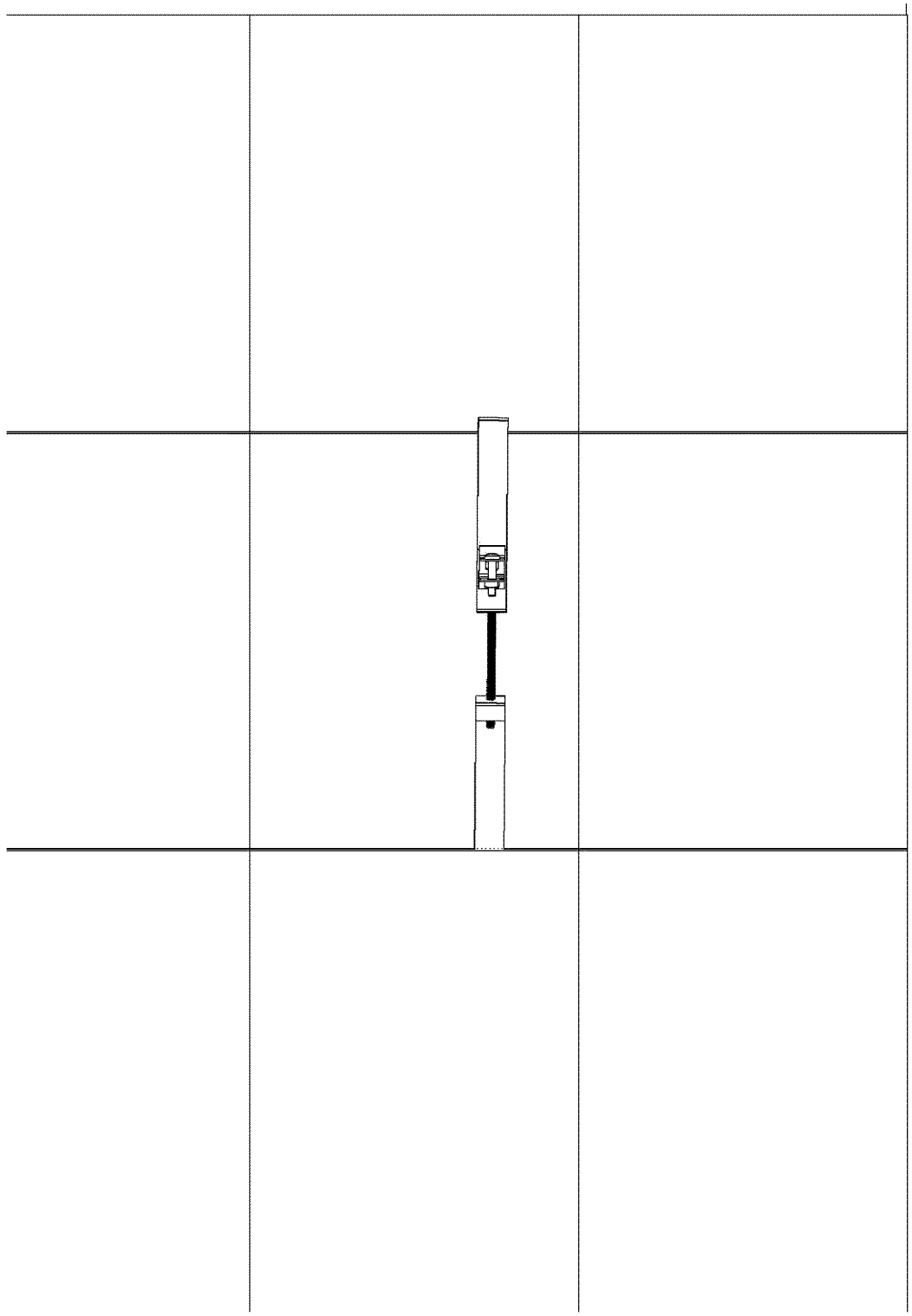
Figure 39:
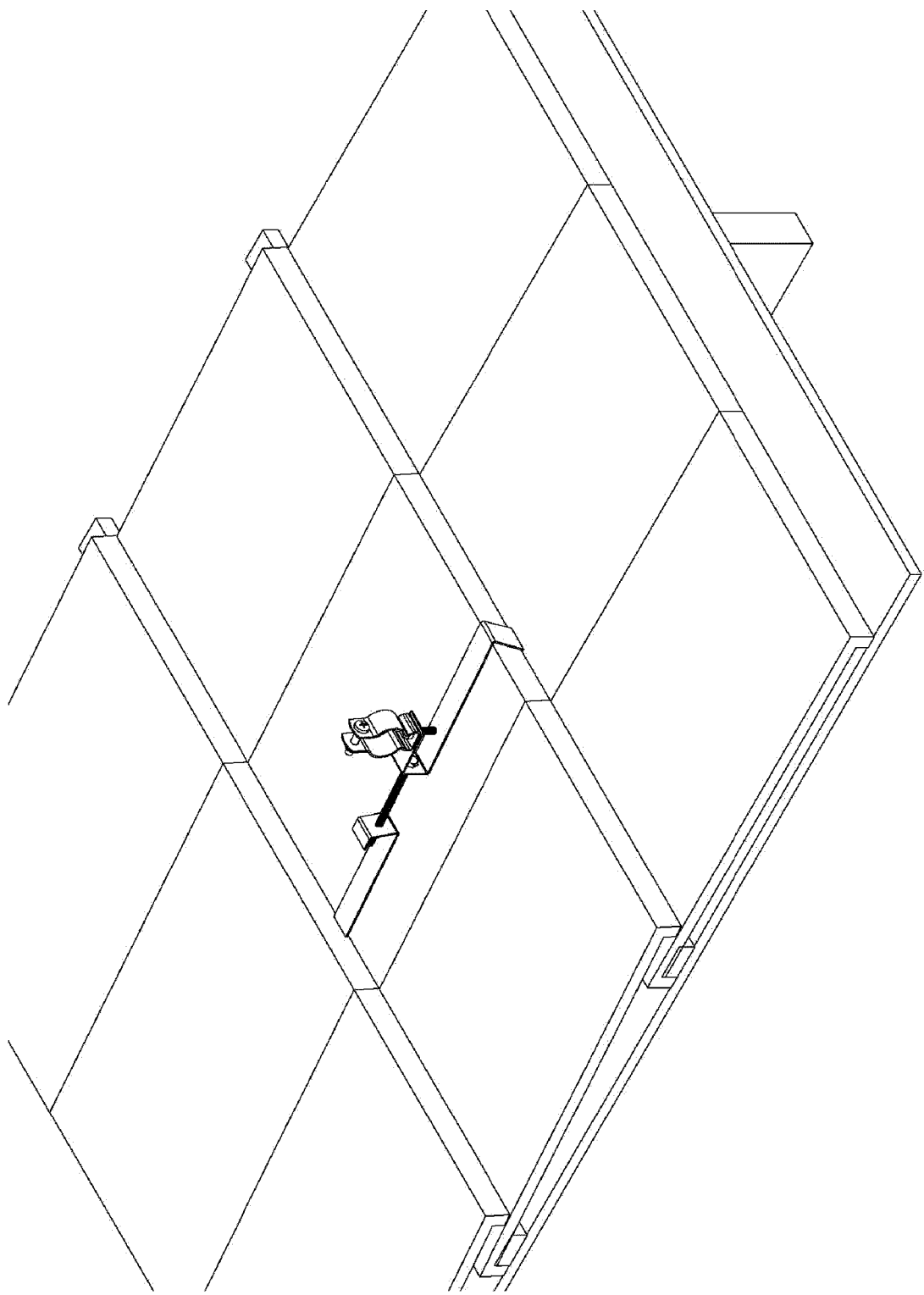
Figure 40:
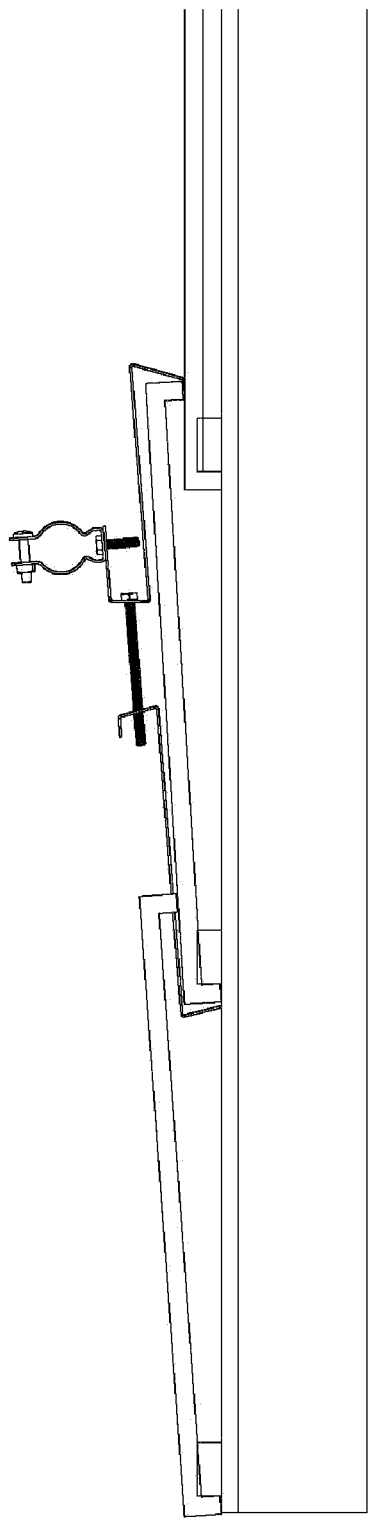
Figure 41:
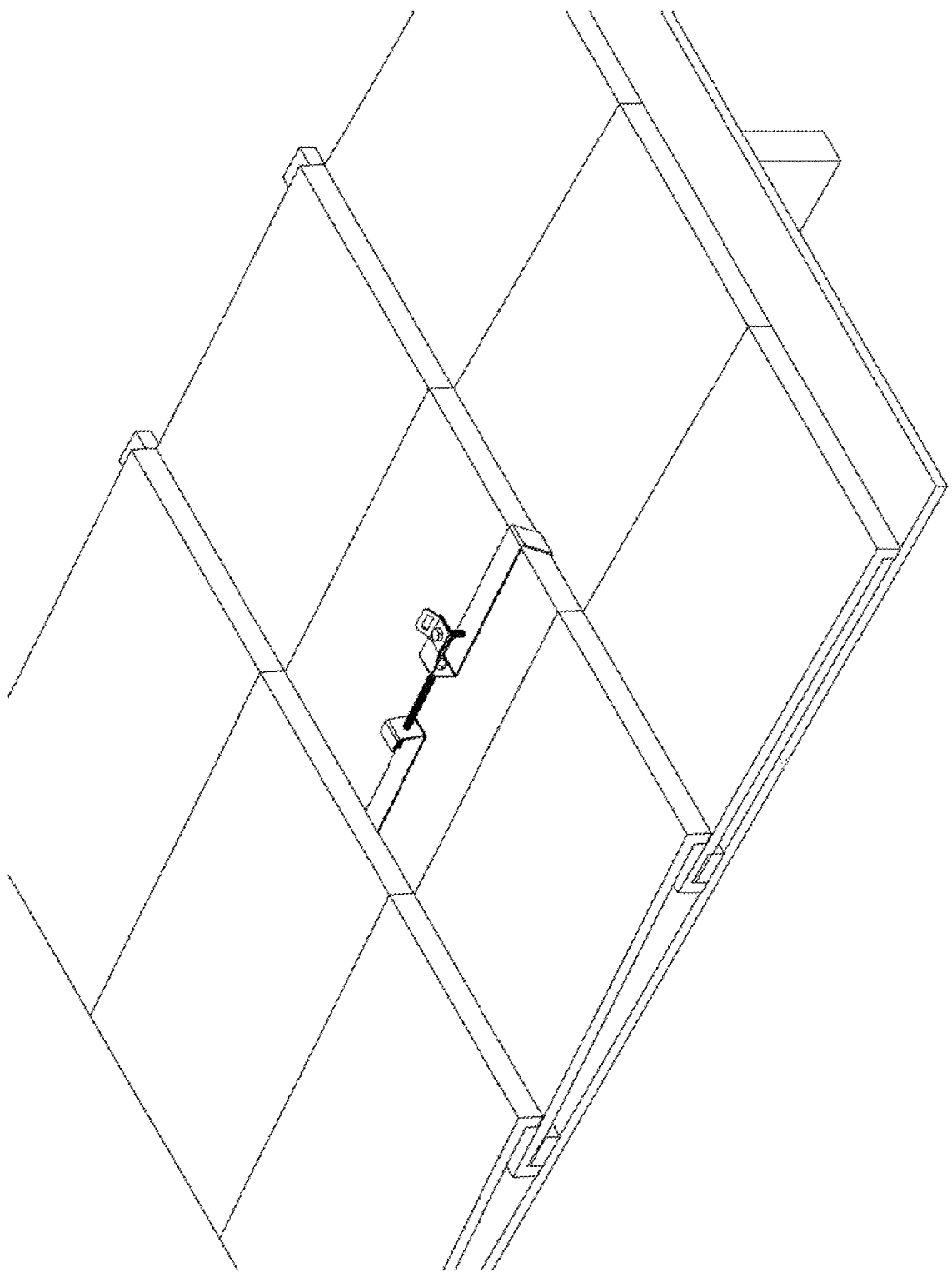
Figure 42:
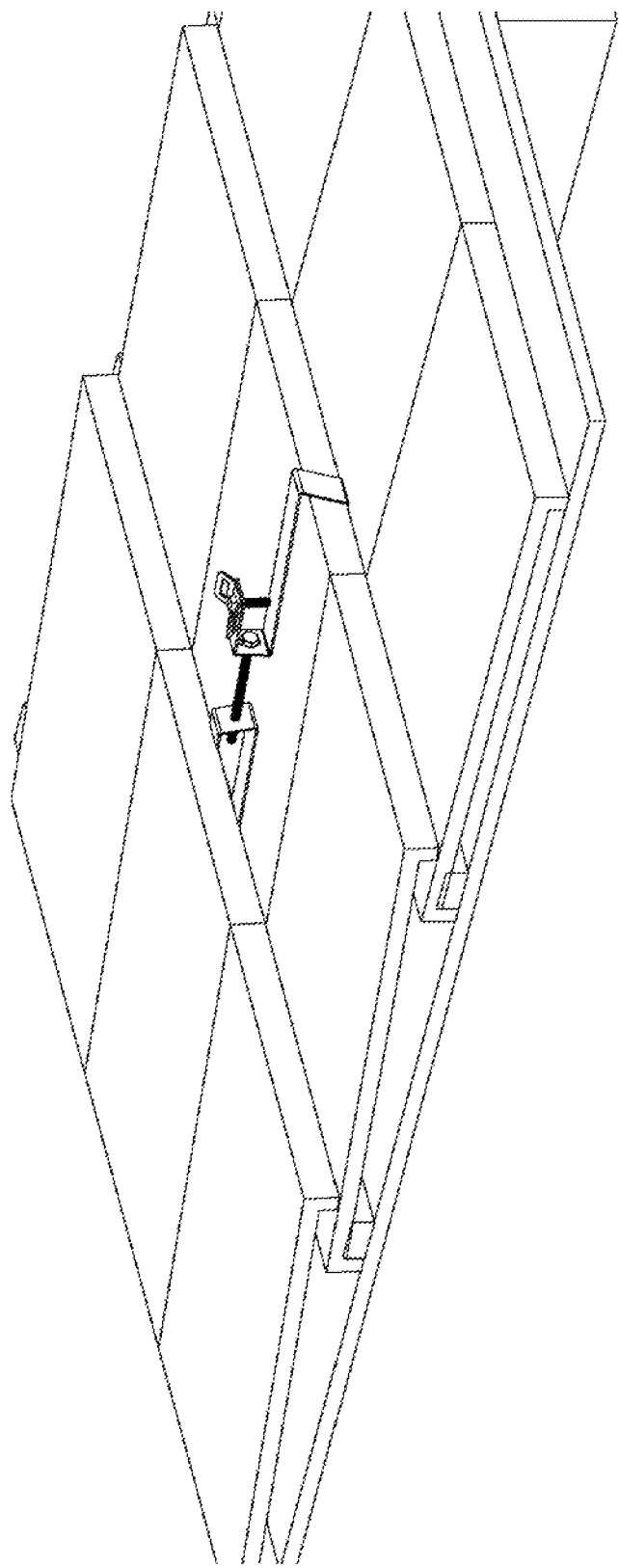
Figure 43:
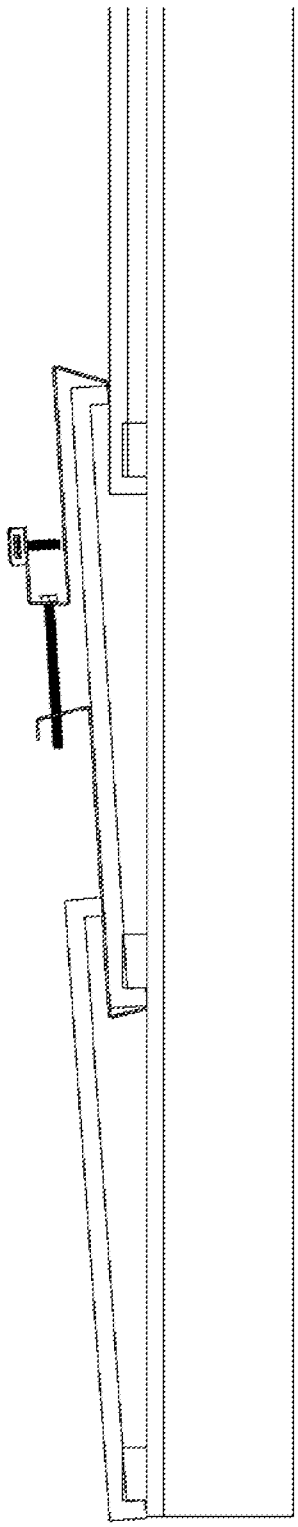
Figure 44:
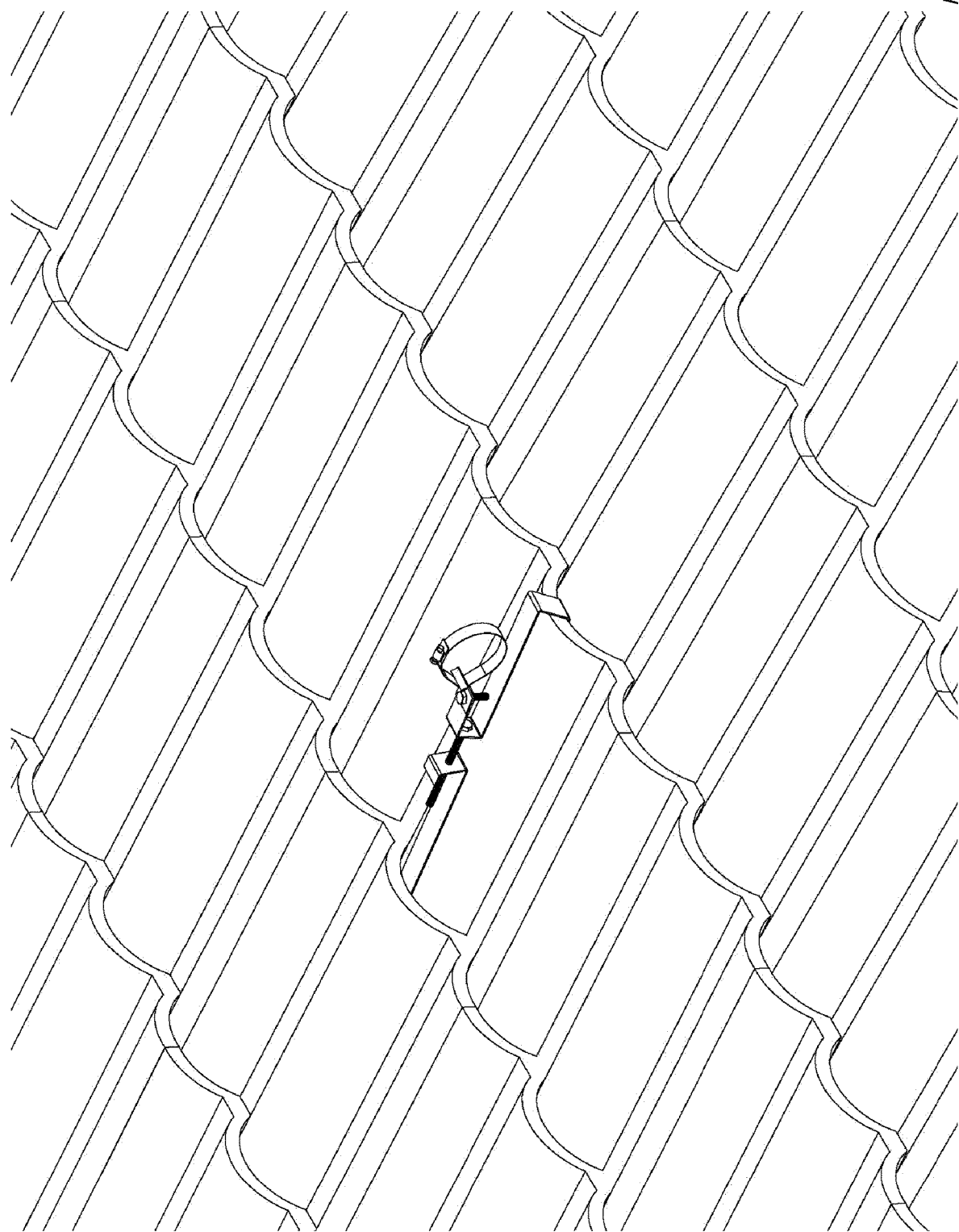
Figure 45:
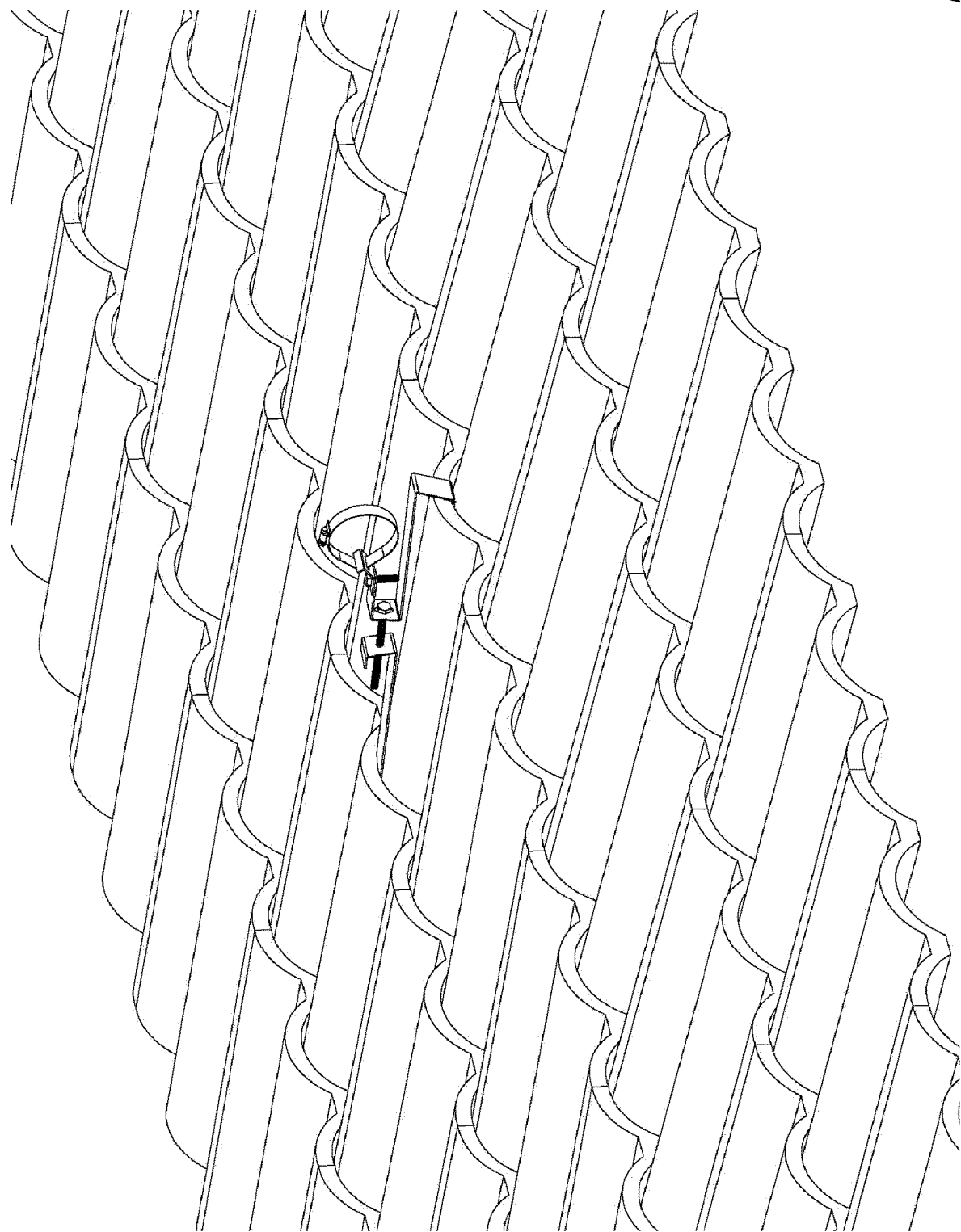
Figure 46:
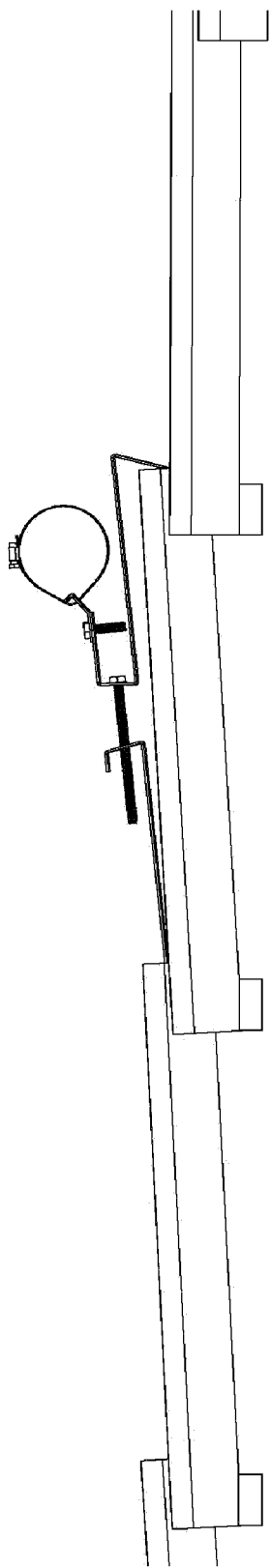
Figure 47:
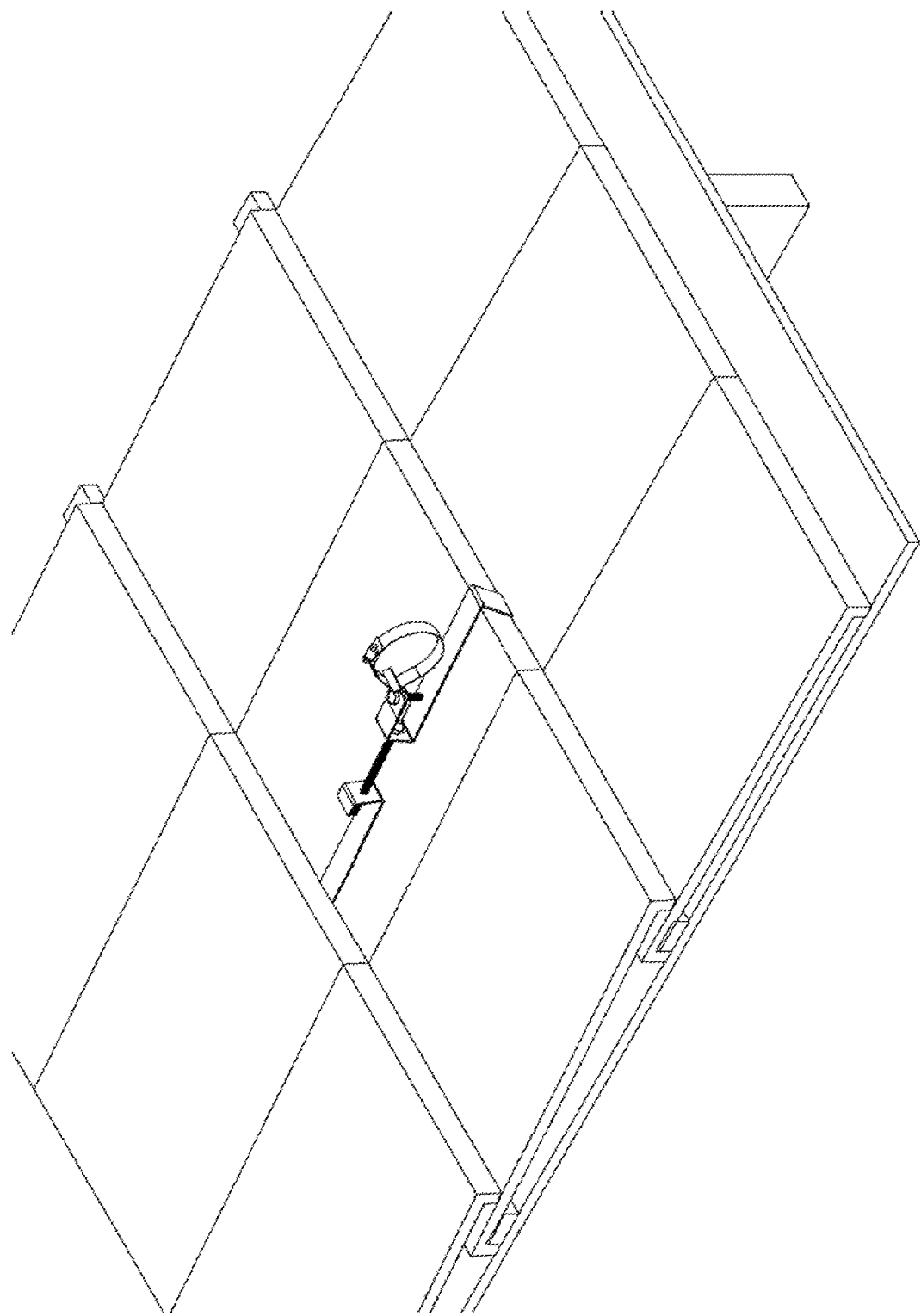
Figure 48:
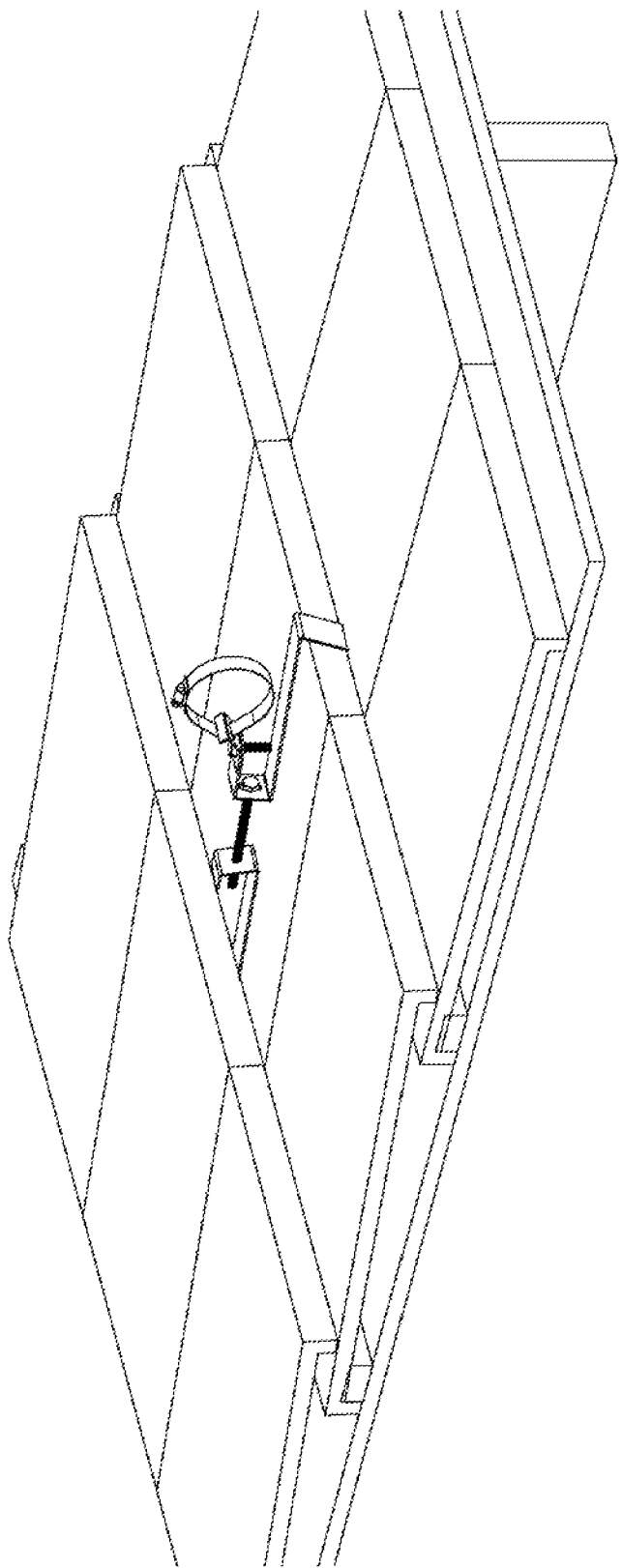
Figure 49:
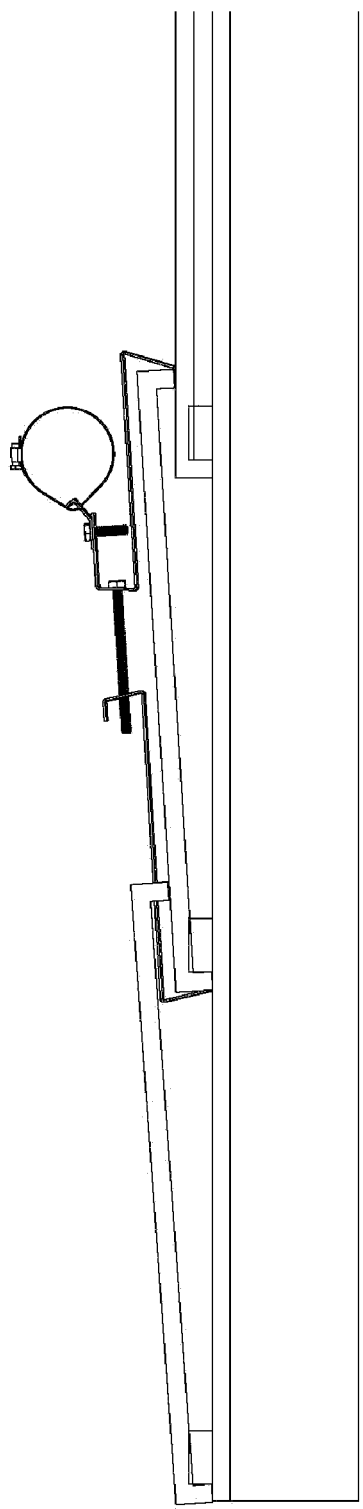
Figure 50:
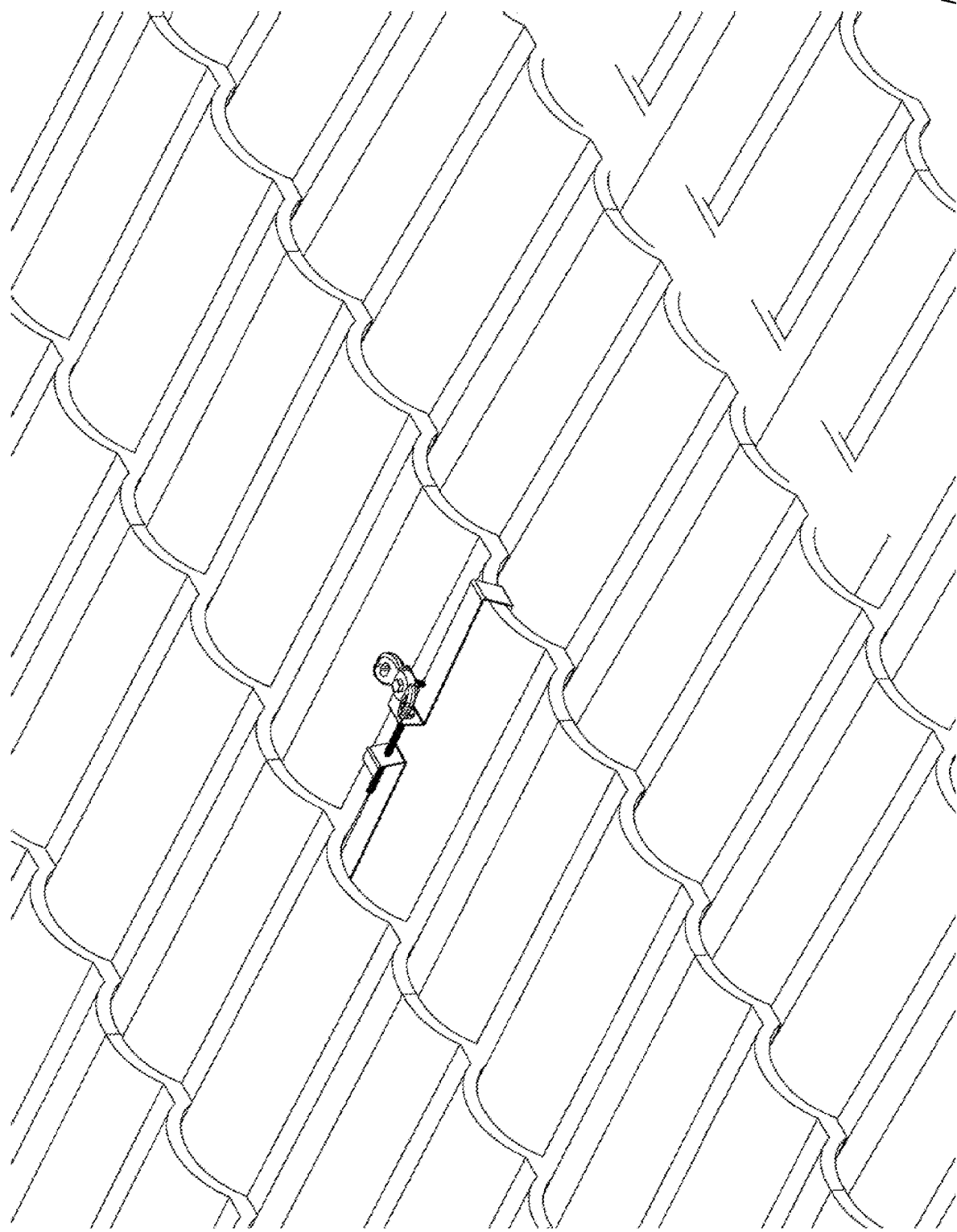
Figure 51:
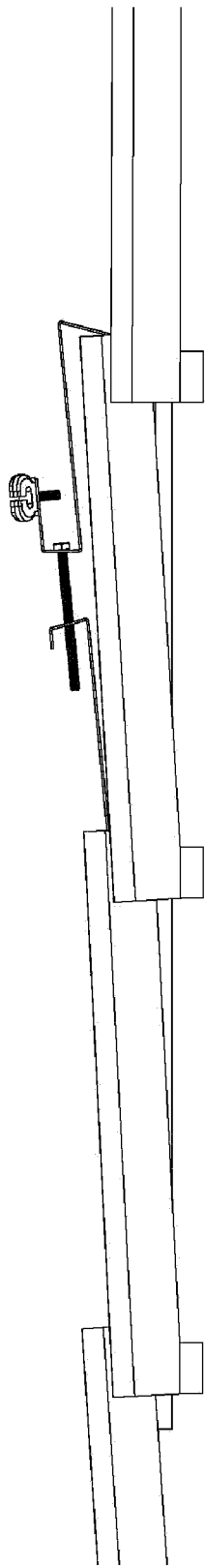
Figure 52:
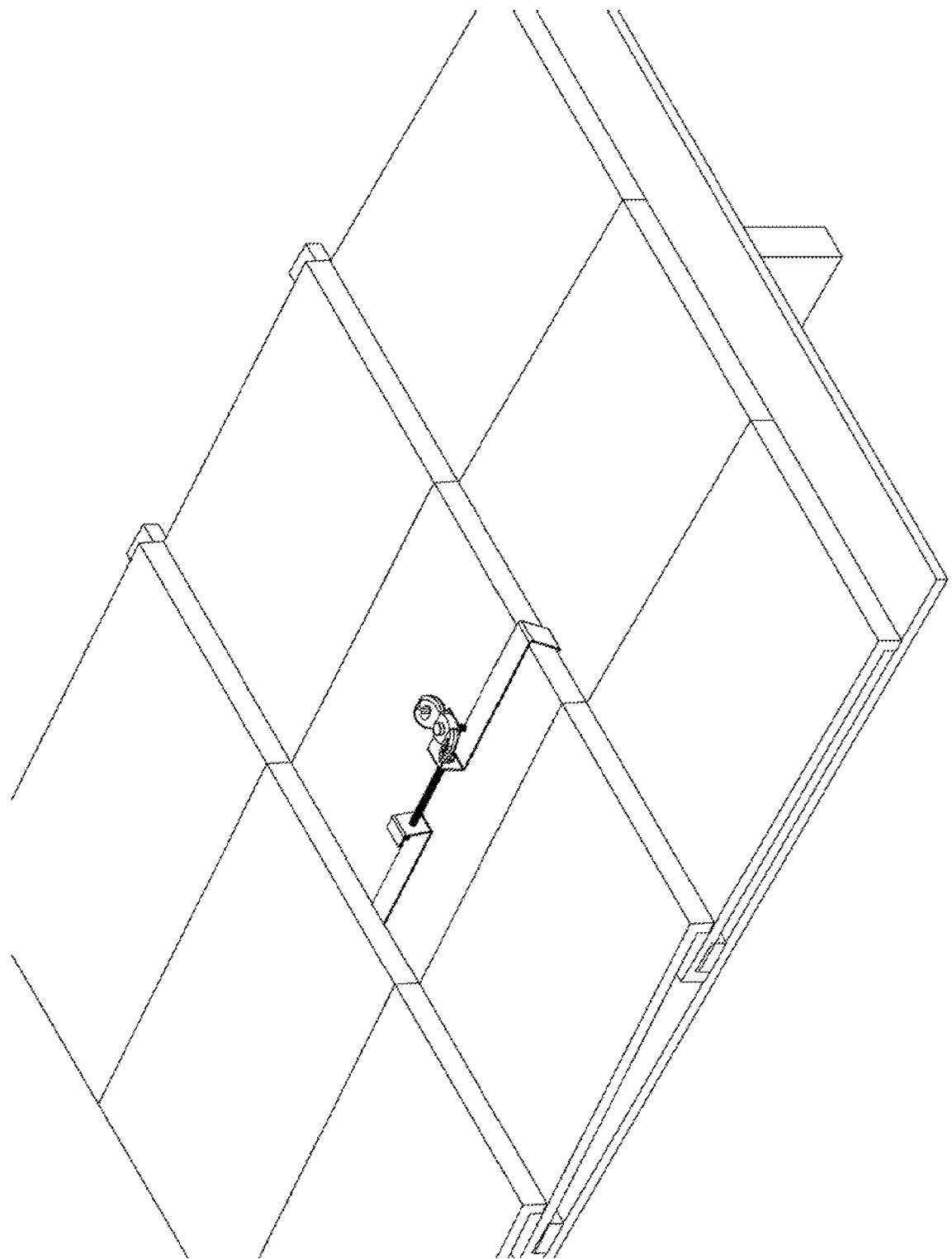
Figure 53:
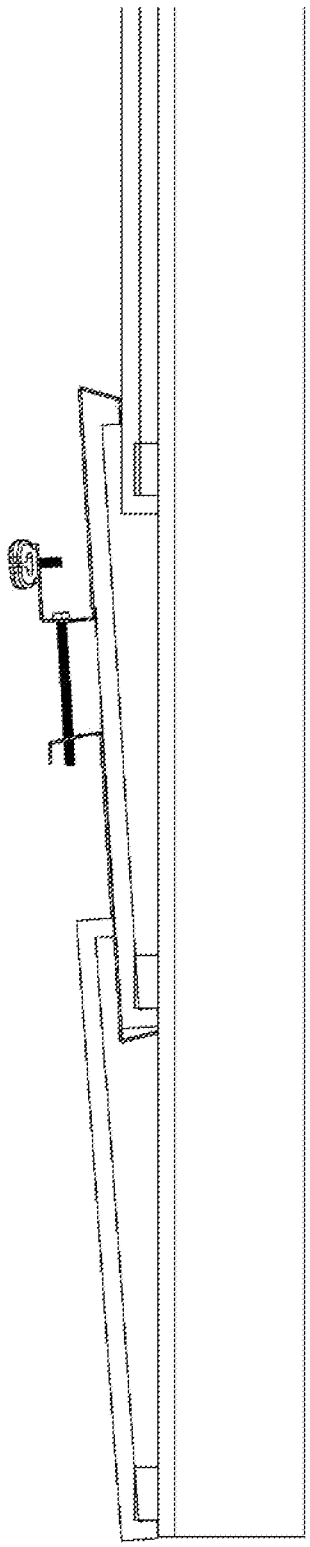
Figure 54:
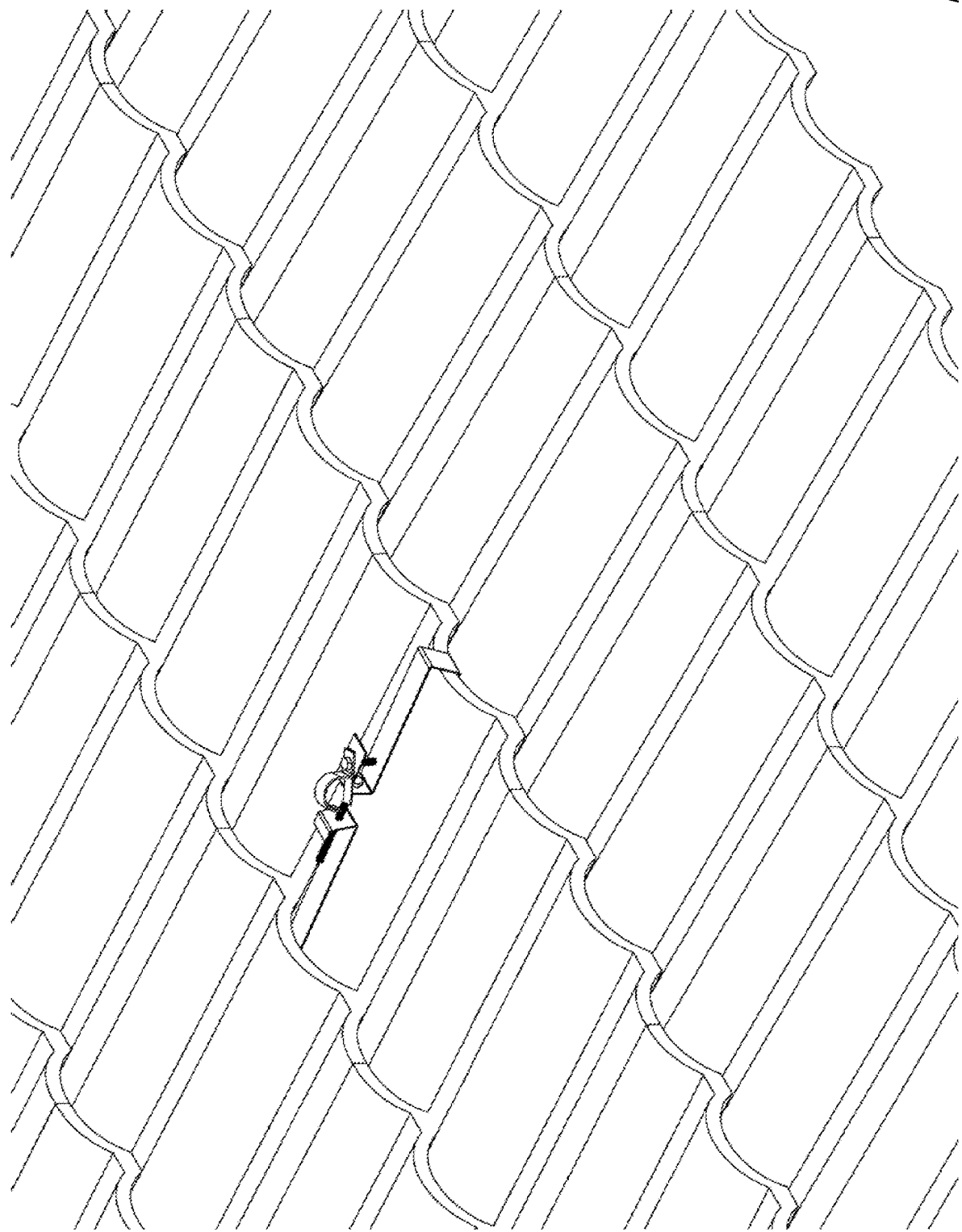
Figure 55:
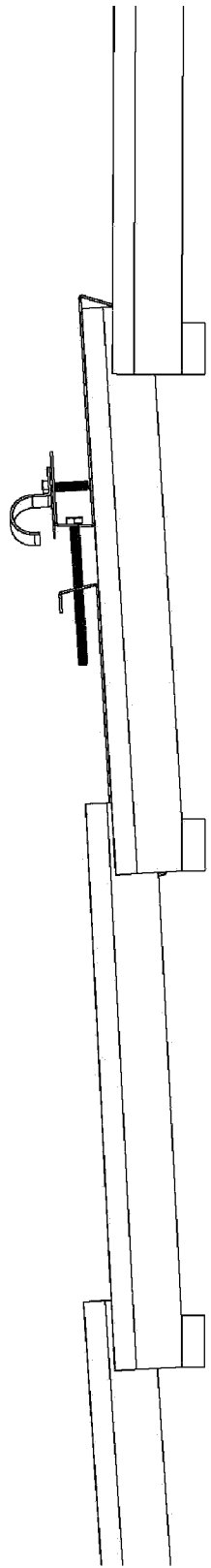
Figure 56:
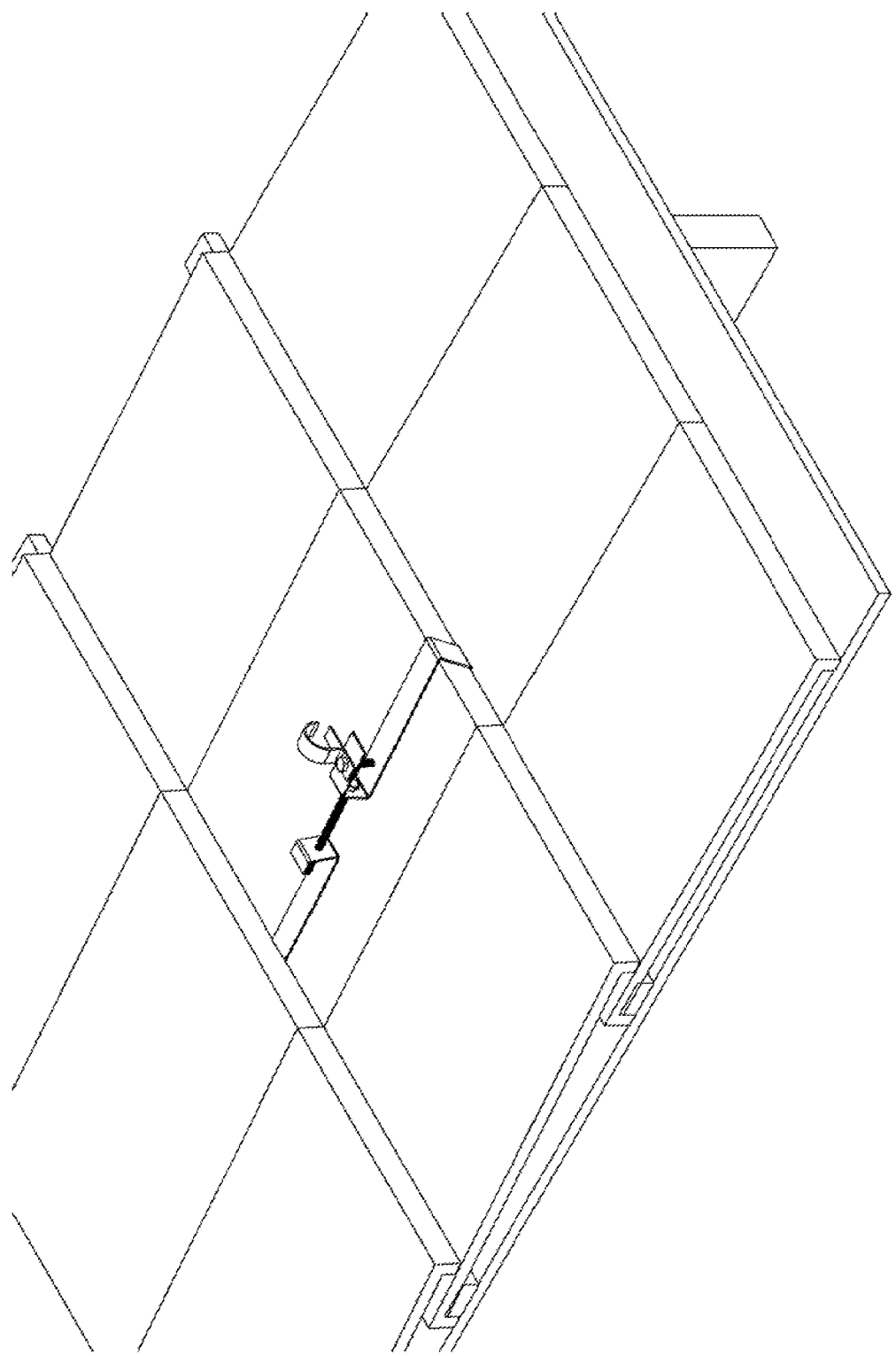
Figure 57:
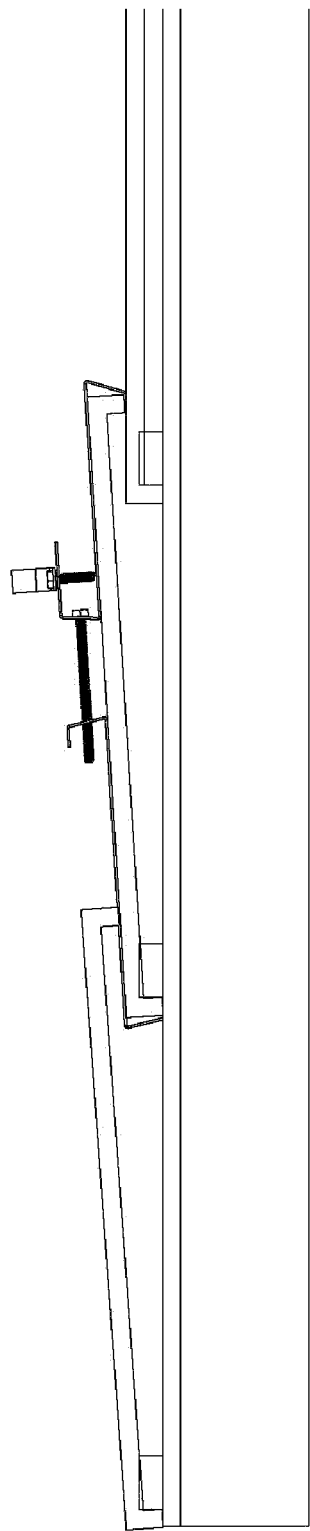
Figure 58:
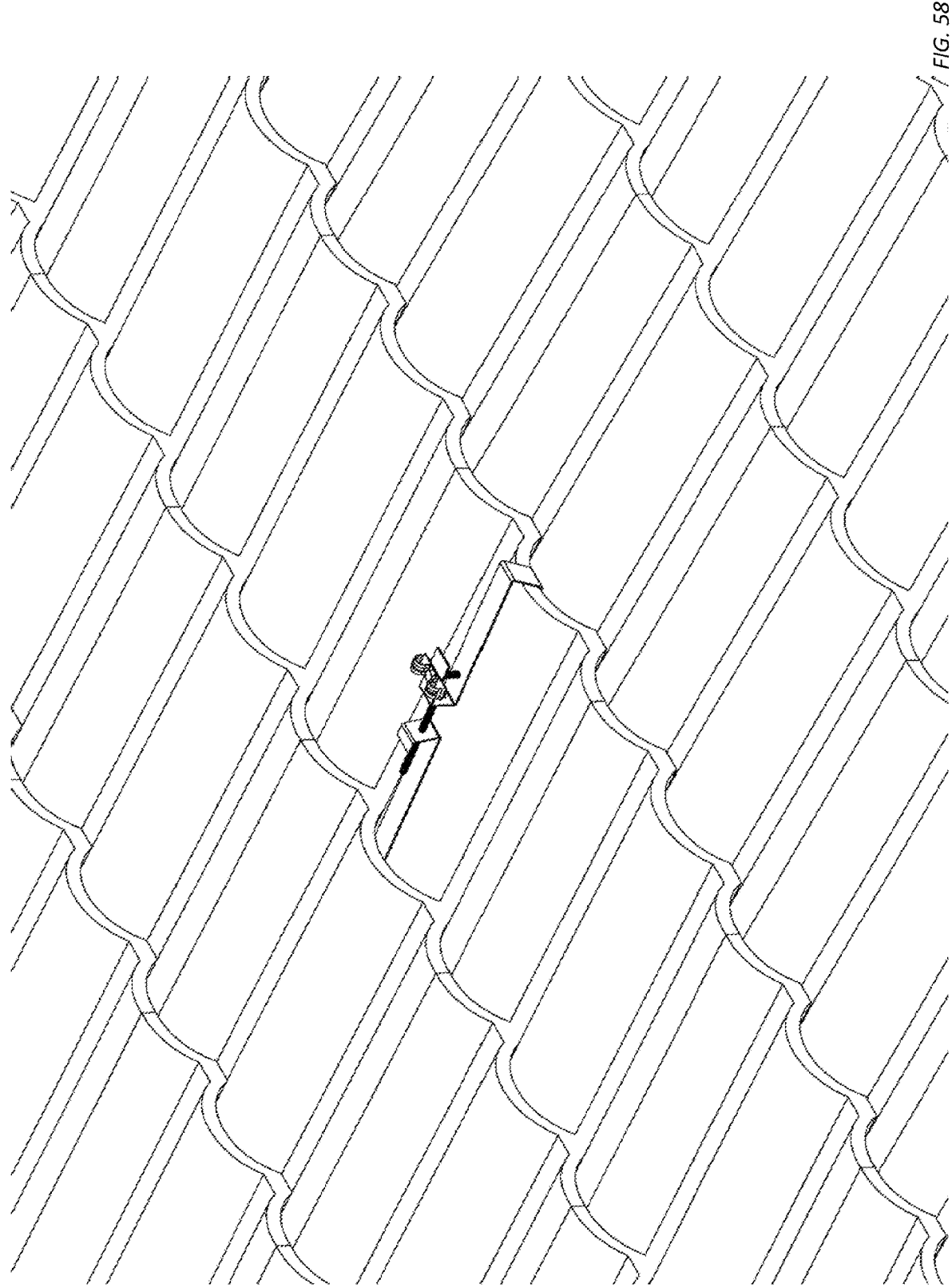
Figure 59:
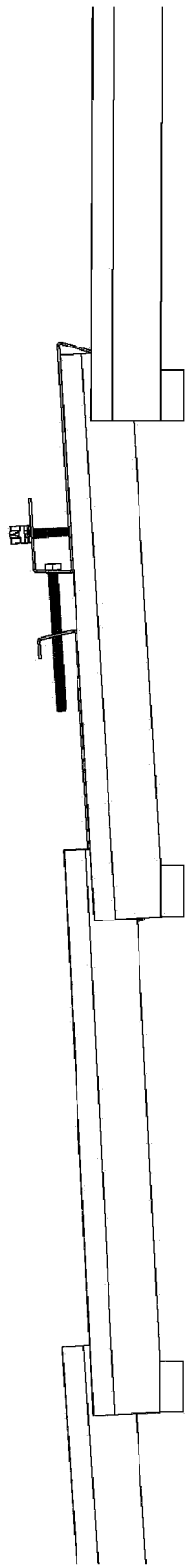
Figure 60:
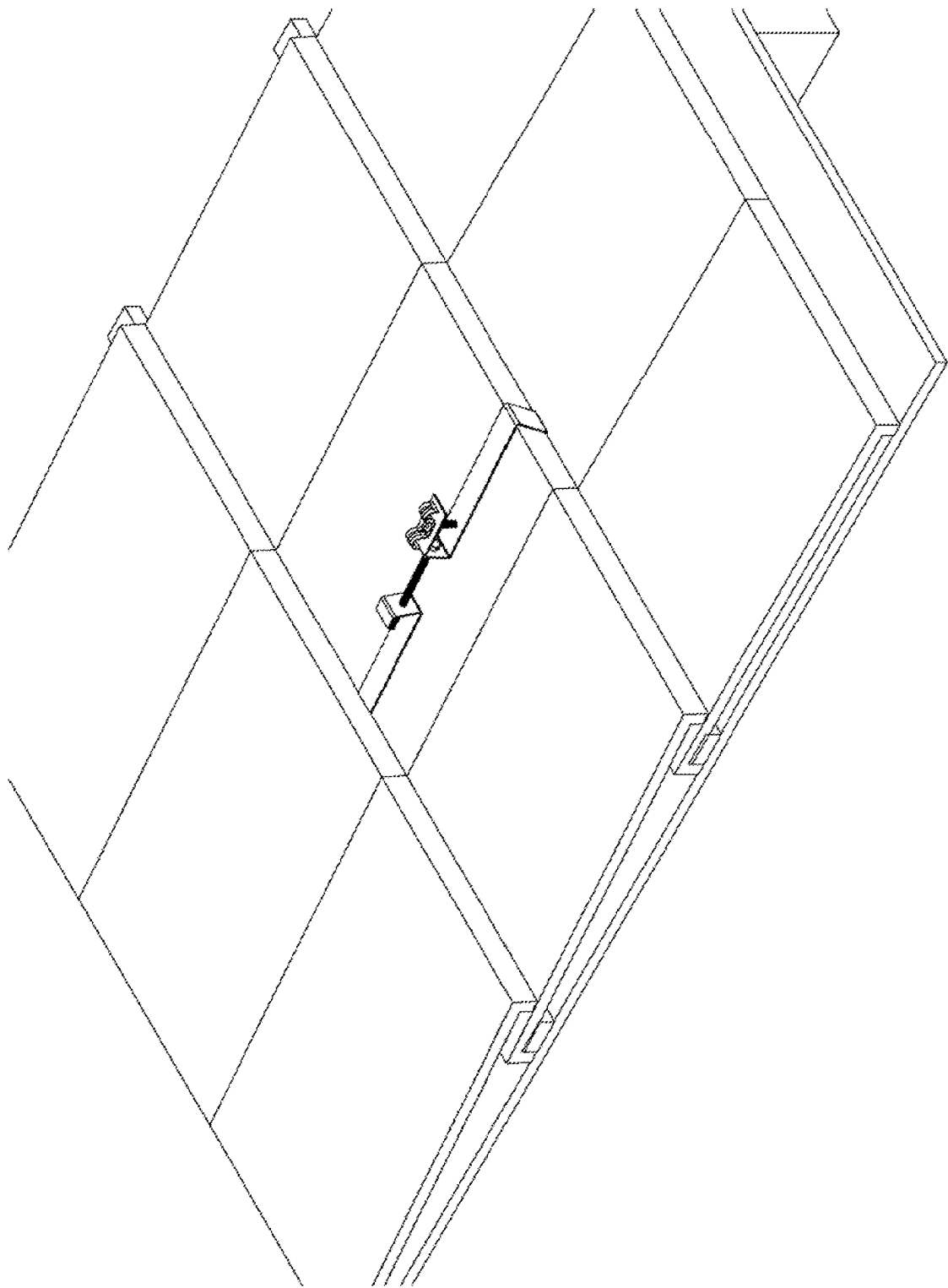
Figure 61:
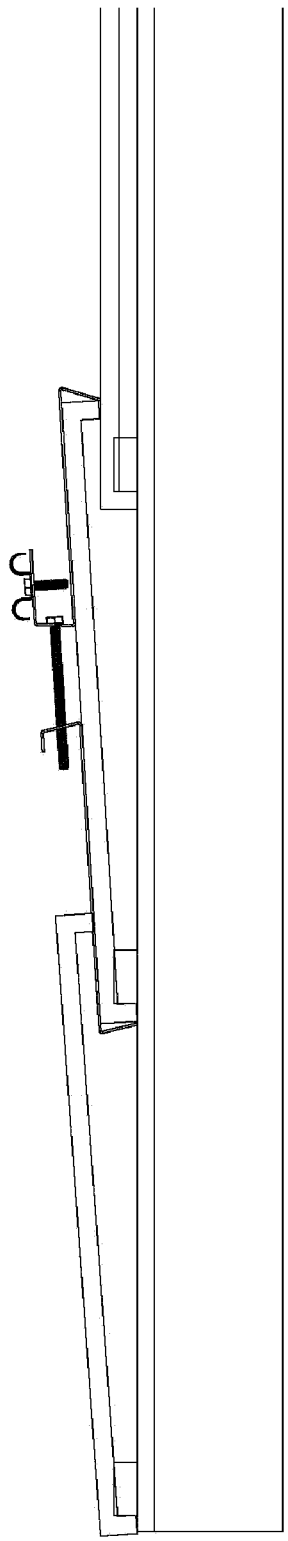
Figure 62:
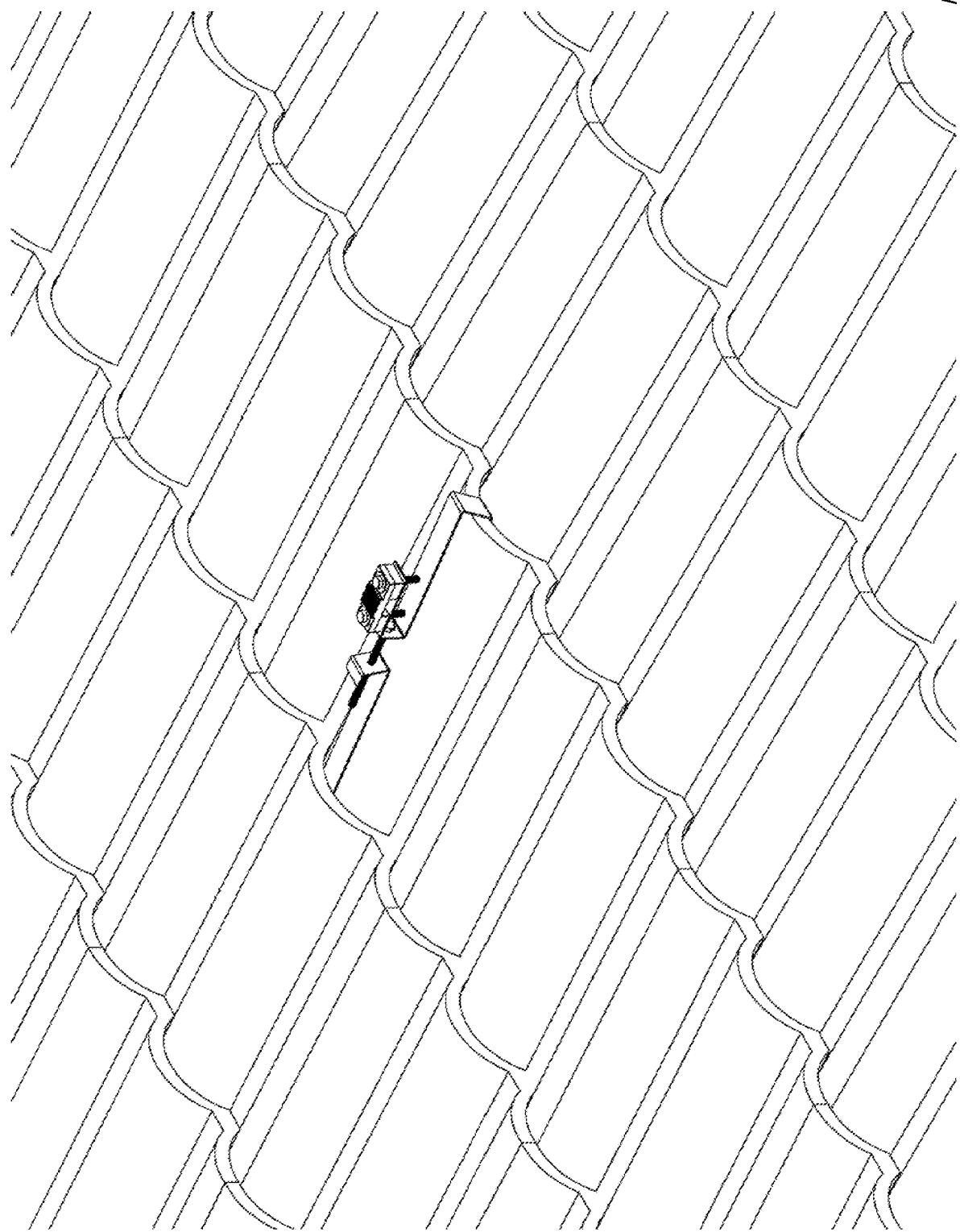
Figure 63:
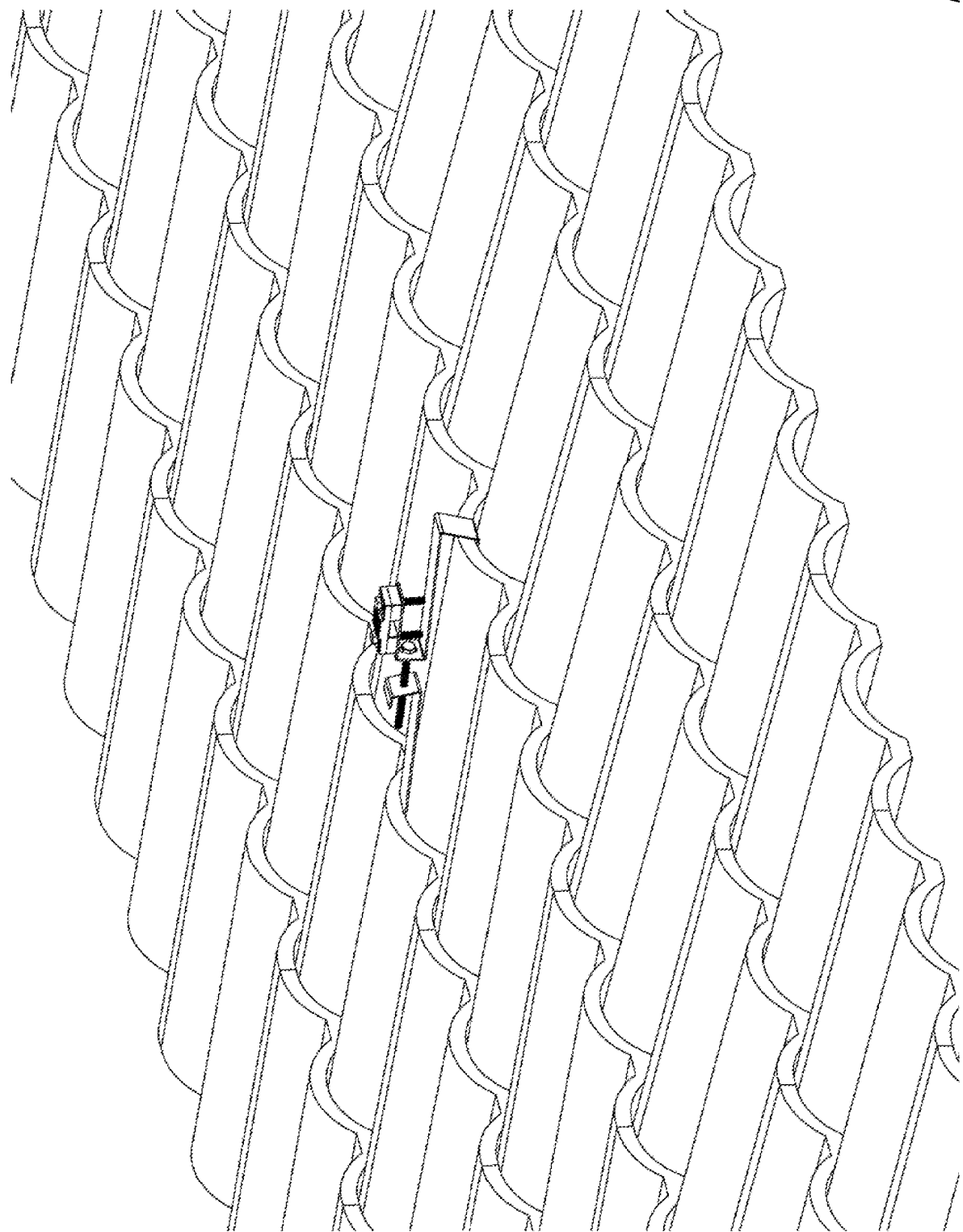
Figure 64:
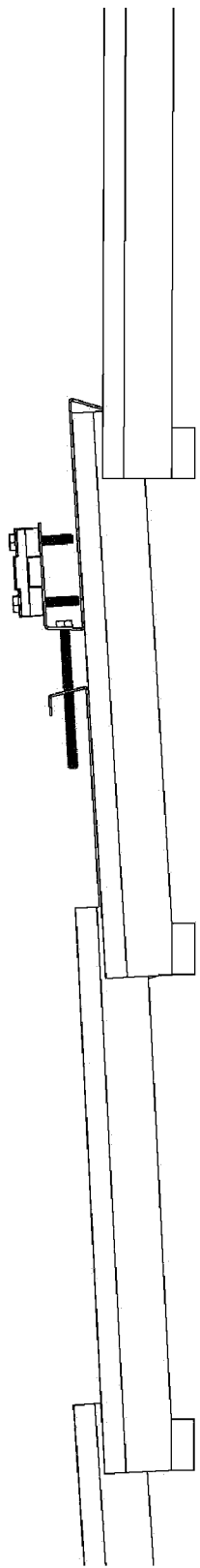
Figure 65:
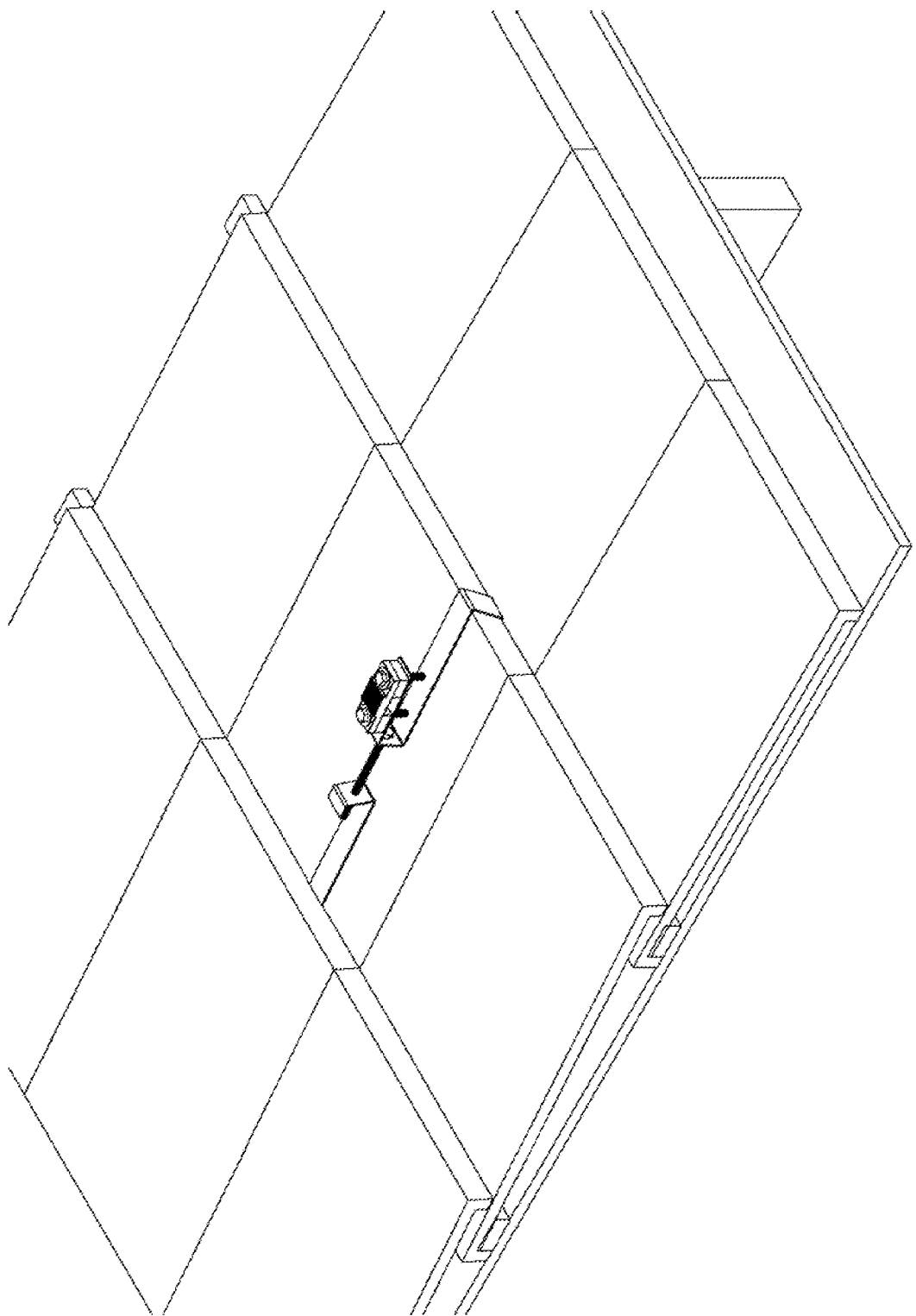
Figure 66:
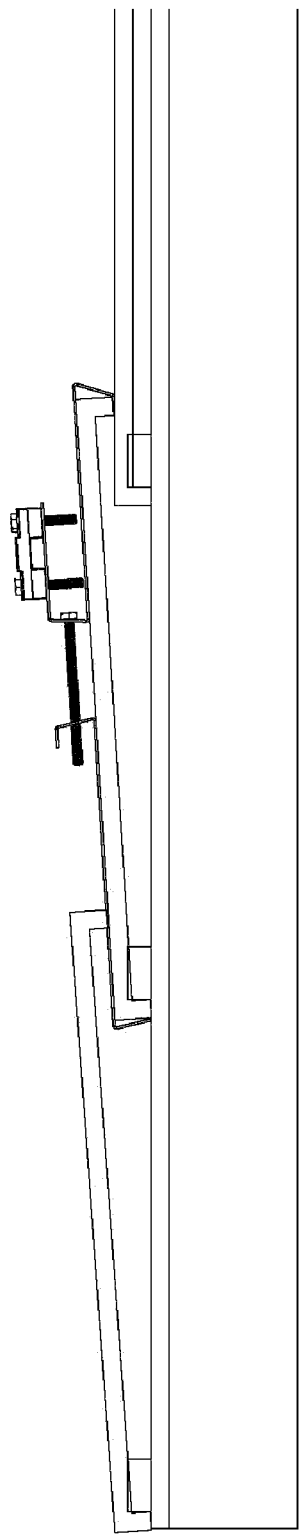
Figure 67:
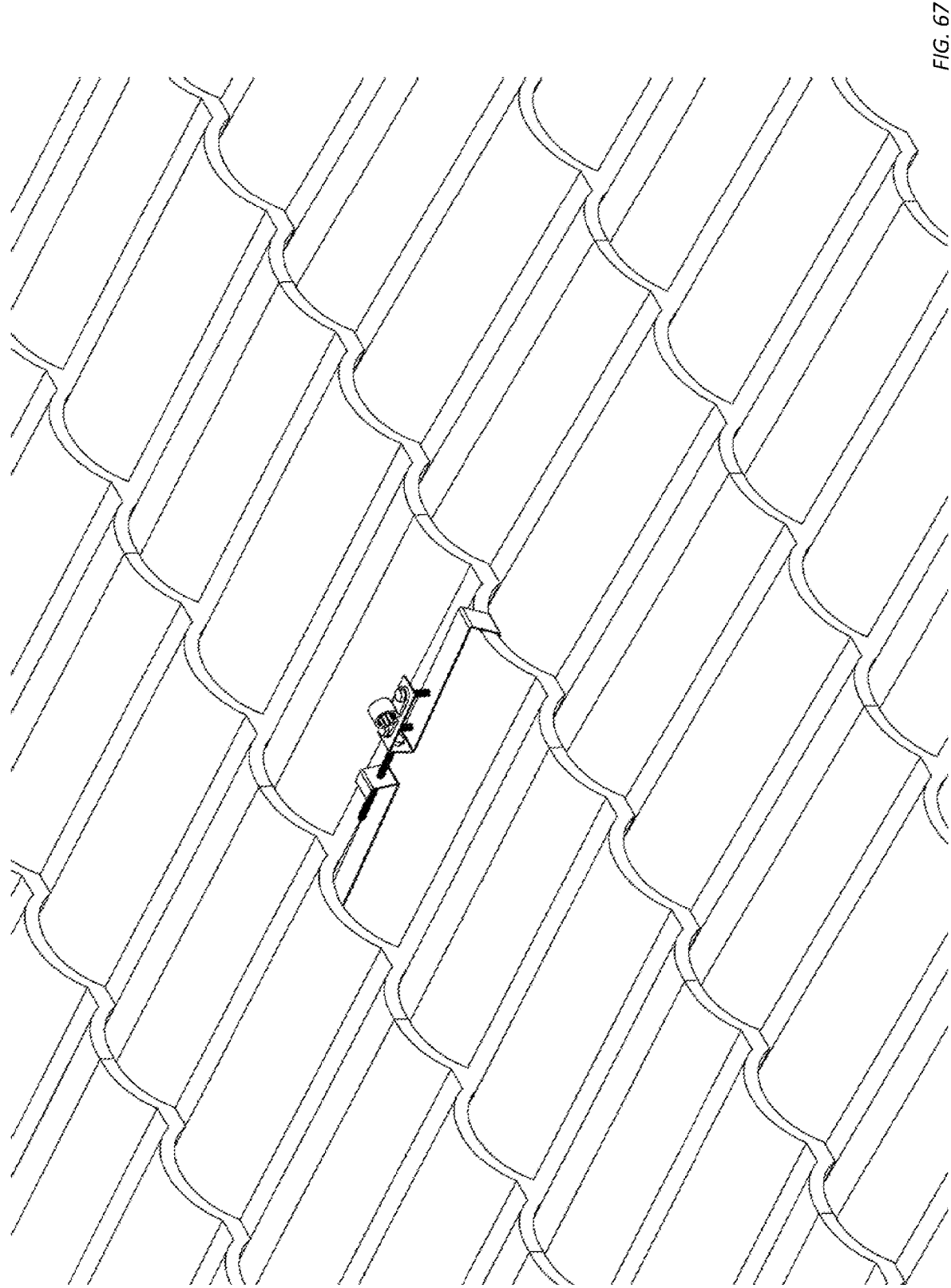
Figure 68:
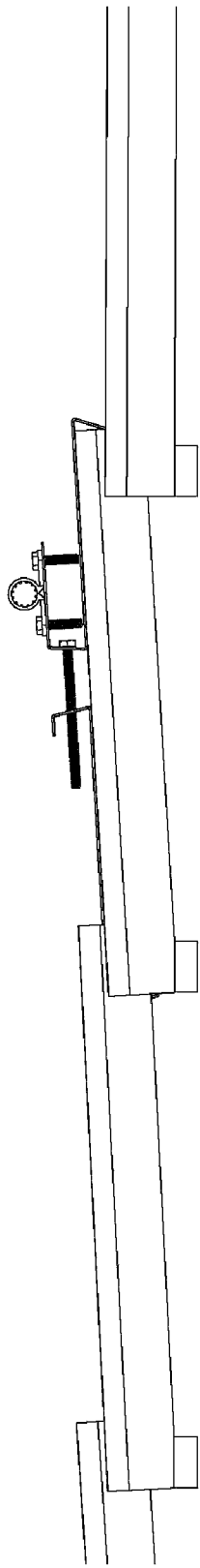
Figure 69:
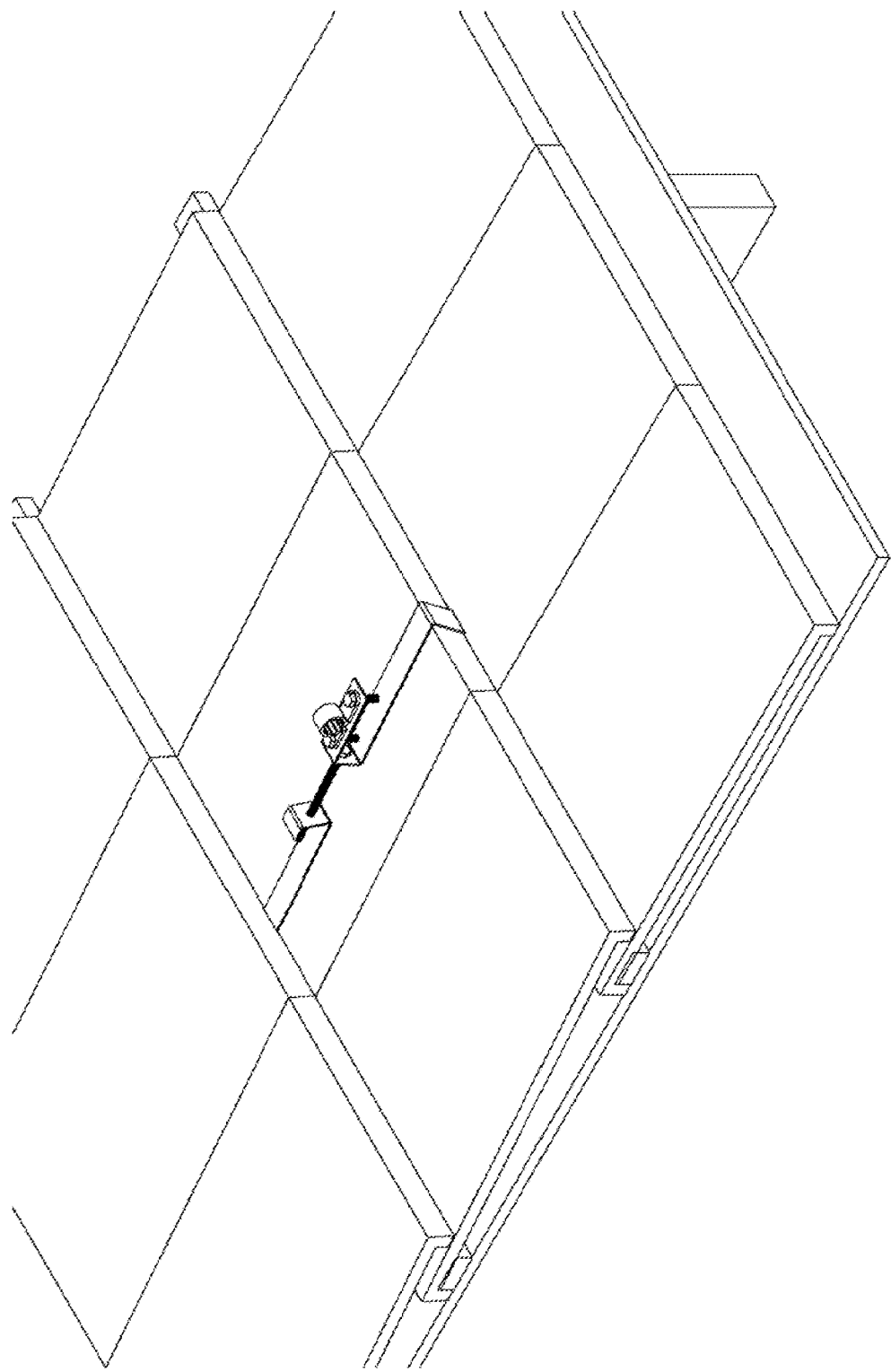
Figure 70:
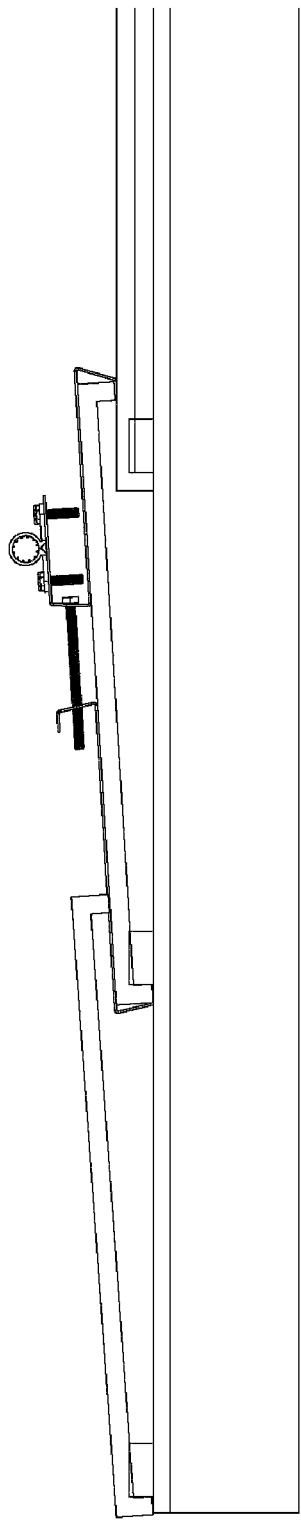
Figure 71:
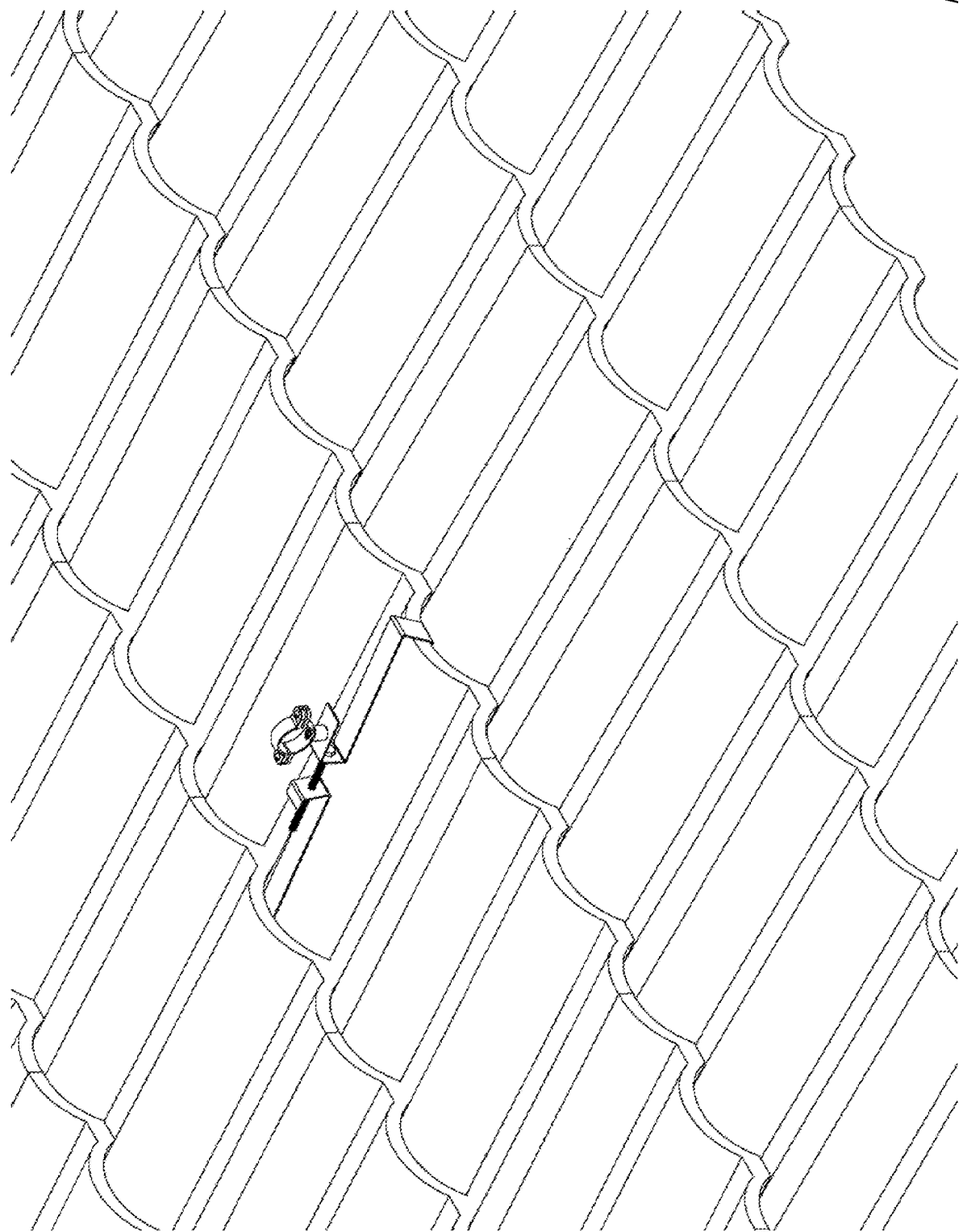
Figure 72:
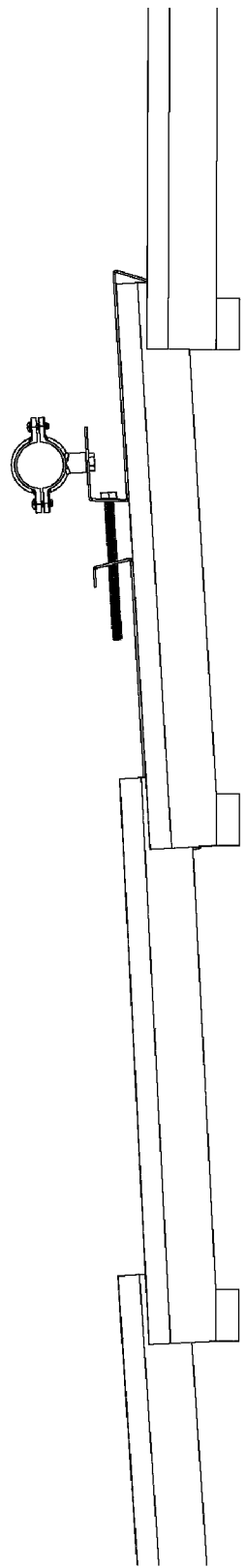
Figure 73:
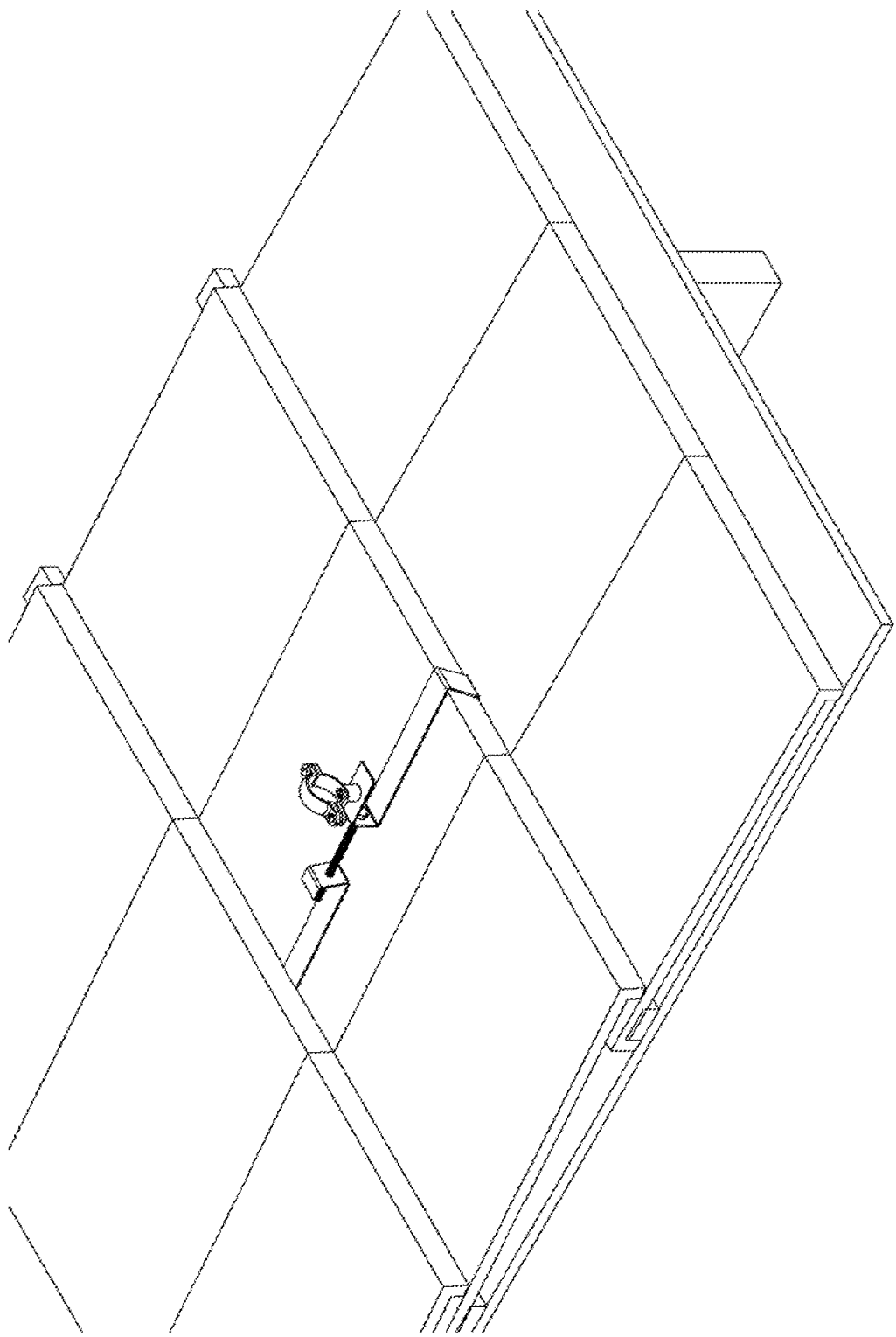
Figure 74:
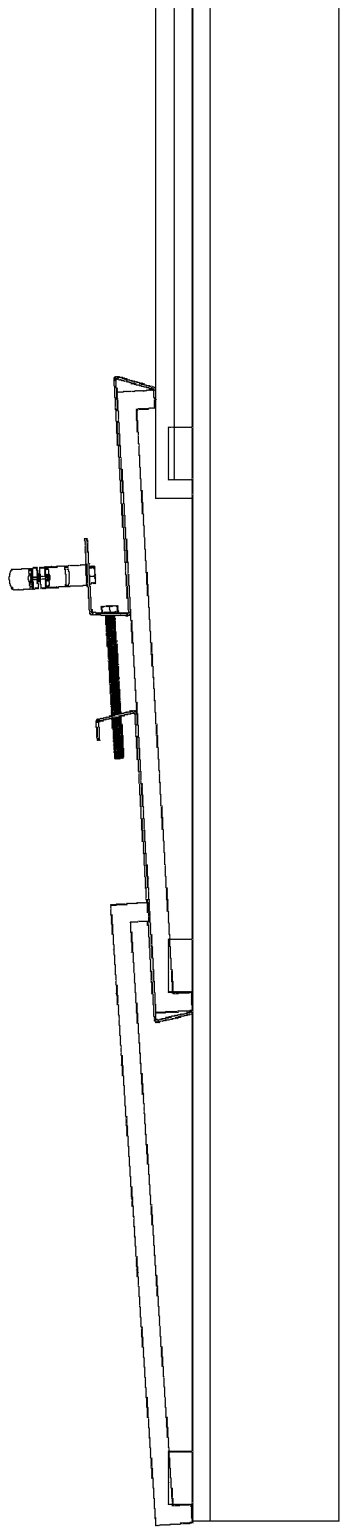
Figure 75:
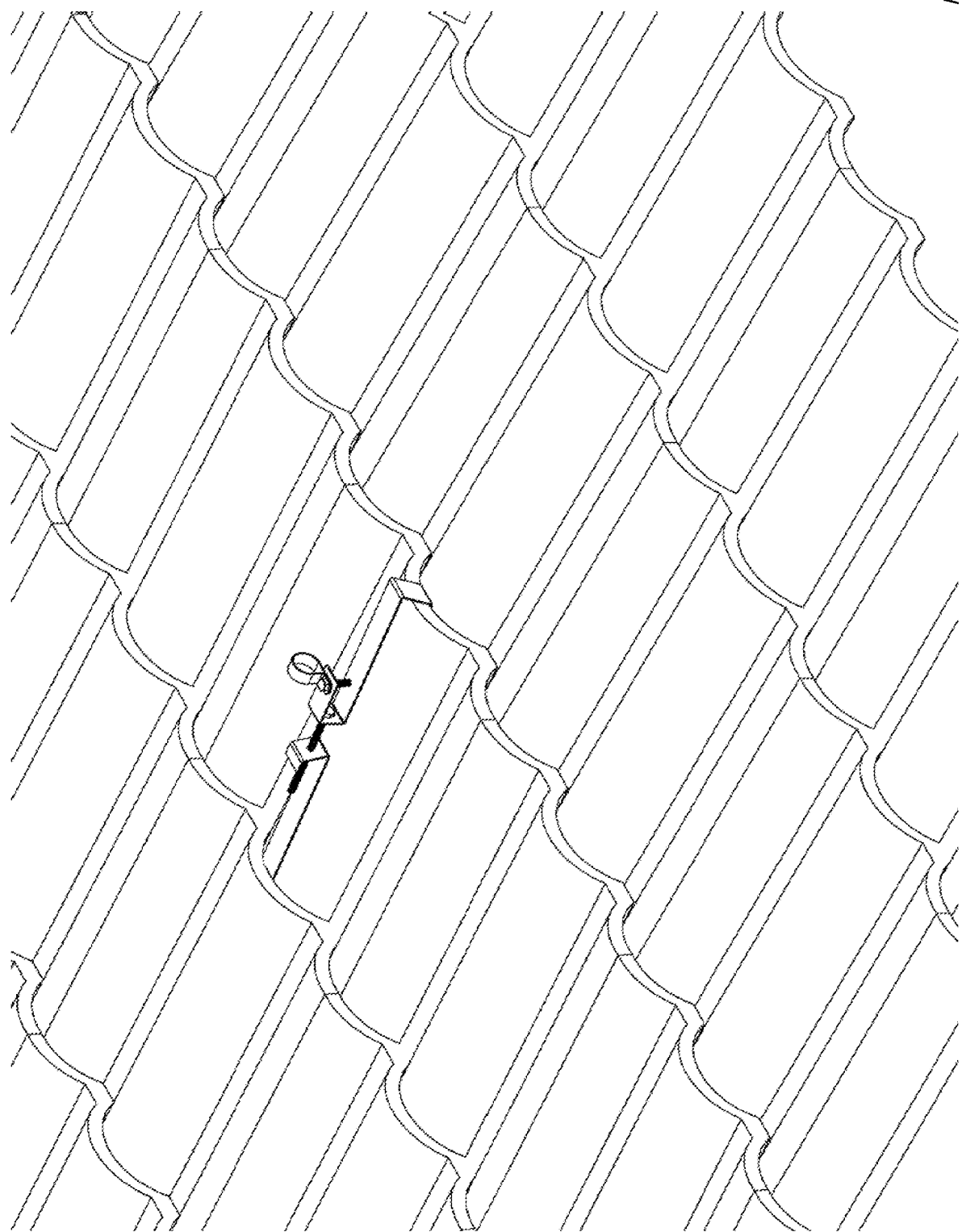
Figure 76:
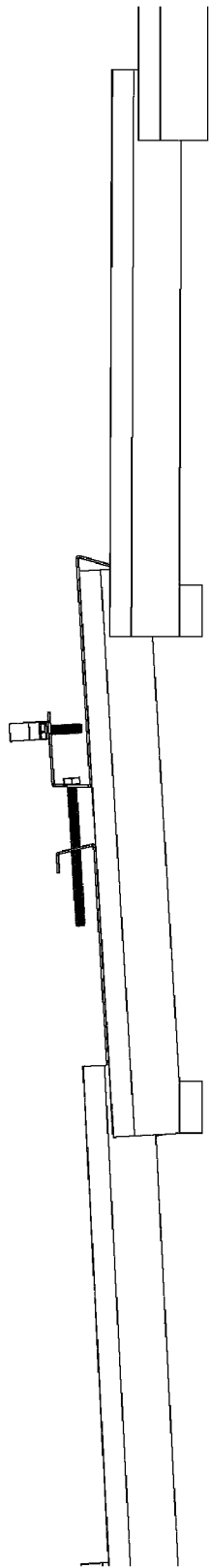
Figure 77:
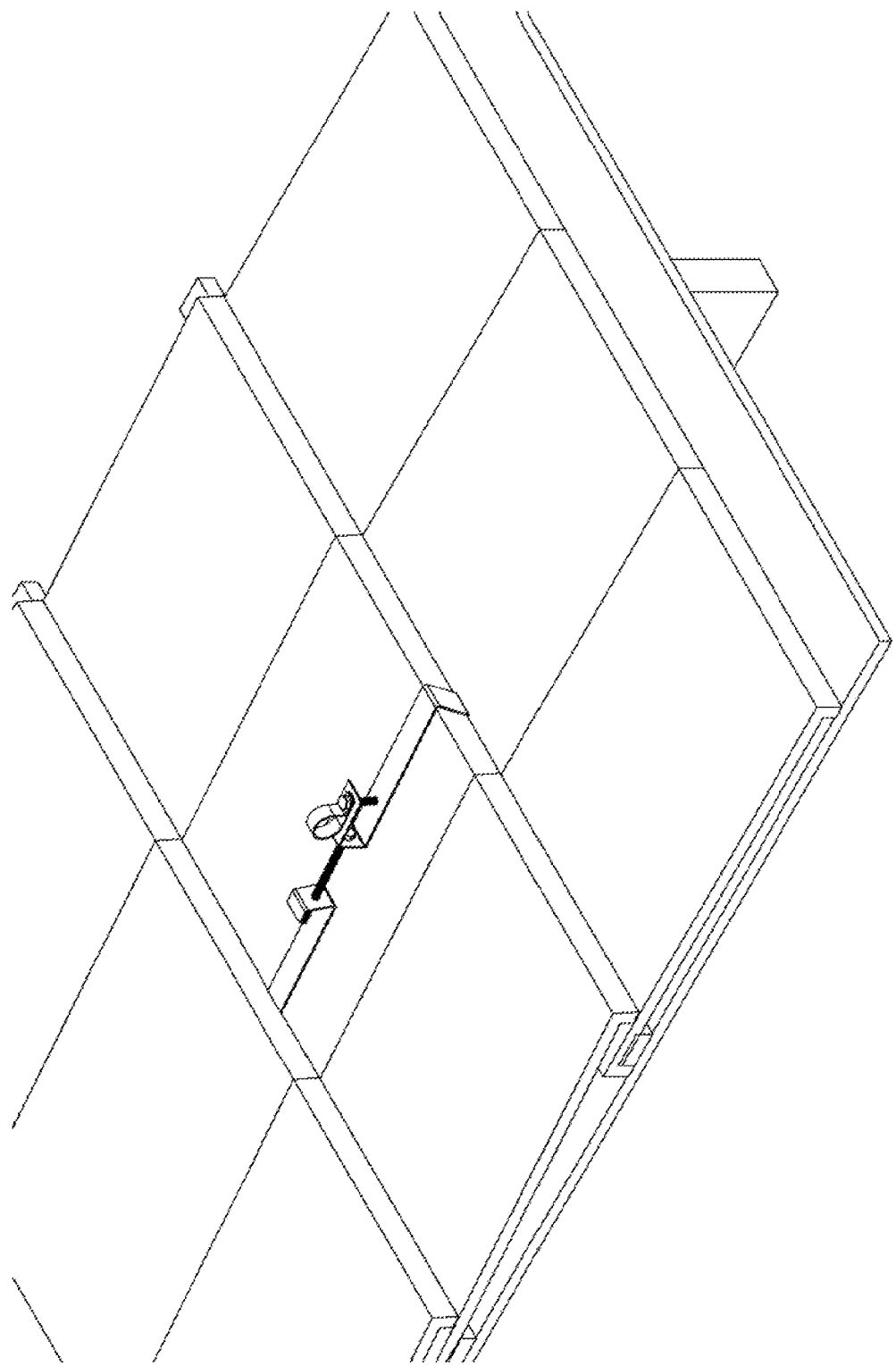
Figure 78:
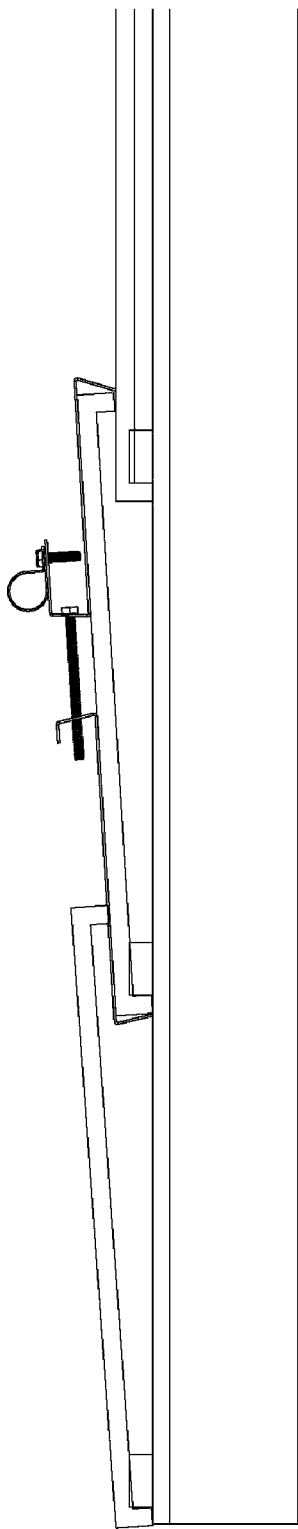
Figure 79:
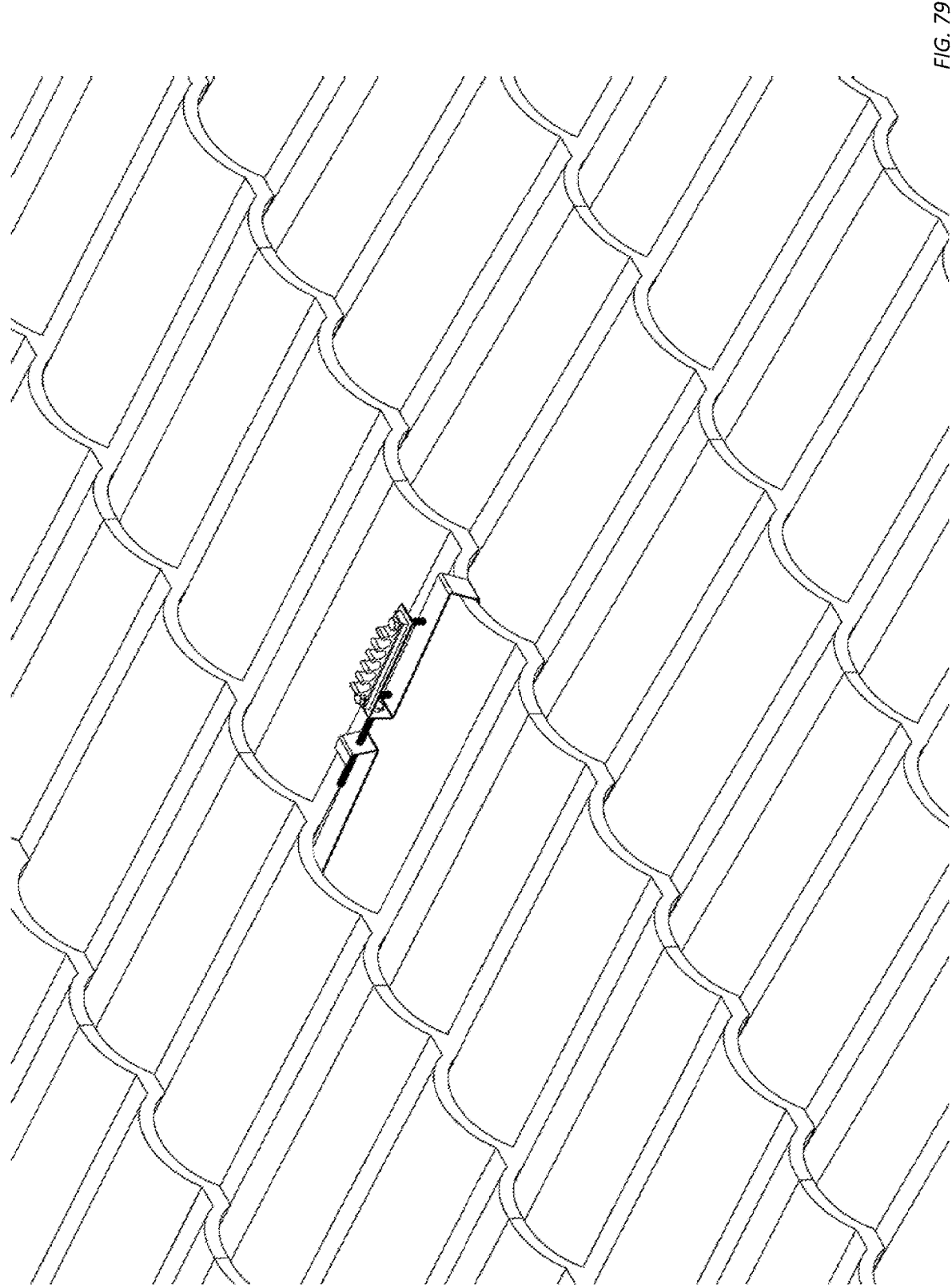
Figure 80:
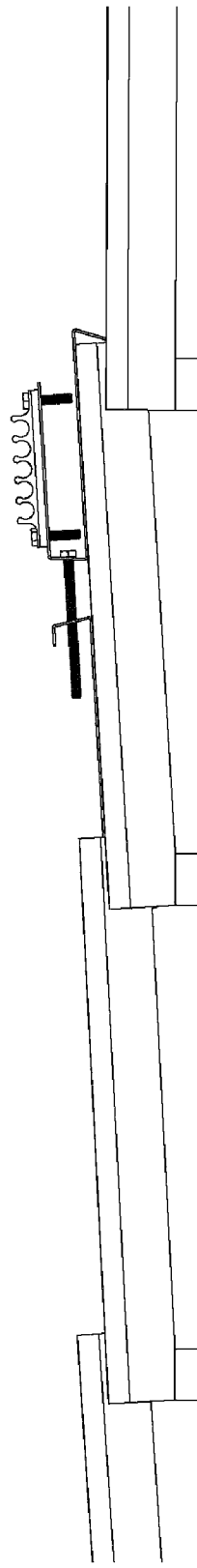
Figure 81:
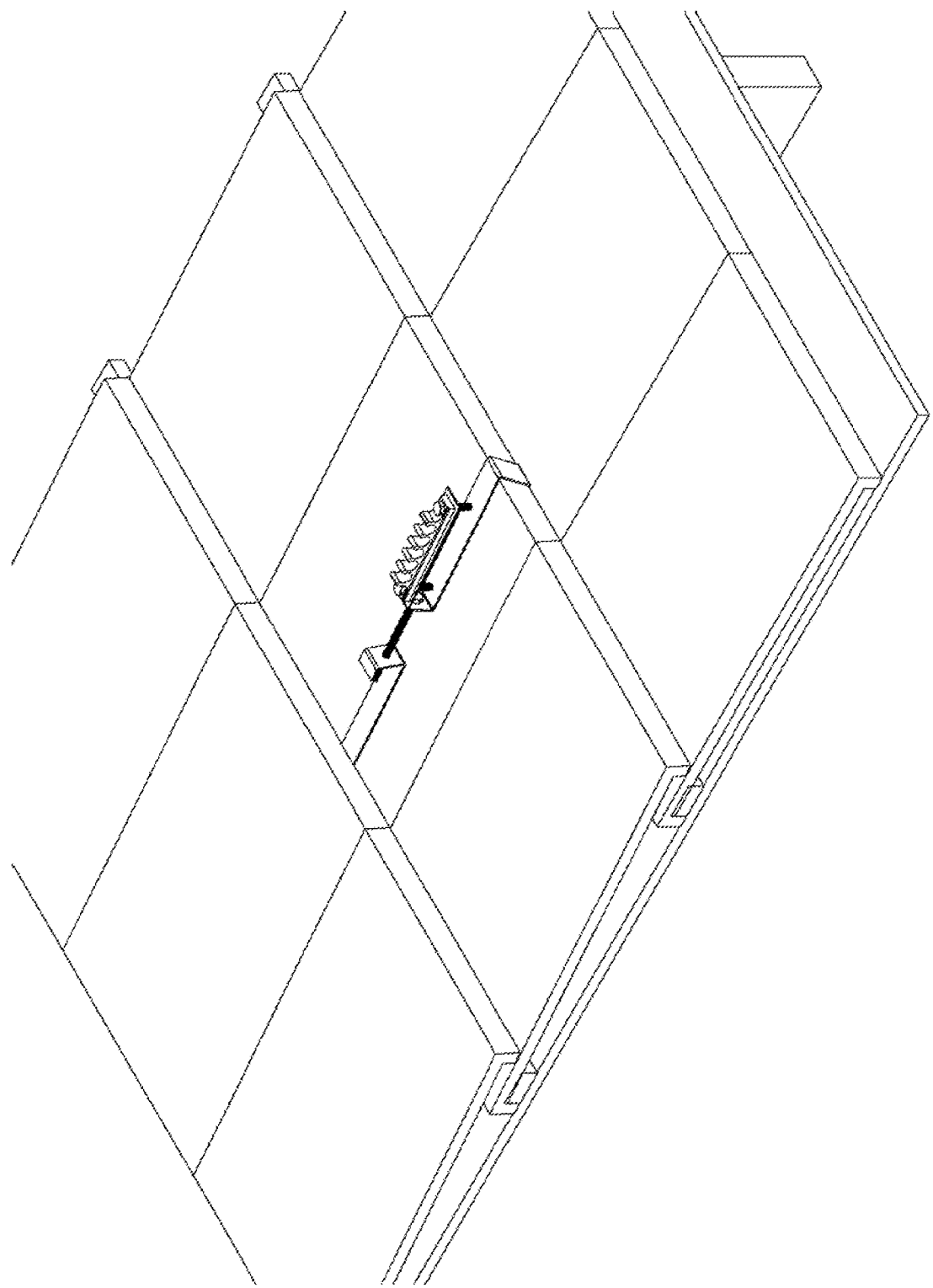
Figure 82:
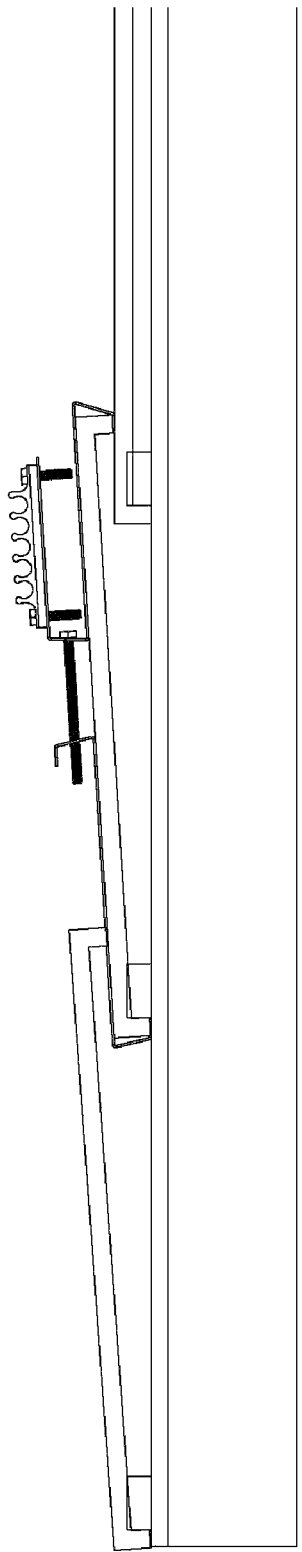
Figure 83:
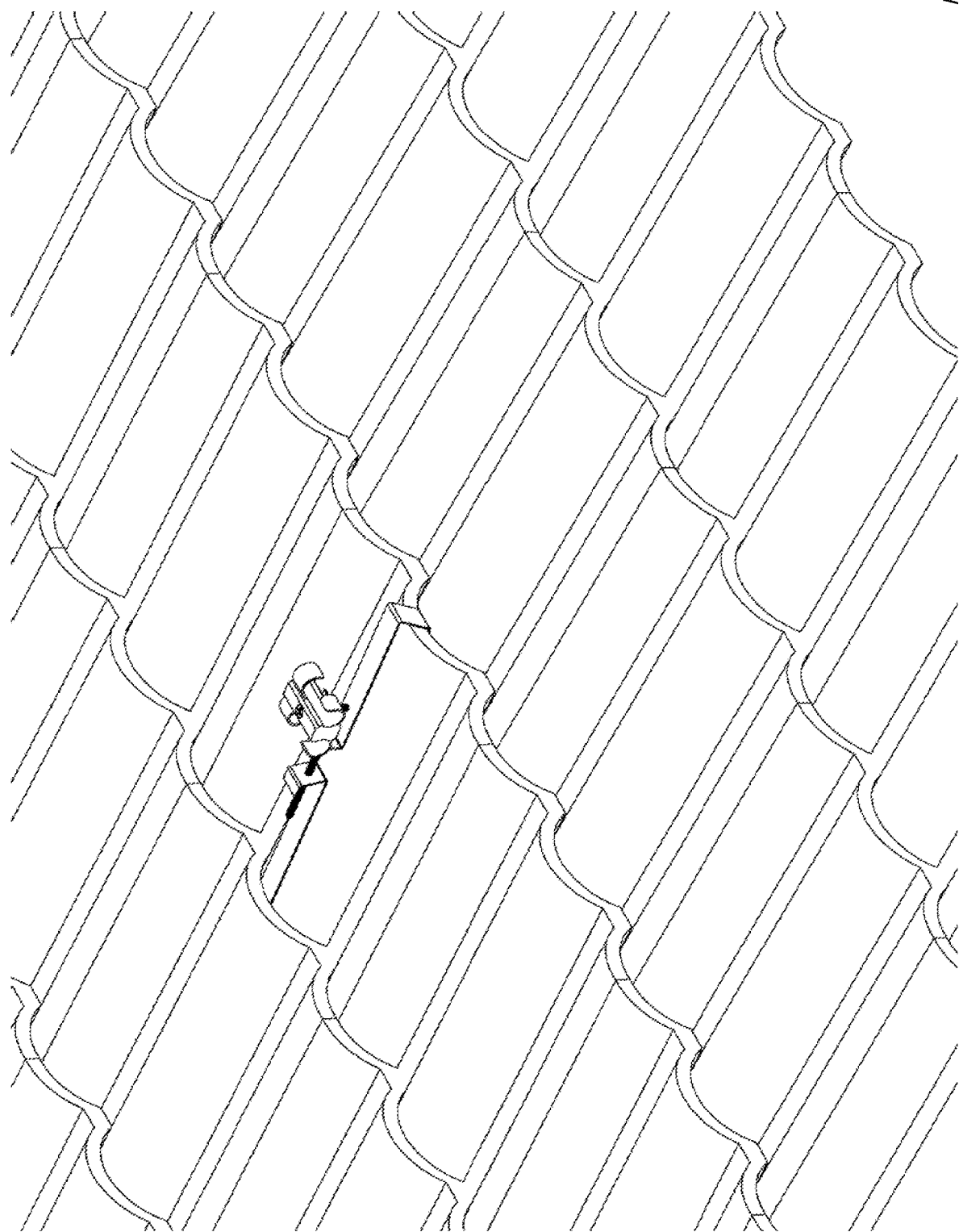
Figure 84:
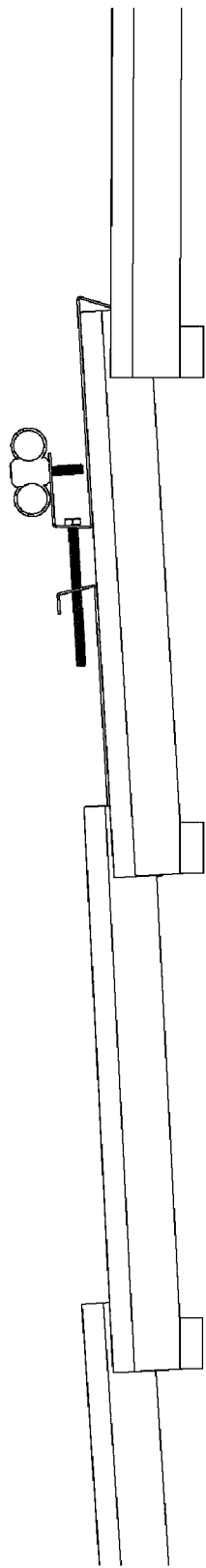
Figure 85:
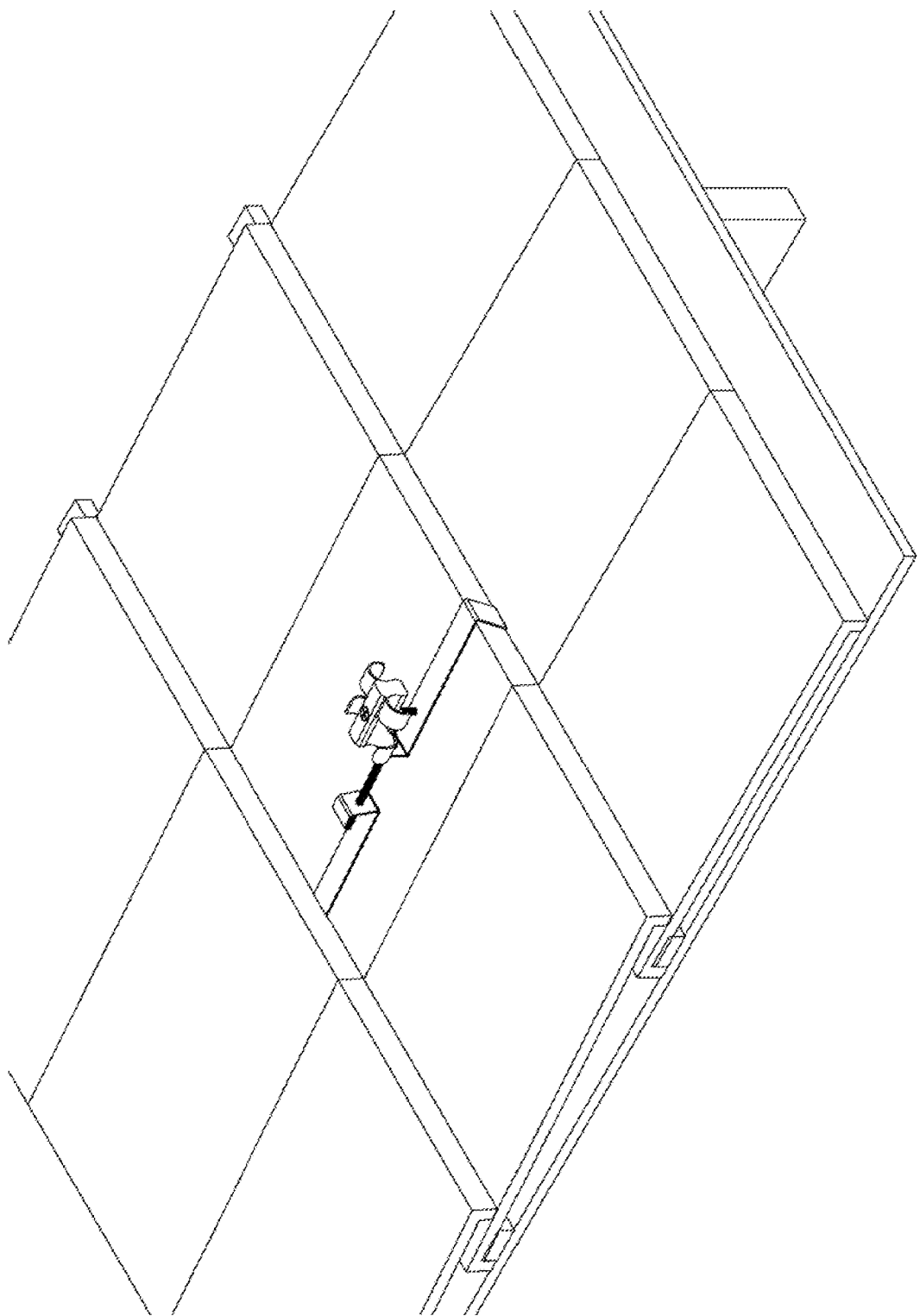
Figure 86:
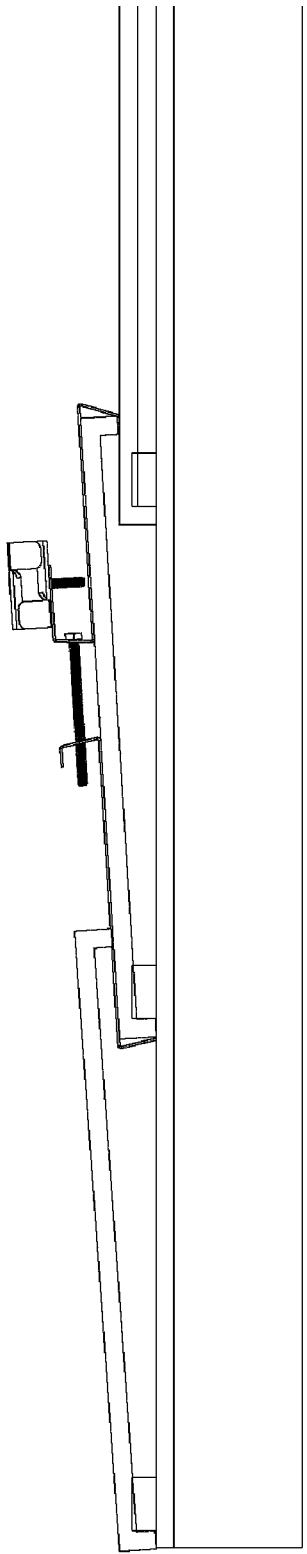
Figure 87:
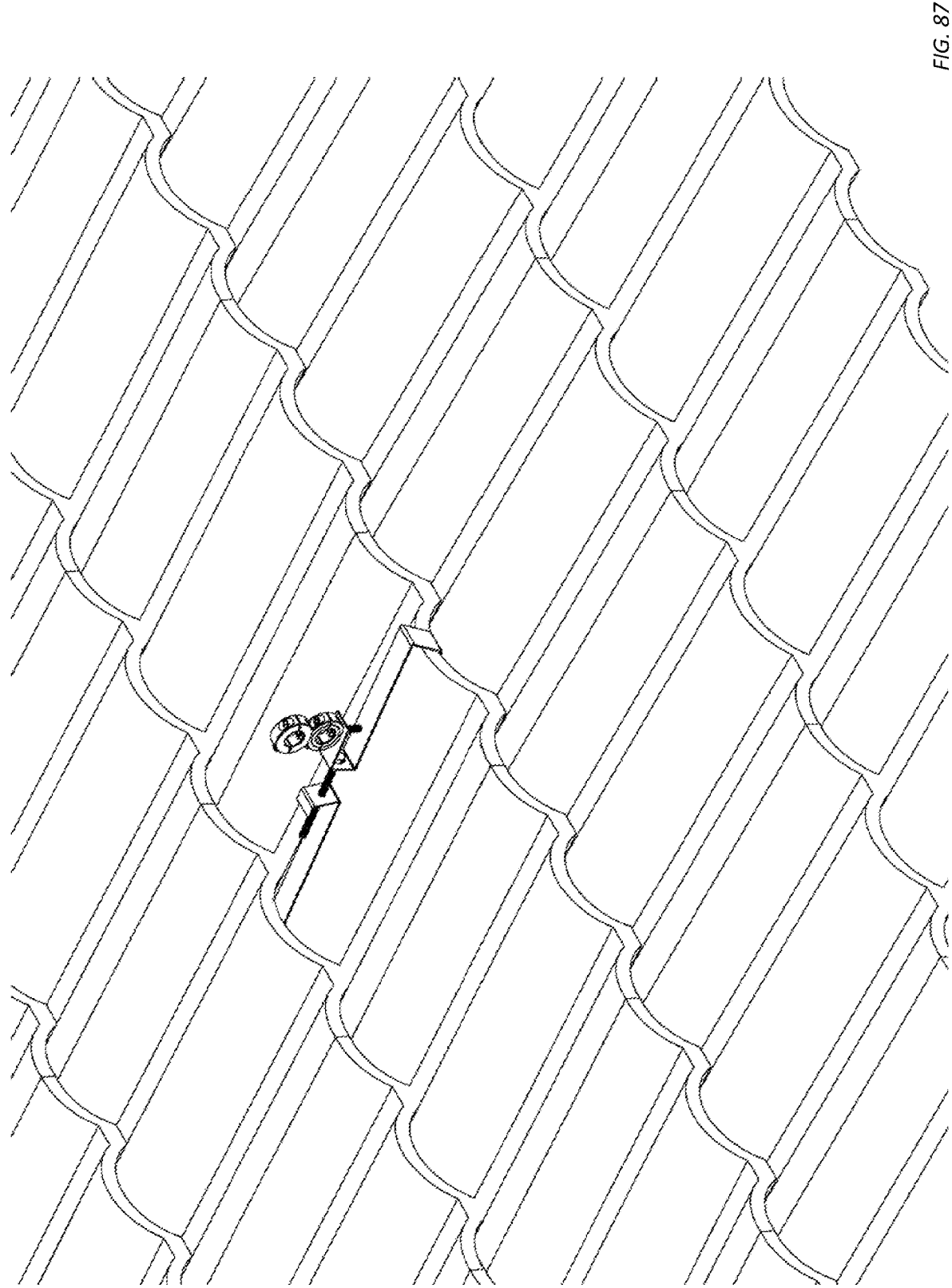
Figure 88:
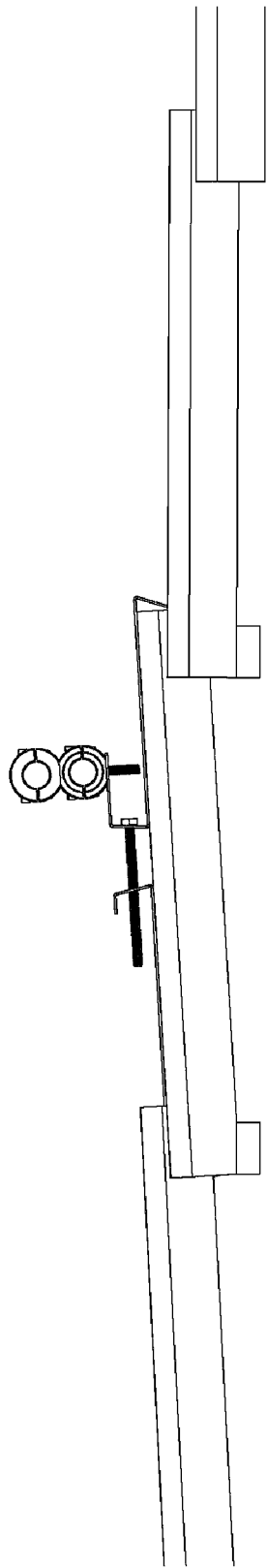
Figure 89:
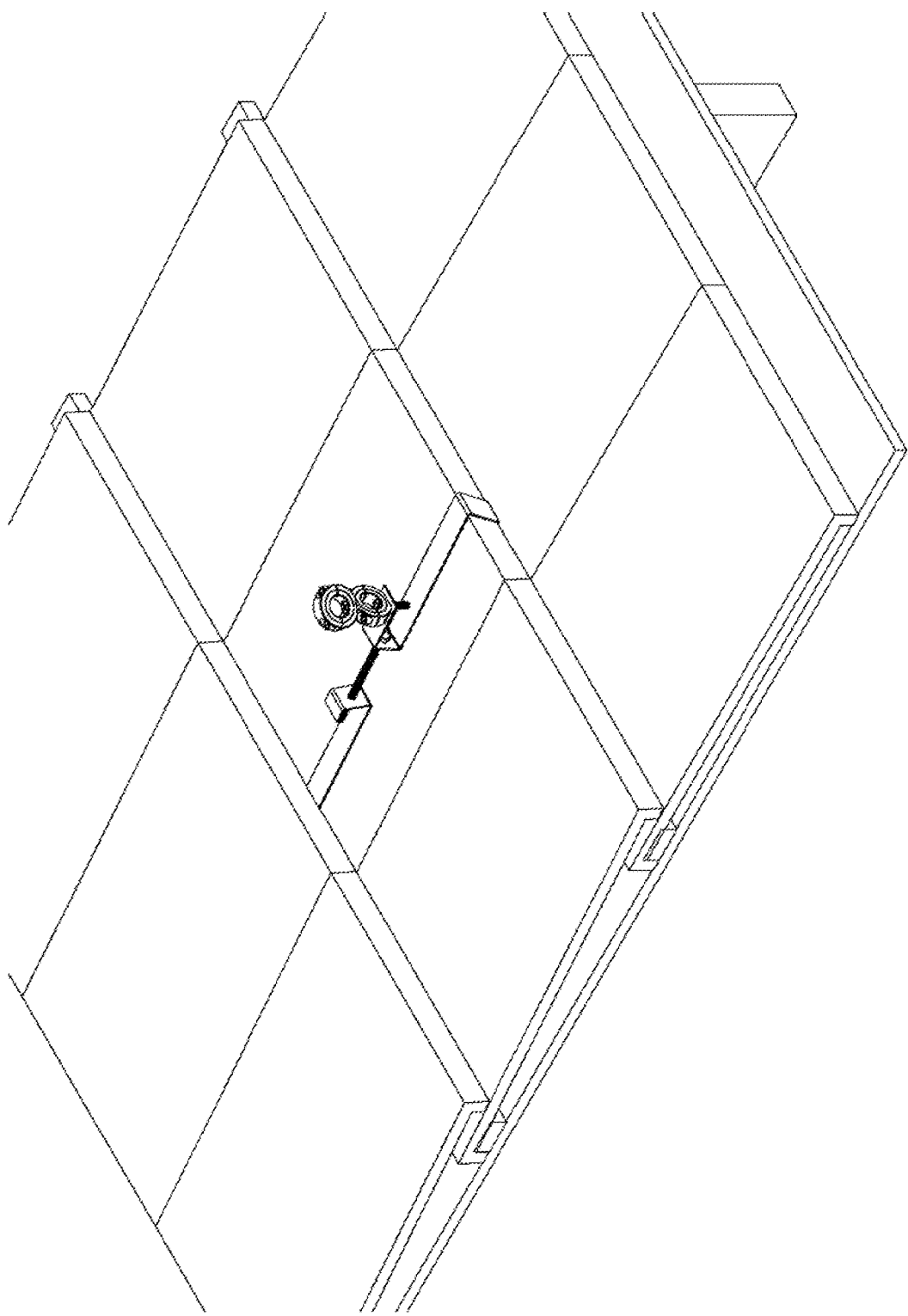
Figure 90:
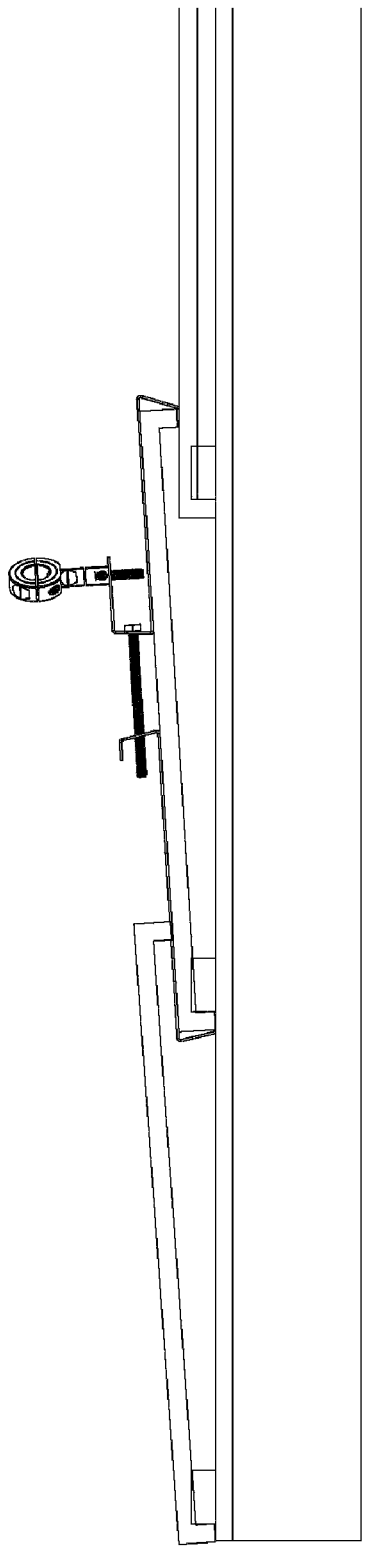

In alternative embodiments of the invention, the system may hold various types of brackets for various purposes, such as for those holding and securing conduits, pipes (both insulated and non-insulated), solar pool heating systems, header brackets, and various straps. As shown in FIGS. 11-90, the core functionality of the underlying tile mounting system remains unchanged.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A system of S-shaped conduit mounting assembly hooks for mounting a conduit on a tile having a range of sizes, the system comprising:
    a first S-shaped hook having a first elongated member, a first top hook with a first side hole, and a first bottom hook with a second side hole, wherein the first top hook has a first top base portion having a first width and the first bottom hook has a first bottom base portion having a second width that is less than said first width;
    a second S-shaped hook having a second elongated member, a second top hook, and a second bottom hook, the second top hook comprising a third side hole and a top hole;
    a connecting screw connecting the second top hook to either the first top hook or the first bottom hook wherein the first S-shaped hook and the second S-shaped hook are adjustably joined such that the first S-shaped hook attaches around a tile first side and the second S-shape hook attaches around a tile second side; and
    a conduit securement screw connecting the conduit on the second S-shaped hook utilizing a conduit fastening member;
    wherein the system securely fastens said hooks to said tile without penetrating the tile.

2. The system of S-shaped conduit mounting assembly hooks of claim 1 wherein the first side hole is thread formed and wherein the system comprises no nuts.

3. The system of S-shaped conduit mounting assembly hooks of claim 1 wherein the second S-shaped hook attaches around a tile front portion opposite to the first S-shaped hook.

4. The system of S-shaped conduit mounting assembly hooks of claim 1 further comprising:
    a first top hooked portion on the first S-shaped hook;
    a first bottom hooked portion on the first S-shaped hook;
    a second top hooked portion on the second S-shaped hook;
    wherein when the first S-shaped hook and the second S-shaped hook are firmly connected to each other utilizing the connecting screw, the second top hooked portion extends away from either the first hooked portion or the first bottom hooked portion.

5. The system of S-shaped conduit mounting assembly hooks of claim 4 wherein the second S-shaped hook attaches around a tile front portion opposite to the first S-shaped hook.

6. The system of S-shaped conduit mounting assembly hooks of claim 1 wherein the first S-shaped hook is reversible such that the first S-shaped hook attaches around the tile second side and the second S-shaped hook attaches around the tile first side.

7. The system of S-shaped conduit mounting assembly hooks of claim 1 wherein the connecting screw extends through either the first side holes or the second side hole.

8. The system of S-shaped conduit mounting assembly hooks of claim 1 wherein the conduit is inserted through a conduit opening of the conduit fastening member and the conduit securement screw extends through a fastening hole at the conduit fastening member and the second S-shaped hook.

9. The system of S-shaped conduit mounting assembly hooks of claim 1 wherein at least one of said holes are thread formed.

10. The system of S-shaped conduit mounting assembly hooks of claim 9 wherein said first side hole, said second side hole, and said top hole are thread formed and wherein the system comprises no nuts.

11. The system of S-shaped conduit mounting assembly hooks of claim 1 wherein when the first S-shaped hook is mounted around said tile front portion, the first top base portion is attached to a top edge of the tile and the first top hooked portion is attached around a rear portion of the tile.

12. A system of S-shaped conduit mounting assembly hooks for mounting a conduit on a tile having a range of sizes, the system comprising:
- a first S-shaped hook having a first elongated member, a first top hook with a first side hole, and a first bottom hook with a second side hole, wherein the first S-shaped hook attaches around a tile front portion at a first location;
- a second S-shaped hook having a second elongated member, a second top hook, and a second bottom hook, and wherein the second top hook comprises a third side hole and a top hole wherein the second S-shaped hook attaches at a second location at an opposite end of said tile front portion front portion;
- a connecting screw connecting the second top hook to either the first top hook or the first bottom hook wherein the second S-shaped hook and the first S-shaped hook are joined by extending the connecting screw through the second S-shaped hook and the first S-shaped hook; and
- a conduit securement screw for mounting the conduit on the second S-shaped hook utilizing a conduit fastening.

13. The system of S-shaped conduit mounting assembly hooks of claim 12 wherein at least one of said holes are thread formed.

14. The system of S-shaped conduit mounting assembly hooks of claim 13 wherein said first side hole, said second side hole, and said top hole are thread formed and wherein the system comprises no nuts.

15. The system of S-shaped conduit mounting assembly hooks of claim 12 further comprising:
- a first top hooked portion and a first top base portion on the first S-shaped hook;
- a first bottom hooked portion and a first bottom base portion on the first S-shaped hook;
- wherein the first bottom hooked portion is longer than the first top base portion; and
- wherein when the first S-shaped hook and the second S-shaped hook are firmly connected to each other utilizing the connecting screw, either the first bottom base portion or the first top base portion form a 90-degree inclination with the first elongated member.

16. The system of S-shaped conduit mounting assembly hooks of claim 12 wherein:
- the second S-shaped hook comprises a second top base portion;
- the second S-shaped hook attaches around a tile front portion opposite to the first S-shaped hook; and
- the first top base portion and the first bottom base portion are at a near 90-degree inclination with respect to the tile front portion.

17. The system of S-shaped conduit mounting assembly hooks of claim 12 wherein the system securely fastens said hooks to said tile without penetrating the tile.

18. A system of S-shaped conduit mounting assembly hooks for mounting a conduit on a tile having a range of sizes, the system comprising:
- a first S-shaped hook having a first elongated member, a first top hook with a first side hole, and a first bottom hook with a second side hole, wherein the first S-shaped hook attaches around a tile front portion at a first location;
- a second S-shaped hook having a second elongated member, a second top hook with a third side hole and a top hole, a second bottom hook and the second S-shaped hook attaching at a second location at an opposite end of said tile front portion;
- wherein the first S-shaped hook and the second S-shaped hook are connected to each other via a connecting screw such that in a first configuration the first bottom hook base portion forms a less than 90-degree inclination with the first elongated member, and in a second configuration the first bottom hook base portion forms a 90-degree inclination with the first elongated member, the connecting screw further connecting the second top hook to either the first top hook or the first bottom hook; and
- a conduit securement screw connecting the conduit on the second S-shaped hook utilizing a conduit fastening member.

19. The system of S-shaped conduit mounting assembly hooks of claim 18 wherein:
- the connecting screw extends through the second S-shaped hook and the first S-shaped hook; and
- the conduit securement screw extends through said top hole.

20. The system of S-shaped conduit mounting assembly hooks of claim 19 wherein the conduit extends through a conduit opening of the conduit fastening member and the conduit securement screw extends through the conduit fastening member hole and the top hole.

21. The system of S-shaped conduit mounting assembly hooks of claim 19 wherein at least one of said holes are thread formed and wherein the system comprises no nuts.

22. The system of S-shaped conduit mounting assembly hooks of claim 18 further comprising:
- a first top hooked portion and a first top base portion on the first top hook; and
- wherein when the first S-shaped hook is mounted around the said front portion, the first top base portion is attached to a top edge of the tile and the first top hooked portion is attached around a rear portion of the tile.

* * * * *